United States Patent  (10) Patent No.: US 9,191,962 B2
Prasad et al.  (45) Date of Patent: Nov. 17, 2015

(54) MULTI-USER SCHEDULING IN CELLULAR UPLINKS

(75) Inventors: Narayan Prasad, Princeton, NJ (US); Honghai Zhang, Princeton, NJ (US); Sampath Rangarajan, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 71 days.

(21) Appl. No.: 13/561,805

(22) Filed: Jul. 30, 2012

(65) Prior Publication Data

US 2013/0170366 A1 Jul. 4, 2013

Related U.S. Application Data

(60) Provisional application No. 61/512,692, filed on Jul. 28, 2011, provisional application No. 61/587,177, filed on Jan. 17, 2012.

(51) Int. Cl.
*H04L 5/00* (2006.01)
*H04W 72/08* (2009.01)
*H04W 72/12* (2009.01)

(52) U.S. Cl.
CPC ........... *H04W 72/085* (2013.01); *H04L 5/0007* (2013.01); *H04L 5/0039* (2013.01); *H04L 5/0048* (2013.01); *H04W 72/1231* (2013.01)

(58) Field of Classification Search
CPC .... H04W 28/06; H04W 72/085; H04W 72/12
See application file for complete search history.

(56) References Cited

U.S. PATENT DOCUMENTS

| | | | |
|---|---|---|---|
| 2006/0039312 A1* | 2/2006 | Walton et al. | 370/319 |
| 2006/0121946 A1* | 6/2006 | Walton et al. | 455/561 |
| 2007/0293157 A1* | 12/2007 | Haartsen et al. | 455/67.11 |
| 2009/0135944 A1* | 5/2009 | Dyer et al. | 375/267 |
| 2010/0020757 A1* | 1/2010 | Walton et al. | 370/329 |
| 2010/0029213 A1* | 2/2010 | Wang | 455/63.1 |
| 2010/0034186 A1* | 2/2010 | Zhou et al. | 370/344 |
| 2010/0080136 A1* | 4/2010 | Hunzinger | 370/252 |
| 2011/0053527 A1* | 3/2011 | Hunzinger | 455/101 |
| 2011/0136446 A1* | 6/2011 | Komninakis et al. | 455/78 |
| 2012/0082104 A1* | 4/2012 | Lysejko et al. | 370/329 |
| 2013/0028230 A1* | 1/2013 | Borran et al. | 370/329 |

* cited by examiner

*Primary Examiner* — Khaled Kassim
(74) *Attorney, Agent, or Firm* — Joseph Kolodka

(57) ABSTRACT

Disclosed herein are techniques, methods, and apparatus pertaining to a multi-user scheduling in 4G and 3GPP LTE cellular uplinks.

1 Claim, 21 Drawing Sheets

| Parameter | Assumption |
|---|---|
| Deployment scenario | IMT Urban Micro (UMi) |
| Duplex method and bandwidth | FDD: 10MHz for uplink |
| Cell layout | Hex grid 19 sites, 3 cells/site |
| Transmission power at user | 23 dBm |
| Average number of users per sector | 10 or 15 |
| Network synchronization | Synchronized |
| Antenna configuration (eNB) | 4 RX co-polarized ant., 0.5-λ spacing |
| Antenna configuration (user) | 1 TX ant. |
| Uplink transmission scheme | Dynamic MU scheduling, MU pairing: Max 2/RB users aligned pairing. |
| Fractional power control | Po=-85 dB, α = 0.8 |
| Uplink scheduler | PF in time and frequency |
| Scheduling granularity | 1 RB |
| CQI assumptions | 1 ms periodicity and 7 ms delay CQI without errors. |
| Uplink HARQ scheme | Synchronous, non-adaptive Chase Combining |
| Uplink receiver type | MMSE-IRC and SIC-IRC |
| Channel estimation error | NA |

FIG. 14

| Scheduling method | cell average | 5% cell-edge |
|---|---|---|
| LRT SU | 1.6214 | 0.0655 |
| LRT MU with MMSE | 1.9246 (18.70%) | 0.0524 |
| LRT MU with SIC | 2.0651 (27.37%) | 0.0745 |
| LRT-Sequential MU with MMSE | 1.8196 (12.22%) | 0.0627 |
| LRT-Sequential MU with SIC | 1.9537 (20.5%) | 0.0665 |

FIG. 15

| LRT-MU scheduling with: | cell average | 5% cell-edge |
|---|---|---|
| Knapsack constraint | 1.7833 | 0.0266 |
| pre-selection 1 | 1.7940 (0.6%) | 0.0419 (57.52%) |
| pre-selection 2 | 1.7908 (0.4%) | 0.0414 (55.64%) |
| pre-selection 3 | 1.8265 (2.42%) | 0.0444 (66.92%) |

*FIG. 16*

| LRT-MU scheduling with: | cell average | 5% cell-edge |
|---|---|---|
| Knapsack constraint | 1.8865 | 0.0411 |
| pre-selection 1 | 2.0082 (6.45%) | 0.0527 (28.22%) |
| pre-selection 2 | 1.8980 (0.61%) | 0.0451 (9.73%) |
| pre-selection 4 | 2.1069 (11.68%) | 0.0531 (29.2%) |

FIG. 17

MULTI-USER SCHEDULING IN CELLULAR UPLINKS

CROSS REFERENCE TO RELATED APPLICATIONS

This application claims the benefit of U.S. Provisional Patent Application Ser. No. 61/512,692 filed Jul. 28, 2011 and U.S. Provisional Patent Application Ser. No. 61/587,177 filed Jan. 17, 2012, the entire contents of which are incorporated by reference as if set forth at length herein.

FIELD OF THE DISCLOSURE

This disclosure relates generally to the field of telecommunications and in particular to methods for scheduling cellular uplinks.

BACKGROUND OF THE DISCLOSURE

The 3GPP LTE-A based cellular network [1] together with the IEEE 802.16m based cellular network are the only two cellular networks classified as 4G cellular networks by the international telecommunications union. Some key attributes that a 4G uplink must possess are the ability to support a peak spectral efficiency of 15 bps/Hz and a cell average spectral efficiency of 2 bps/Hz, ultra-low latency and bandwidths of up to 100 MHz. To achieve these ambitious specifications, the 3GPP LTE-A uplink is based on a modified form of the orthogonal frequency-division multiplexing based multiple-access (OFDMA) [1]. In addition, it allows precoded multi-stream (precoded MIMO) transmission from each scheduled user as well as flexible multi-user scheduling. Notice that while OFDMA itself allows for significant spectral efficiency gains via channel dependent frequency domain scheduling, multi-user multi-stream communication promises substantially higher degrees of freedom [2]. Our focus in this paper is on the 3GPP LTE-A uplink (UL) and in particular on MU MIMO scheduling for the LTE-A UL. Predominantly, almost all of the 4G cellular systems that will be deployed will be based on the 3GPP LTE-A standard [1]. This standard is an enhancement of the basic LTE standard which is referred to in the industry as Release 8 and indeed deployments conforming to Release 8 are already underway. The scheduling in the LTE-A UL is done in the frequency domain where in each scheduling interval the scheduler assigns one or more resource blocks (RBs) to each scheduled user. Each RB contains a pre-defined set of consecutive subcarriers and consecutive OFDM symbols and is the minimum allocation unit.

The goal of this work is to design practical uplink MU-MIMO resource allocation algorithms for the LTE-A cellular network, where the term resource refers to RBs as well as precoding matrices. In particular, we consider the design of resource allocation algorithms via weighted sum rate utility maximization that account for finite user queues (buffers) and finite precoding codebooks. In addition, the designed algorithms comply with all the main practical constraints on the assignment of RBs and precoders to the scheduled users. Our main contributions are as follows:

1) We first assume that users can employ ideal Gaussian codes and that the base-station (BS) can employ an optimal receiver. We then enforce user rates to lie in a fundamental achievable rate region of the multiple access channel which is a polymatroid and show that the resulting resource allocation problem is NP-hard. We prove that the resource allocation problem can however be formulated as the maximization of a monotonic sub-modular set function subject to one matroid and multiple knapsack constraints, and can be solved using a recently discovered polynomial time randomized constant-factor approximation algorithm [3]. We also adapt a simpler deterministic greedy algorithm and show that it yields a constant-factor approximation for scenarios of interest.

2) We then consider scenarios where users employ codes constructed over finite alphabets. In this case the mutual information terms needed to specify an achievable rate region do not have closed form expressions. On the other hand the achievable rate region obtained for Gaussian alphabets can be a loose outer bound. Consequently, we obtain a tighter outer bound which is also a polymatroid. As a result all algorithms developed for Gaussian alphabets can be reused after simple modifications. Finally, we demonstrate the superior performance of our proposed algorithms via simulations using a realistic channel model.

SUMMARY OF THE DISCLOSURE

An advance is made in the art according to aspects of the present disclosure directed to methods and systems for efficiently scheduling multiple-users in a 4G and 4GPP LTE cellular networks.

DESCRIPTION OF THE DRAWING

A more complete understanding of the disclosure may be realized by reference to the accompanying drawing in which:

FIG. 14 depicts Table 4 showing parameters for system level simulations according to an aspect of the present disclosure;

FIG. 15 depicts Table 5 showing spectral efficiency of LRT based SU and MU UL scheduling schemes wherein an average of 10 users are present in each cell and all associated active users can be scheduled in each interval according to an aspect of the present disclosure;

FIG. 16 depicts Table 6 showing spectral efficiency of MU UL scheduling schemes wherein an average of 15 users are present in each cell and at most 7 first transmission users can be scheduled in each interval according to an aspect of the present disclosure;

FIG. 17 depicts Table 7 showing spectral efficiency of MU UL scheduling schemes with SIC receivers wherein an average of 15 users are present in each cell and at most 7 first transmission users can be scheduled in each interval according to an aspect of the present disclosure;

DESCRIPTION OF EMBODIMENTS

Figure 1:
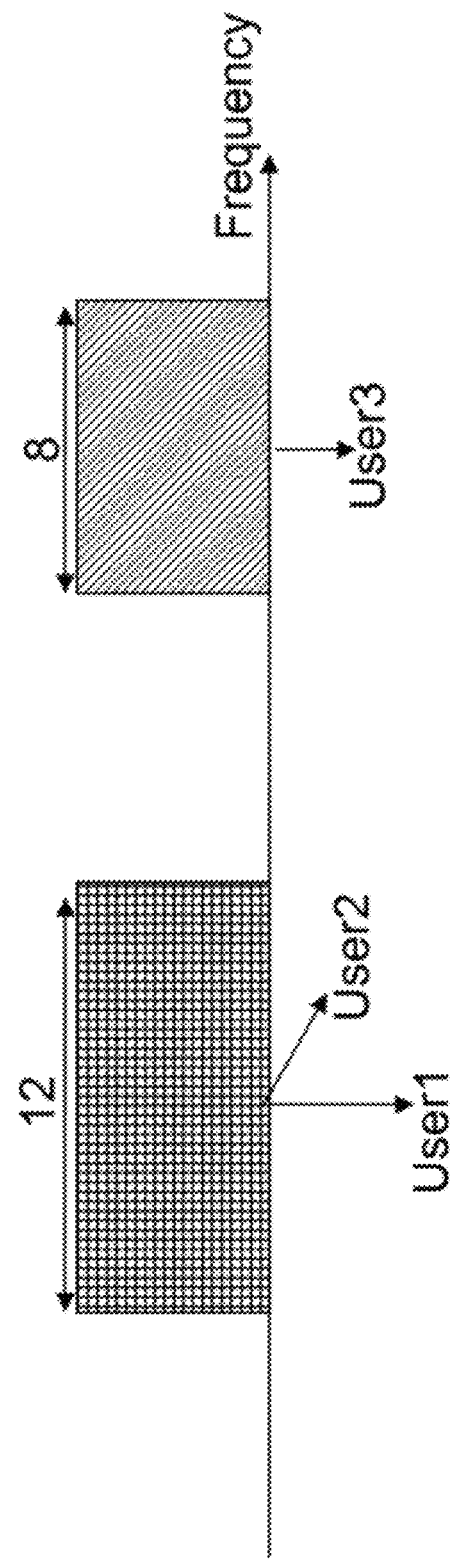
FIG. 1 is a schematic diagram depicting a feasible RB allocation in the LTE UL according to an aspect of the present disclosure.

The following merely illustrates the principles of the various embodiments. It will thus be appreciated that those skilled in the art will be able to devise various arrangements which, although not explicitly described or shown herein, embody the principles of the embodiments and are included within their spirit and scope.

Furthermore, all examples and conditional language recited herein are principally intended expressly to be only for pedagogical purposes to aid the reader in understanding the principles of the embodiments and the concepts contributed by the inventor(s) to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Where the particular embodiments are methods and/or algorithms, it is understood that such methods and/or algorithms execute on any of a variety of commercially available processors, computers, and equivalents, whether dedicated or general purpose.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the FIGs., including any functional blocks labeled as "processors" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the FIGs. are conceptual only. Their function may be carried out through the operation of program logic, through dedicated logic, through the interaction of program control and dedicated logic, or even manually, the particular technique being selectable by the implementer as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicants thus regard any means which can provide those functionalities as equivalent as those shown herein.

Unless otherwise explicitly specified herein, the drawings are not drawn to scale.

Multi-User MIMO Scheduling in the LTE-A UL

Consider a single-cell with K users and one BS which is assumed to have $N_r \geq 1$ receive antennas. Suppose that user k has $N_t \geq 1$ transmit antennas and its power budget is $P_k$. Let $H_k^{(n)}$ denote the channel seen by the BS from user k on RB n. We let N denote the total number of RBs. In the following all rates are normalized by the number of resource elements in an RB.

We consider the problem of scheduling users in the frequency domain in a given scheduling interval. Let $\alpha_k$, $1 \leq k \leq K$ denote the weight of the $k^{th}$ user which is an input to the scheduling algorithm and is updated using the output of the scheduling algorithm in every scheduling interval according to the proportional fairness rule [20]. Letting $r_k$ denote the rate assigned to the $k^{th}$ user, we consider the following weighted sum rate utility maximization problem, $$\max \sum_{1 \leq k \leq K} \alpha_k r_k, \quad (1)$$

where the maximization is over the assignment of RBs, precoders and powers to the users subject to:

Decodability constraint: The rates assigned to the scheduled users should be decodable by the base-station receiver. Notice that unlike SU-MIMO, MU-MIMO scheduling allows for multiple users to be assigned the same RB. As a result the rate that can be achieved for user k need not be only a function of the RBs, precoders and powers assigned to the $k^{th}$ user but can also depend on the those assigned to the other users as well.

One precoder and one power level per user: Each scheduled user can be assigned one precoding matrix from a finite codebook of such matrices $\mathcal{W}$. In addition, each scheduled user can transmit with only one power level (or power spectral density (PSD)) on all its assigned RBs. This PSD is implicitly determined by the number of RBs assigned to that user, i.e., the user divides its total power equally among all its assigned RBs.

At most two chunks per-user: The set of RBs assigned to each scheduled user should form at-most two mutually non-contiguous chunks, where each chunk is a set of contiguous RBs. This constraint is a compromise between the need to provide enough scheduling flexibility and the need to keep the per-user peak-to-average-power ratio (PAPR) under check. Feasible RB allocation and co-scheduling of users in LTE-A multi-user uplink is depicted in FIG. 1.

Finite buffers and finite input alphabets: We let $Q_k$ denote the queue (buffer) size in bits and let $S_k$ denote the maximum alphabet size of the $k^{th}$ user, respectively. Thus, the rate $r_k$ assigned to user k cannot exceed $Q_k$ and on any RB user k cannot achieve a rate greater than $\log(S_k)$.

Control channel overhead constraints: Recall that every user that is given an UL grant (i.e., is scheduled on at least one RB) must be informed about its transmission rate and the set of RBs on which it must transmit along with the precoder it should employ. This information is sent on the DL control channel of limited capacity which imposes a limit on the number of users that can be scheduled. In particular, the scheduling information of a user is encoded and formatted into a packet and the size of the packet can be selected from a predetermined set of packet sizes. A longer (shorter) packet is used for a cell edge (cell interior) user. Furthermore, in order to minimize the number of blind decoding attempts by the users, each user is assigned a search space in the control channel and it searches for packets only in that space.[1]

Per sub-band interference limit constraints: Inter-cell interference mitigation is performed by imposing interference limit constraints. In particular, on one or more subbands, the cell of interest must ensure that the total interference imposed by its scheduled users on a neighboring base-station is below a specified limit.

We will formulate the optimization problem in (1) as the maximization of a submodular set function subject to one matroid and multiple knapsack (linear packing) constraints.

Towards this end, let $\underline{e}=(u, c, W)$ denote an element, where $1 \leq u \leq K$ denotes a user, $W \in \mathcal{W}$ denotes a precoder from a finite codebook $\mathcal{W}$ and $c \in C$ denotes a valid assignment of RBs chosen from the set C of all possible such valid assignments. In particular, each c is a vector with binary-valued ($\{0, 1\}$) elements and we say an RB i belongs to c (i∈c) if c contains a one in its $i^{th}$ position, i.e., c(i)=1. In addition $c_1$ and $c_2$ are said to intersect if there is some RB that belongs to both $c_1$ and $c_2$. Next, we let $\underline{\epsilon} = \{\underline{e}=(u, c, W): 1 \leq u \leq K, c \in C, W \in \mathcal{W}\}$ denote the ground set of all possible such elements. For any such element we adopt the convention that $$\underline{e}=(u, c, W) \Rightarrow c_{\underline{e}}=c;\ W_{\underline{e}}=W;\ u_{\underline{e}}=u;\ S_{\underline{e}}=S_u; \quad (2)$$

$$\alpha_{\underline{e}}=\alpha_u;\ Q_{\underline{e}}=Q_u;\ H_{\underline{e}}^{(n)}=H_u^{(n)}. \quad (3)$$

In addition, we let $p_{\underline{e}}$ denote the flower level (PSD) associated with the element $\underline{e}=(u, c, W)$. This PSD can be computed as $$\frac{P_u}{\text{size}(c)}.$$

where size(c) denotes the number of ones (number of RBs) in c. Let $\alpha_{\underline{e}}, Q_{\underline{e}}$ denote the weight and buffer (queue) size associated with the element $\underline{e}$, respectively and let $r_{\underline{e}}$ denote the rate associated with the element $\underline{e}$. We will use the phrase selecting an element $\underline{e}$ to imply that the user $u_{\underline{e}}$ is scheduled to transmit on the RBs indicated in $c_{\underline{e}}$ with PSD $p_{\underline{e}}$ and precoder $W_{\underline{e}}$. Thus, the constraints of one precoder and one power level per user along with at most two chunks per-user can be imposed by allowing the scheduler to select any subset of elements $\underline{U} \subseteq \underline{\epsilon}$ such that $\sum_{\underline{e} \in \underline{U}} 1\{u_{\underline{e}}=u\} \leq 1$ for each $u \in \{1, \ldots, K\}$, where $1\{.\}$ denotes the indicator function. Accordingly, we define a family of subsets of $\underline{\epsilon}$, denoted by $\mathcal{I}$, as $$\mathcal{I} = \left\{ \underline{U} \subseteq \underline{\epsilon} \sum_{\underline{e}=\underline{U}} 1\{u_{\underline{e}}=u\} \leq 1,\ \forall 1 \leq u \leq K \right\}. \quad (4)$$

We next consider the decodability constraint after first assuming that each user can employ ideal Gaussian codes (i.e., codes for which the coded modulated symbols can be regarded as i.i.d. Gaussian) and that the base-station (BS) can employ an optimal receiver. Subsequently, we will impose a finite input alphabet constraint. Note that under the assumption of ideal Gaussian codes, the DFT spreading operation performed by each user on its codeword [2] has no effect (i.i.d. Gaussian distribution is invariant with respect to any unitary linear transformation). Accordingly, we define a set function $f: 2^{\underline{\epsilon}} \to \mathbb{R}_+$ as $$f(\underline{U}) = \sum_{n=1}^{N} \log \left| I + \sum_{\underline{e} \in \underline{U}} p_{\underline{e}} c_{\underline{e}}(n) H_{\underline{e}}^{(n)} W_{\underline{e}} (H_{\underline{e}}^{(n)} W_{\underline{e}})^{\dagger} \right|,\ \forall \underline{U} \subseteq \underline{\epsilon}. \quad (5)$$

It can be verified that f(.) defined in (5) is a submodular set function [5,21], i.e., $$f(\underline{A} \cup \{\underline{e}\}) - f(\underline{A}) \geq f(\underline{B} \cup \{\underline{e}\}) - f(\underline{B}), \quad (6)$$

for all $\underline{A} \subseteq \underline{B} \subseteq \underline{\epsilon}$ and $\underline{e} \in \underline{\epsilon}$. Further since it is monotonic (i.e., $f(\underline{A}) \leq f(\underline{B}),\ \forall \underline{A} \subseteq \underline{B}$) and normalized $f(\Phi)=0$, where $\Phi$ denotes the empty set, we can assert that f(.) is a rank function. Consequently, for each $\underline{U} \subseteq \underline{\epsilon}$, the region $$\mathcal{P}(\underline{U}, f) = \left\{ r \in \mathbb{R}_+^{|\underline{U}|} : \sum_{\underline{e} \in \underline{A}} r_{\underline{e}} \leq f(\underline{A}),\ \forall \underline{A} \subseteq \underline{U} \right\}. \quad (7)$$

is a polymatroid [5]. Note that for each $U \subseteq \underline{\epsilon}$, P(U,f) is the fundamental achievable rate region of a multiple access channel. In particular, each rate-tuple $r_{\underline{u}}=[r_{\underline{e}}]_{\underline{e} \in \underline{U}} \in P(\underline{U}, f)$ is achievable [5] in the sense that for any rate assignment arbitrarily close to $r_{\underline{u}}$ (i.e., $r: r \leq r_{\underline{u}}$) there exist coding and decoding schemes that can meet any acceptable level of error probability. Thus, we can impose decodability constraints by imposing that the assigned rate-tuple satisfy $r_{\underline{u}} \in P(\underline{U}, f)$ for any selected subset $\underline{U} \subseteq \underline{\epsilon}$.

Next, in order to impose buffer (queue) constraints, we define a hyper rectangle $$\underline{B}(\underline{U})=\{ \in \mathbb{R}_+^{|\underline{U}|}: 0 \leq r_{\underline{e}} \leq Q_{\underline{e}},\ \forall \underline{e} \in \underline{U}\},\ \forall \underline{U} \subseteq \underline{\epsilon}. \quad (8)$$

Thus, for a (tentative) choice $\underline{U}$, we can satisfy both decodability and buffer constraints by assigning only rate-tuples that lie in $P(U,f) \cap B(U)$. Clearly among all such rate-tuples we are interested in the one that maximizes the weighted sum rate. Hence, without loss of optimality with respect to (1), with each $\underline{U} \subseteq \underline{\epsilon}$ we can associate a rate-tuple in $\underline{P}(\underline{U}, f) \cap \underline{B}(\underline{U})$ that maximizes the weighted sum rate. Consequently, we define the following set function that determines the reward obtained upon selecting any subset of $\underline{\epsilon}$. We define the set function $h: 2^{\underline{\epsilon}} \to \mathbb{IR}_+$ as $$h(\mathcal{U}) = \max_{r=[r_e]_{e \in \mathcal{U}}} \sum_{e \in \mathcal{U}} \alpha_e r_e \quad (9)$$

$$\text{s.t. } r \in \mathcal{P}(\mathcal{U} \cdot f) \cap \mathcal{B}(\mathcal{U}). \; \forall \mathcal{U} \subseteq \mathcal{E}. \quad (10)$$

Let us now consider the control channel overhead constraints. Let L denote the number of search regions and recall that each user is associated with only one search region. We associate each element $\underline{e}$ with the search region of $u_e$. Let $\pi: \underline{\epsilon} \to \{1, \ldots, |\underline{\epsilon}|\}$ denote a bijective mapping and let $x_{\underline{U}}$ denote the characteristic vector of any subset $\underline{U} \subseteq \underline{\epsilon}$, i.e., $x_{\underline{U}}$ is a binary valued $|\underline{\epsilon}|$ length vector having ones in positions $\{\pi(\underline{e})\}_{\underline{e} \in \underline{U}}$ and zeros elsewhere. Then the control channel overhead constraints can be represented as L packing (knapsack) constraints such that a subset U is feasible if and only if $$A_C x_{\underline{U}} \leq 1_L, \quad (11)$$

where $A_C \in [0,1]^{L \times |\underline{\epsilon}|}$ and $1_L$ is a L length vector of ones. Note that any element $\underline{e} \in \underline{\epsilon}$ can be involved in only one of the L knapsack constraints, which in particular corresponds to the search region assigned to user $u_e$.

Finally, let us consider the interference limit constraints. Suppose that the cell of interest is surrounded by M adjacent cells (or sectors). Let $e_m$ be an N-length vector of binary valued elements which conveys the RBs such that the total interference caused to the $m^{th}$ base station over all the RBs in $e_m$ should be no greater than a specified upper bound. In particular, let $R_{u,m}$ be the (wide-band) correlation matrix of the channel seen at the $m^{th}$ base station from the $u^{th}$ user in the cell of interest. Then the total interference caused to the $m^{th}$ base station over all the RBs indicated in $e_m$, upon selecting elements in any set $\underline{U} \subseteq \underline{\epsilon}$ is equal to $$\sum_{e \in \mathcal{U}} \frac{p_e tr(W_e^\dagger R_{u_e,m} W_e)(c_e^T c_m)}{\beta_{e,m}} \quad (12)$$

Then, we are allowed to select any set of elements $\underline{U} \subseteq \underline{\epsilon}$ such that the resulting total interference imposed on the $m^{th}$ base station over all the RBs indicated in $e_m$ is no greater than a specified upper bound $\gamma_{(m)}$, i.e., such that $$\frac{1}{\gamma(m)} \sum_{e \in \mathcal{U}} \mathcal{B}_{e,m} \leq 1, \forall 1 \leq m \leq M.$$

Thus, all the interference limit constraints can be represented as M packing (knapsack) constraints given by $$A_I x_{\underline{U}} \leq 1_M, \quad (13)$$

where $A_I \in [0,1]^{M \times |\underline{\epsilon}|}$ and $1_M$ is a M length vector of ones.

Summarizing the aforementioned results, we have formulated (1) as the following optimization problem:

$$\max_{\mathcal{U} \subseteq \mathcal{E}} \{h(\mathcal{U})\} \text{ s.t.} \quad (14)$$

$$\mathcal{U} \in \mathcal{I}:$$

$$A_I x_{\mathcal{U}} \leq 1_M: A_C x_{\mathcal{U}} \leq 1_L$$

In (14) we regard M, L as constants that are arbitrarily fixed. Then, for a given number of users K, number of RBs N and the codebook cardinality $|\mathcal{W}|$ (which together fix the size of the ground set $\underline{\epsilon}$), an instance (or input) of the problem in (14) consists of a set of user weights $\{\alpha_u\}$ and queue sizes $\{Q_u\}$, per-user per-RB channel matrices $\{H_u^{(n)}\}$: $1 \leq u \leq K$, $1 \leq n \leq N$, a codebook $\mathcal{W}$ (of cardinality $|\mathcal{W}|$) along with the matrices $A_C \in [0,1]^{L \times |\underline{\epsilon}|}$ and $A_I \in [0,1]^{M \times |\underline{\epsilon}|}$. The output is a subset $\hat{\underline{U}} \subseteq \underline{\epsilon}$ along with a rate-tuple $r_{\underline{U}}$. Note that the cardinality of the ground set $|\underline{\epsilon}|$ is $O(K|\mathcal{W}|N^4)$.

We first introduce the following two results that will be invoked later.

Lemma 1 The family of subsets $\underline{I}$ defined in (4) is an independence family and $(\underline{\epsilon}, \underline{I})$ is a partition matroid.

Proof: First we note that $\underline{I}$ is downward closed, i.e., if $\underline{A} \in \underline{I}$ then any $\underline{B} \subseteq \underline{A}$ satisfies $\underline{B} \in \underline{I}$. Next, let $\underline{\epsilon}_{(k)}$ denote the set of all $\underline{e} \in \underline{\epsilon}: u_e = k$ and notice that $\underline{\epsilon}_{(k)} \cap \underline{\epsilon}_{(j)} = \Phi, \forall k \neq j$. Then, note that $\underline{I}$ can also be defined as $\underline{A} \in \underline{I} \Leftrightarrow |\underline{A} \cap \underline{\epsilon}_{(k)}| \leq 1 \forall 1 \leq k \leq K$. Further, it can be verified $\underline{I}$ satisfies the exchange property, i.e., for any $\underline{A}, \underline{B} \in \underline{I}$ such that $|\underline{A}| > |\underline{B}|$ we have that $\exists \underline{e} \in \underline{A} \backslash \underline{B}$ such that $\underline{B} \cup \{\underline{e}\} \in \underline{I}$. Thus, we can conclude that $(\underline{\epsilon}, I)$ is a partition matroid.

The proof of the following lemma follows from basic definitions [21] and is skipped for brevity.

Lemma 2 The region $\underline{P}(\underline{U}, f) \cap \underline{B}(\underline{U}), \forall \underline{U} \subseteq \underline{\epsilon}$ is a polymatroid characterized by the rank function $f': 2^{\underline{\epsilon}} \to \mathbb{IR}_+$ where $$f'(\mathcal{U}) = \min_{\mathcal{R} \subseteq \mathcal{U}} \left\{ f(\mathcal{U} \backslash \mathcal{R}) - \sum_{e \in \mathcal{R}} Q_e \right\}, \quad \forall \mathcal{U} \subseteq \mathcal{E}. \quad (15)$$

We are now ready to offer our main result. Let us assume that computing h(U) for any $U \subseteq \epsilon$ incurs a unit cost. We will show that even under this assumption the problem in (14) is NP hard.

Theorem 1 The optimization problem in (14) is NP hard and is the maximization of a monotonic sub-modular set function subject to one matroid and multiple knapsack constraints. For a fixed number of knapsack constraints and any arbitrarily fixed $\epsilon > 0$, there exists a randomized algorithm whose complexity scales polynomially in $|\underline{\epsilon}|$ and which yields a $1 - 1/e - \epsilon$ approximation to (14).

Proof: We will first show that (14) is the maximization of a monotonic sub-modular set function subject to one matroid and multiple knapsack constraints. Invoking Lemma 1, it suffices to show that the function h(.) is a monotonic sub-modular set function. From the definition of h(.) in (9) it is readily seen that it is monotonic, i.e., $h(U') \leq h(U)$, $\forall U' \subseteq U \subseteq \epsilon$. Let o(.,.) denote an ordering function such that for any subset $\underline{U} \subseteq \underline{\epsilon}$, $o(\underline{U}, k)$ is the element having the $k^{th}$ largest weight among the elements in $\underline{U}$. Hence we have that $\alpha_{o(\underline{U},1)} \geq \alpha_{o(\underline{U},2)} \geq \alpha_{o(\underline{U},|\underline{U}|)}$. Further, let us adopt the convention that for any subset $\underline{U} \subseteq \underline{\epsilon}$, $o(\underline{U}, k) = \Phi, \forall k \geq |U|+1$ & $\alpha_\Phi = 0$. We can now invoke Lemma 2 together with the important property that the rate-tuple in any polymatroid that maximizes the weighted sum is determined by the corner point of that polymatroid in which the elements are arranged in the non-increasing order of their weights [21]. Thus, we can express h(.) as $$h(\mathcal{U}) = \sum_{k=1}^{|\mathcal{U}|} (\alpha_{o(\mathcal{U},k)} - \alpha_{o(\mathcal{U},k+1)}) f'(\{o(\mathcal{U}, 1), \ldots, o(\mathcal{U}, k)\}), \quad (16)$$

$$\forall \mathcal{U} \subseteq \mathcal{E}.$$

A key step is to express (16) as $$h(\mathcal{U}) = \sum_{k=1}^{|\mathcal{E}|} (\alpha_{o(\mathcal{E},k)} - \alpha_{o(\mathcal{E},k+1)}) \underbrace{f'(\{o(\mathcal{E}, 1), \ldots, o(\mathcal{E}, k)\} \cap \mathcal{U})}_{f'_k(\mathcal{U})}, \quad (17)$$

$$\forall \mathcal{U} \subseteq \mathcal{E}.$$

It can be verified that since $f(.)$ is monotonic and submodular, each set function $$f'_k(\underline{U}) = f'(\{o(\underline{e},1),\ldots,o(\underline{e},k)\} \cap \underline{U}), \forall \underline{U} \subseteq \underline{e}. \quad (18)$$

is also a monotonic and submodular set function. From (17) it can be inferred that since h(.) is a weighted sum of monotonic submodular functions in which all the weights are non-negative, it is a monotonic submodular set function. Thus, (14) is the maximization of a monotonic submodular set function subject to one matroid and multiple knapsack constraints. Assuming that the number of knapsack constraints in (14) is fixed (i.e., M, L are fixed) and referring to [7], wherein the maximization of a generic submodular function subject to one matroid and a multiple albeit fixed number of knapsack constraints is considered, we can obtain a randomized algorithm whose complexity is polynomial in $|\underline{e}|$ and which offers the aforementioned guarantee.

We will now show that (14) is an NP hard problem. We will consider instances of the problem where the number of RBs N=1, all users have identical weights and one transmit antenna each and where the codebook $\mathcal{W}$ is degenerate, i.e., $\mathcal{W} = 1$. Thus, we have $|\underline{e}|=K$. In addition, we assume that the number of receive antennas is equal to the number of users K so that a given input of user channels forms a K×K matrix, denoted here by $H=[h_k]_{k-1}^K$. Further, we will assume only one knapsack constraint which in particular is a cardinality constraint on the number of users that can be scheduled on the one available RB. We will show that the problem specialized to these instances is also NP-hard so that the original problem is NP-hard. Note that the matroid constraint now becomes redundant and (14) simplifies to maximizing the sum rate under a cardinality constraint $$\max_{\substack{D=diag\{d_1,\ldots,d_K\} \\ d_k \in \{0,1\} \forall k \ \& \ \sum_{k=1}^K d_k \leq C}} \log|I + HDH^\dagger|, \quad (19)$$

where $1 \leq C \leq K$ is the input maximum cardinality. Now using the determinant equality $$\log|I + HDH^\dagger| = \log|I + DH^\dagger HD| \quad (20)$$

together with the monotonicity of the objective function, we can re-write (19) as $$\max_{\substack{D=diag\{d_1,\ldots,d_K\} \\ d_k \in \{0,1\} \forall k \ \& \ \sum_{k=1}^K d_k = C}} \log|I + DH^\dagger HD|. \quad (21)$$

Note that (21) is equivalent to determining the C×C principal sub-matrix of the positive definite matrix $I+H^\dagger H$ having the maximum determinant. Note that for a given K, an instance of the problem in (21) is the matrix H together with C. We will prove that (21) is NP-hard via contradiction. Suppose now that an efficient algorithm (with a complexity polynomial in K) exists that can optimally solve (21) for any input K×K matrix H and any C: $1 \leq C \leq K$. This in turn would imply that there exists an efficient algorithm (with a complexity polynomial in K) that for any input C: $1 \leq C \leq K$ and any K×K positive definite matrix $\Sigma$, can determine the C×C principal sub-matrix of $\Sigma$ having the maximum determinant. Invoking the reduction developed in [22], this would then contradict the NP hardness of the problem of determining whether a given input graph has a clique of a given input size.

We remark that upon specializing the algorithm from [7] (which considers the maximization of any submodular function subject to one matroid and multiple knapsack constraints), we obtain an algorithm that has a good guarantee but a high complexity (since it involves partial enumeration). Another simpler randomized algorithm is indeed possible as shown in the result below.

Theorem 2 There is a randomized algorithm whose complexity scales polynomially in $|\underline{e}|$ and which yields $$a \frac{e-1}{e^2(M+2) + o(M)}$$

approximation to (14).

proof: The key observation is that the partition matroid constraint in (14) can be expressed as K linear packing constraints (one for each user). Let $A_P$ denote the resulting K×$|\underline{e}|$ packing matrix whose $k^{th}$ row corresponds to the $k^{th}$ user. Note that this row has ones in each position for which the corresponding element $\underline{e}$ satisfies $u_e=k$ and zeros elsewhere. Together these K packing constraints are sparse packing constraints wherein in each column a non-zero entry appears only once. Similarly, since each user is assigned only one control region, all elements associated with the same user can be involved in only one out of the the L control channel overhead constraints. Thus, the total K+L+M packing constraints are sparse constraints in which each element can appear in at-most M+2 constraints so that each column can have at-most M+2 non-zero entries. With this understanding, we can invoke the randomized algorithm from [8] which is applicable to the maximization of any monotonic submodular function subject to sparse packing constraints and obtain the guarantee claimed in the theorem.

Notice that since any monotonic submodular set function is also monotonic and sub-additive, we can infer the following result from Theorem 1

Lemma 3 The function h(.) defined in (9) is sub-additive, i.e., $$h(U) \leq h(U_1) + h(U_2), \forall U_1, U_2 U: U_1 \cup U_2 = U. \quad (22)$$

We note that while both the aforementioned randomized algorithms involve solving a continuous relaxation of (14) using a continuous greedy procedure [23], the rounding with alteration method proposed in [8] to obtain a feasible solution is significantly simpler. However, for practical implementation an even simpler combinatorial (deterministic) algorithm is required. Unfortunately, as remarked in [7], it is difficult to design combinatorial (deterministic) algorithms that can combine both matroid and knapsack constraints. Nevertheless in Algorithm I we specialize a well known greedy algorithm to our problem of interest (14). The following result provides the worst-case guarantee offered by Algorithm I.

Theorem 3 The complexity of Algorithm I is $O(K^2N^4|\mathcal{W}|)$ and it yields a $1/K$ approximation to (14). Further, if each knapsack constraint is a matroid constraint then Algorithm I yields a $$\frac{1}{3+M}$$

approximation to (14).

Proof: We first consider the complexity of Algorithm I and note that since the partition matroid constraint needs to be satisfied, there can be at-most K steps in repeat-until loop of the algorithm. Also, recall that the the size of the ground set $\underline{\epsilon}$ is $O(KN^4|\mathcal{W}|)$. Then, at each step we need to compute $h(\underline{S} \cup \underline{e})$ for each $\underline{e} \in \underline{\epsilon} \setminus \underline{S}$ such that $\underline{S} \cup \underline{e}$ satisfies all the constraints. Thus, the worst-case complexity is $O(K^2N^4|\mathcal{W}|)$.

TABLE 1

ALGORITHM I: GREEDY ALGORITHM
FOR LTE-A UL MU-MIMO

1: Initialize $\underline{S} = \phi$
2: Repeat
3: Determine $$\hat{\underline{e}} = \arg \max_{\substack{\underline{e} \in \underline{\epsilon} \setminus \underline{S} \\ \underline{S} \cup \underline{e} \in \mathcal{I}\ ;A_I \times \underline{S} \cup \underline{e} < 1M; A_C \times \underline{S} \cup \underline{e} < 1_L}} \{h(\underline{S} \cup \underline{e})\} \quad (23)$$

4: If $\hat{v} \geq 0$ Then
5: $\underline{S} \leftarrow \underline{S} \cup \underline{e}$
6: End If
7: Until $\hat{v} \leq 0$ $\hat{\underline{e}}$ $\phi$
8: Output $\underline{S}$.

Let us now consider the approximation guarantees. Notice that due to the partition matroid constraint any optimal solution to (14) cannot contain more that K elements. Then, using the subadditivity of $h(.)$ shown in Lemma 3 together with the fact that in its first step Algorithm I selects the element of $\underline{\epsilon}$ having the highest weighted rate suffice to prove the $1/K$ guarantee. On the other hand, suppose that all knapsack constraints are matroid constraints (over all instances). For any instance, let $(\underline{\epsilon}, I_l)$ denote the matroid corresponding to the $l^{th}$ control channel constraint, where we let $I_l$ denote the independence family. Thus the set of elements that satisfy all the control channel overhead constraints belong to the matroid intersection $\cap_{l=1}^{L}(\underline{\epsilon}, I_l)$. Now recall that the control channel constraints involve mutually non-overlapping users and hence mutually non-overlapping elements of $\underline{\epsilon}$. Let $\underline{\epsilon}_l$ denote the set of elements involved in the $l^{th}$ control channel constraint (i.e., all elements for which the entry in the $l^{th}$ row of $A_C$ is non-zero) and $I'_l$ denote the set of all subsets of $\underline{\epsilon}_l$ that satisfy the $l^{th}$ control channel constraint. We see that $(\underline{\epsilon}_l, I'_l)$ is a matroid since $I'_l$ is downward closed and satisfies the exchange property.[3] More importantly $$\cap_{l=1}^{L}(\underline{\epsilon}, I_l) = \cup_{l=1}^{L}(\underline{\epsilon}_l, I'_l), \quad (24)$$

where $\circ_{l=1}^{L}(\underline{\epsilon}_l, I_l)$ denote the union of matroids and hence is itself a matroid on $\underline{\epsilon}$. We caution that the union of matroids is a different operation than what one might expect [21]. Thus, the L control channel overhead constraints indeed are identical to one matroid constraint. Then, combining with the partition matroid and the other M (interference limit) matroid constraints, we see that the feasible subsets belong to the intersection of $p=M+2$ matroids and hence form a $p$-system where $p=M+L+1$. Then invoking the guarantee offered by the greedy algorithm on a $p$-system [24,25], proves the second part.

Recall that hitherto we have assumed that computing $h(\underline{U})$ for any $\underline{U} \subseteq \underline{\epsilon}$ incurs a unit cost. We can indeed show that Algorithm I has polynomial complexity under a stricter notion that computing $f(\underline{U})$ (instead of $h(\underline{U})$) for any $\underline{U} \subseteq \underline{\epsilon}$ incurs a unit cost.[4] To show this, it suffices to prove that $h(\underline{U})$ can be determined with a complexity polynomial in $|\underline{U}|$. A key observation towards this end is that for any $\underline{U} \subseteq \underline{\epsilon}$, $f'(\underline{U})$ in (15) can be computed as $$f'(\mathcal{U}) = \sum_{e \in \mathcal{U}} Q_e + \min_{\mathcal{R} \subseteq \mathcal{U}} \{f(\mathcal{R}) - \sum_{e \in \mathcal{R}} Q_e\}, \forall \mathcal{U} \subseteq \varepsilon. \quad (25)$$

Then, since the function $f(\underline{R}) - \Sigma_{e \in \underline{R}} Q_e$, $\forall \underline{R} \subseteq \underline{\epsilon}$ is a sub-modular set function, we can solve the minimization in (25) using submodular function minimization routines that have a complexity polynomial in $|\underline{U}|$ [26,27]. Thus, from (16) we can conclude that $h(\underline{U})$ can indeed be determined with a complexity polynomial in $|\underline{U}|$.

We now propose simple observations that can considerably speed up the greedy algorithm Lazy evaluations. An important feature that speeds up the greedy algorithm substantially has been discovered and exploited in [28,29]. In particular, due to the submodularity of the objective function the incremental gain offered by an element over any selected subset of elements not including it decreases monotonically as the selected subset grows larger. Thus, at any step in the algorithm, given a set of selected elements $\underline{S}$ and an element $\underline{e} \in \underline{\epsilon} \setminus \underline{S}$ for which $h(\underline{S} \cup \underline{e})$ has been evaluated, we do not have to evaluate $h(\underline{S} \cup \underline{e}')$ for another element $\underline{e}' \in \underline{\epsilon} \setminus \underline{S}$, if we can assert that $h(\underline{S} \cup \underline{e}) - h(\underline{S}) \geq h(\underline{S}'^{\circ}\underline{e}') - h(\underline{S}')$ where $\underline{S}' \subseteq \underline{S}$ denotes the set of selected elements at a previous step. This results in no loss of optimality with respect to the original greedy algorithm.

Exploiting subadditivity. Suppose that at any step of the greedy algorithm we have a set of selected elements $\underline{S}$. Further, let $\underline{e}_1 = (u, W, c_1)$ and $\underline{e}_2 = (u, W, c_2)$ be two elements in $\underline{\epsilon} \setminus \underline{S}$ such that $c_1$ and $c_2$ comprise of only one chunk each and are mutually non-intersecting. Then, letting $\underline{e}' = (u, W, c_1 + c_2)$, we see that $$h(\underline{S} \cup \underline{e}') \leq h(\underline{S} \cup \underline{e}_1 \cup \underline{e}_2) \leq h(\underline{S} \cup \underline{e}_1) + h(\underline{S} \cup \underline{e}_2) \quad (26)$$

where the first inequality stems from the fact that $h(\underline{S} \cup \underline{e}')$ is monotonically increasing in the transmit PSD of $\underline{e}'$ and the second inequality stems from the monotonicity and subadditivity of $h(.)$. Thus, we have that $$h(\underline{S} \cup \underline{e}') \leq 2 \max\{h(\underline{S} \cup \underline{e}_1), h(\underline{S} \cup \underline{e}_2)\}. \quad (27)$$

Then if $\underline{S} \cup \underline{e}_1$, $\underline{S} \cup \underline{e}_2$ as well as $\underline{S} \cup \underline{e}'$ satisfy all the constraints, we can evaluate $h(\underline{S} \cup \underline{e}_1)$, $h(\underline{S} \cup \underline{e}_2)$ and skip evaluating $h(\underline{S} \cup \underline{e}')$. By adopting this procedure over all elements in $\underline{\epsilon} \setminus \underline{S}$, we can ensure that the element selected will offer at-least ½ the gain yielded by the locally optimal element.

Then, using a well known result on the greedy algorithm with an approximately optimal selection at each step [24,25] we can conclude that this variation of our greedy algorithm will yield an approximation guarantee $$\frac{1/2}{1/2+M+2}$$

of when all knapsack constraints are matroid constraints.

Some remarks on the performance of Algorithm I are due. Clearly the approximation guarantee is much better when all knapsack constraints are matroid constraints. When the matrices $A_I$, $A_C$ have rational valued elements, necessary and sufficient conditions for a knapsack constraint to be matroid constraint have been derived in [30]. A simple sufficient condition for a knapsack constraint to be matroid constraint is the following.

Assumption 1 The $i^{th}$ knapsack constraint is a matroid constraint if all its strictly positive coefficients are identical, i.e., $1\{A_{i,j}>0\}=1\{A_{i,k}>0\} \Rightarrow A_{i,j}=A_{i,k}$, $\forall j,k$.

Situations when the above assumption is satisfied in practise are common and occur when:

- The control channel overhead constraints are modeled as cardinality constraints. Here each control channel overhead constraint is a cardinality constraint on the users assigned to the corresponding search region. Thus all the control channel overhead constraints satisfy Assumption 1 and hence are matroid constraints.
- For each adjacent base-station, the elements of $\underline{\epsilon}$ are divided into two sets using an appropriate threshold: one set comprising those which cause high interference and the other one comprising those which do not. Then a cardinality constraint is imposed only on the set of elements that cause high interference. Thus, all resulting interference limit constraints satisfy Assumption 1 and are matroid constraints.

Indeed a better guarantee for the greedy algorithm can be claimed when Assumption 1 is satisfied. The following result follows from the fact that when Assumption 1 is satisfied by each control channel constraint, then the intersection of the partition matroid and the L control channel constraints is in-fact a single matroid on $\underline{\epsilon}$.

Theorem 4 If all knapsack constraints are matroid constraints and each control channel constraint further satisfies Assumption 1, then Algorithm I yields a $$\frac{1}{2+M}$$

approximation to (14).

Finite alphabet constraints:

In practise every user $u \in \{1, \ldots, K\}$ can transmit using an alphabet of cardinality at-most $S_u$ on each of its assigned RBs. In this section we impose a finite alphabet constraint by enforcing that the rate assigned to each user should be decomposable as a sum of rates over its assigned RBs and that the rate on each assigned RB should not exceed $\log|S_u|$, the latter being the maximum rate that can be achieved with any alphabet of cardinality $|S_u|$. For each element $\underline{e} \in \underline{\epsilon}$ with $u_{\underline{e}}=u$, we define its maximum alphabet size as $S_{\underline{e}}=S_u$. We first define a rank function $f^{(n)}:2^{\underline{\epsilon}} \to IR_+$ for each $1 \leq n \leq N$, as $$f^{(n)}(\underline{\mathcal{U}}) = \log\left|I + \sum_{\underline{e} \in \underline{\mathcal{U}}} p_{\underline{e}} c_{\underline{e}}(n) H_{\underline{e}}^{(n)} W_{\underline{e}} (H_{\underline{e}}^{(n)} W_{\underline{e}})^\dagger\right|, \forall \underline{\mathcal{U}} \subseteq \underline{\epsilon}, \quad (28)$$

along with the polymatroid $$\underline{\mathcal{P}}^{(n)}(\underline{\mathcal{U}}, f^{(n)}) = \left\{r^{(n)} \in IR_+^{|\underline{\mathcal{U}}|}: \sum_{\underline{e} \in \underline{\mathcal{A}}} r_{\underline{e}}^{(n)} \leq f^{(n)}(\underline{\mathcal{A}}), \forall \underline{\mathcal{A}} \subseteq \underline{\mathcal{U}}\right\}. \quad (29)$$

We then recall the following useful result that can be inferred from [5]

Lemma 4 The region $\underline{P}(\underline{U}, f)$ and the region $$\left\{r = \sum_{n=1}^{N} r^{(n)}: r^{(n)} \in \underline{\mathcal{P}}^{(n)}(\underline{\mathcal{U}}, f^{(n)}) \forall n\right\}, \quad (30)$$

are identical.

Consequently, we can impose decodability and finite alphabet constraints by enforcing that any rate tuple r assigned to a given subset $\underline{U}$ of selected elements must be decomposable as $$r = \sum_{n=1}^{N} r^{(n)}: r^{(n)} = [r_{\underline{e}}^{(n)}]_{\underline{e} \in \underline{\mathcal{U}}} \in \underline{\mathcal{P}}^{(n)}(\underline{\mathcal{U}}, f^{(n)}) \& r_{\underline{e}}^{(n)} \leq \log|S_{\underline{e}}|, \quad (31)$$

$$\forall \underline{e} \in \underline{\mathcal{U}}, 1 \leq n \leq N.$$

This ensures that the assigned rate tuple will not require a scheduled user to violate its alphabet cardinality constraint on any of its assigned RBs. Then, accommodating the buffer constraints as well, we impose that any rate tuple r assigned to a given subset $\underline{U}$ of selected elements must satisfy $$r \in \underline{\mathcal{B}}(\underline{\mathcal{U}}) \& r = \quad (32)$$

$$\sum_{n=1}^{N} r^{(n)}: r^{(n)} = [r_{\underline{e}}^{(n)}]_{\underline{e} \in \underline{\mathcal{U}}} \in \underline{\mathcal{P}}^{(n)}(\underline{\mathcal{U}}, f^{(n)}) \& r_{\underline{e}}^{(n)} \leq \log|S_{\underline{e}}|,$$

$$\forall \underline{e} \in \underline{\mathcal{U}}, 1 \leq n \leq N.$$

We next offer the following result.

Theorem 5 For any choice of selected elements $\underline{U} \subseteq \underline{\epsilon}$, the set of rate vectors that satisfy (32) is identical to the polymatroid $\underline{T}(\underline{U},g')$ which is characterized by the rank function $$g'(\underline{\mathcal{U}}) = \min_{\underline{\mathcal{R}} \subseteq \underline{\mathcal{U}}} \left\{g(\underline{\mathcal{U}} \backslash \underline{\mathcal{R}}) + \sum_{\underline{e} \in \underline{\mathcal{R}}} Q_{\underline{e}}\right\}, \forall \underline{\mathcal{U}} \subseteq \underline{\epsilon}, \quad (33)$$

where $$g(\underline{\mathcal{U}}) = \sum_{n=1}^{N} g^{(n)}(\underline{\mathcal{U}}), \quad (34)$$

$$g^{(n)}(\underline{\mathcal{U}}) = \min_{\underline{\mathcal{R}} \subseteq \underline{\mathcal{U}}} \left\{f^{(n)}(\underline{\mathcal{U}} \backslash \underline{\mathcal{R}}) + \sum_{\underline{e} \in \underline{\mathcal{R}}} S_{\underline{e}}\right\}, \forall n, \underline{\mathcal{U}} \subseteq \underline{\epsilon}. \quad (35)$$

Proof: We start by invoking Lemma 2 to deduce that the region $$\mathcal{P}^{(n)}(\mathcal{U}, f^{(n)}) = \qquad (36)$$
$$\{r^{(n)} \in I\!R_+^{|\mathcal{U}|} : \sum_{e \in \mathcal{A}} r_e^{(n)} \leq f^{(n)}(\mathcal{A}), \forall \mathcal{A} \subseteq \mathcal{U} \& r_e^{(n)} \leq \log|S_e|, \forall e \in \mathcal{U}\}$$

is a polymatroid with rank function $g^{(n)}(\underline{U})$ defined in (35). Thus, for any given subset of elements $\underline{U}$ the rate region of interest defined in (31) can also be expressed as $$\{r \in I\!R_+^{|\mathcal{U}|} : r = \sum_{n=1}^{N} r^{(n)}, r^{(n)} \in \mathcal{P}^{(n)}(\mathcal{U}, f^{(n)}) \forall n\}. \qquad (37)$$

Define the function g(.) as in (34) and notice that g(.) is also a rank function so that the region $$\underline{\mathcal{T}}(\mathcal{U}, g) = \{r \in I\!R_+^{|\mathcal{U}|} : \sum_{e \in \mathcal{A}} r_e \leq g(\mathcal{A}), \forall \mathcal{A} \subseteq \mathcal{U}\} \qquad (38)$$

is also a polymatroid. Then along similar lines as Lemma 4, we can show that the rate region defined in (31) and $\underline{T}(\underline{U},g)$ are identical. Thus, for any given subset of elements $\underline{U}$ we can impose the finite alphabet constraint by considering the rate vectors that lie in the polymatroid $\underline{T}(\underline{U},g)$. Finally we can impose queue constraints as well by considering instead the rate region $\underline{T}(\underline{U},g') = \underline{T}(\underline{U},g) \cap \underline{B}(\underline{U})$ which is identical to the region defined in (32). The fact that $\underline{T}(\underline{U},g')$ is a polymatroid characterized by a rank function g'(.) defined in (33) follows upon again invoking Lemma 2.

Upon by defining $$h'(\mathcal{U}) = \max_{r=[r_e]_{e \in \mathcal{U}}} \sum_{e \in \mathcal{U}} \alpha_e r_e$$

s.t. $r \in \mathcal{T}(\mathcal{U}, g'), \forall \mathcal{U} \subseteq \varepsilon,$ we consider the optimization problem $$\max_{\mathcal{U} \subseteq \varepsilon} \{h'(\mathcal{U})\} \text{ s.t.} \qquad (39)$$

$$\mathcal{U} \in \mathcal{I};$$

$$A_I x_{\mathcal{U}} \leq 1_M; A_C x_{\mathcal{U}} \leq 1_L.$$

As before, it can be shown h'(.) is a monotonic submodular set function so that the optimization problem in (39) is the maximization of a monotonic submodular function subject to one matroid and multiple knapsack constraints. Algorithm I and its associated results are thus applicable. We note that while h'(U) can also be computed with polynomial complexity for any $U \subseteq \varepsilon$, it is more complex than computing h(U).

MU-MIMO Scheduling in the LTE UL

We now consider UL MU-MIMO scheduling in LTE systems. As opposed to the LTE-A MU-MIMO scheduling there are three main differences.

Each user can be assigned at-most one contiguous chunk of RBs. The set C now contains N length vectors such that any $c \in C$ contains a contiguous sequence of ones with the remaining elements being zero.

Each user can transmit using only one power amplifier due to cost constraints. Thus, only a basic precoding in the form of transmit antenna selection is possible so that the precoding codebook $\mathcal{W}$ is now a set of unit vectors, each corresponding to a particular choice of transmit antenna.

Figure 2:
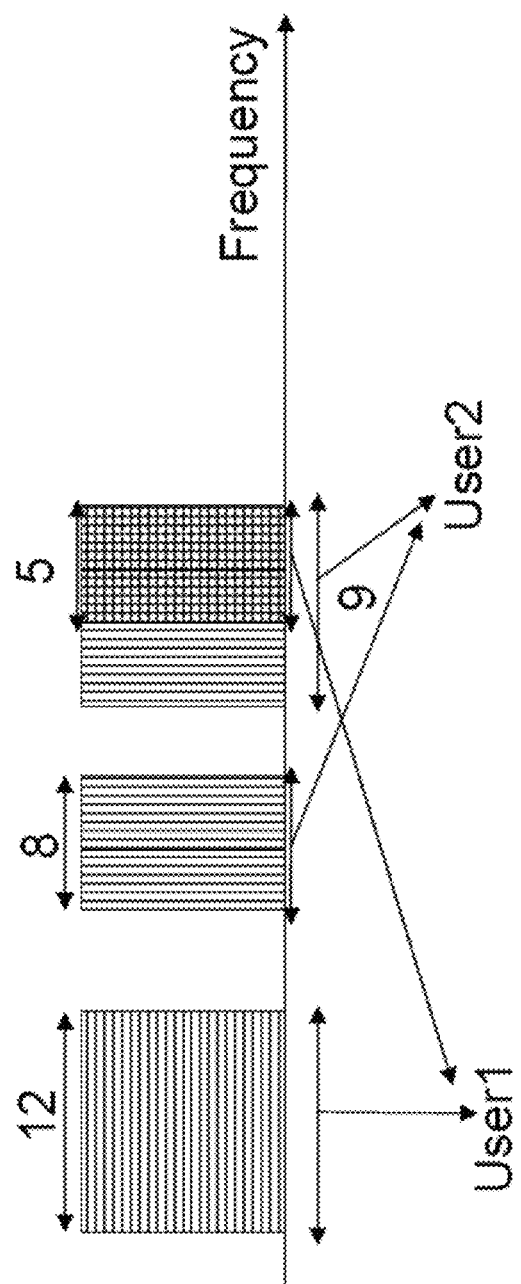
FIG. 2 is a schematic diagram depicting a feasible RB allocation in the LTE-A UL according to an aspect of the present disclosure.

There should be a complete overlap among co-scheduled users. In other words if any two users are co-scheduled on an RB then those two users must be co-scheduled on all their assigned RBs. Feasible RB allocation and co-scheduling of users in LTE multi-user uplink is depicted in FIG. 2.

At-most T users can be co-scheduled on a given RB. This restriction stems from the limited number of pilot sequences and the fact that the LTE UL receiver is expected to be a simple receiver. T is expected to be small number typically two and no greater than four.

The third constraint which demands complete overlap among users who share even one RB cannot be formulated as a matroid constraint and would require a large number of knapsack constraints (that would depend on both K and N). In addition the region of rates that can be achieved by simple receivers does not form a polymatroid. This renders the previous approach used for LTE-A scheduling unworkable. Fortunately, this constraint along with the one which mandates at-most one chunk per scheduled user facilitate the use of a local ratio test (LRT) based method. LRT was developed in [10] and has been used for interval scheduling problems among others. Recently it was used in [11] to develop a constant-factor (½) approximation algorithm for the LTE SU-MIMO problem in which at-most one user can be assigned to each RB and where there are no knapsack constraints. In the following we closely follow the notation developed by [11]. We fully exploit the power of the LRT technique by accommodating MU-MIMO scheduling with $J \geq 1$ knapsack constraints. We will assume that T and J are constants.

Let us define a set U as $$U = \{U \subseteq \{1, \ldots, K\} : |U| \leq T\} \qquad (40)$$

and let $\mathcal{M} = U \times C$. For any $c \in C$, we adopt the convention that $i \in c$ if the $i^{th}$ element of c is one. We will use Tail(c) (Head(c)) to return the largest (smallest) RB index that contains a one in c. Thus, each $c \in C$ has ones in all positions Head(c), . . . , Tail(c) and zeros elsewhere. We can now pose the resource allocation problem as $$\max \sum_{(\mathcal{U},c) \in \mathcal{M}} p(\mathcal{U}, c) \chi(\mathcal{U}, c), \text{ s.t.} \qquad (41)$$

For each user $u$, $\sum_{\substack{(\mathcal{U},c) \in \mathcal{M} \\ \mathcal{U}: u \in \mathcal{U}}} \chi(\mathcal{U}, c) \leq 1$, For each RB $i$, $\sum_{\substack{(\mathcal{U},c) \in \mathcal{M} \\ c: i \in c}} \chi(\mathcal{U}, c) \leq 1$, $$\sum_{(\mathcal{U},c) \in \mathcal{M}} \beta^q(\mathcal{U}, c) \chi(\mathcal{U}, c) \leq 1, 1 \leq q \leq J$$

where X(U,c) is an indicator function that returns one if users in U are co-scheduled on the chunk indicated by c. Without loss of generality, we assume that the weight of the pair (U,c) in the $q^{th}$ knapsack, $\beta^q(U,c)$, lies in the interval [0,1]. p(U,c) denotes the weighted sum-rate obtained upon co-scheduling the users in U on the chunk indicated by c. We note that there is complete freedom with respect to the computation of p(U,c). Indeed, it can accommodate buffer and practical MCS constraints, account for any particular receiver employed at the base station and can incorporate any rule to assign a precoder and a power level to each user in U over the chunk c. An interesting observation is that the LRT method that will be used to solve (41) in the sequel, can also be used to obtain a feasible allocation to (14). However, it breaks down when we try to extend it to allocations with arbitrary partial overlaps and up-to two chunks per user. This is because in that case the objective function cannot be expressed as a separable sum of functions, each function depending only on a pair (U,c).

$q \leq J$}. We then define J sets, $V^{(1)}, \ldots, V^{(J)}$, over $\mathcal{M}^{wide}$ as $(U,c) \in V^{(q)}$ iff $\beta^q(U,c) > \frac{1}{2}$, $1 \leq q \leq J$. Note that for a given K, N, an instance of the problem in (41) consists of $\{p(U,c)\} \forall (U,c) \in \mathcal{M}$ and $\{\beta^q(U,c)\}$, $\forall (U,c) \in \mathcal{M}$, $1 \leq q \leq J$.

Then in order to sub-optimally solve (41) we propose Algorithm II which possesses the optimality given below. Note that since T, J are fixed, $|\mathcal{M}|$ is $O(K^T N^2)$. From this the complexity of Algorithm II, which is essentially determined by that of Algorithm IIa, can be shown to be $O(K^T N^3)$.

We assume that T, J are are arbitrarily fixed. Then, for a given K, N we first partition the set $\mathcal{M}$ into two halves as $\mathcal{M} = \mathcal{M}^{narrow} \cup \mathcal{M}^{wide}$, where we define $\mathcal{M}^{narrow} = \{(U,c) \in \mathcal{M}: \beta^q(U,c) \leq \frac{1}{2}, \forall 1 \leq$ Theorem 6 The problem in (41) is NP-hard. Let $\hat{W}^{opt}$ denote the optimal weighted sum rate obtained upon solving (41) and let $\hat{W}$ denote the weighted sum rate obtained upon using Algorithm II. Then, we have that $$\hat{W} \geq \begin{cases} \frac{\hat{W}^{opt}}{1+T+2J} & \text{If } \mathcal{M}^{wide} = \phi \\ \frac{\hat{W}^{opt}}{1+T+3J} & \text{Otherwise} \end{cases} \quad (42)$$

Proof: Let us specialize (41) to instances where all the knapsack constraints are vacuous and where p(U,c)=0 whenever $|U| \geq 2$ for all $(U,c) \in \mathcal{M}$. Then (41) reduces to the SU scheduling problem considered in [11, 18] which was shown there to be NP-hard. Consequently, we can assert that (41) is NP-hard.

Next, consider first Algorithm IIa which outputs a feasible allocation over $\mathcal{M}^{narrow}$ yielding a weighted sum rate $\hat{W}^{narrow}$. Let $\hat{W}^{opt,narrow}$ denote the optimal weighted sum rate obtained by solving (41) albeit where all pairs (U,c) are restricted to lie in $\mathcal{M}^{narrow}$. We will prove that $$\hat{W}^{narrow} \geq \frac{\hat{W}^{opt,narrow}}{1+T+2J}. \quad (43)$$

We present a proof that invokes results from [11] as much as possible and highlights mainly the key differences which allow us to co-schedule multiple users on a chunk and satisfy multiple knapsack constraints. Note that Algorithm IIa builds up the stack S in N steps. In particular let $S_j, j=1, \ldots, N$ be the element that is added in the $j^{th}$ step and note that either $S_j = \Phi$ or it is equal to some pair $(U^*_j, c^*_j)$. As in [11], we use two functions $p_1^{(j)}: \mathcal{M}^{narrow} \to IR_+$ and $p_2^{(j)}: \mathcal{M}^{narrow} \to IR_+$ for $j=0, \ldots, N$ to track the function p'(,) as the stack S is being built up over N steps and in particular we set $p_1^{(0)}(U,c)=0$, $\forall (U,c) \in \mathcal{M}^{narrow}$ and $p_2^{(0)}(U,c) = p(U,c)$, $\forall (U,c) \in \mathcal{M}^{narrow}$. For our problem at hand, we define $\{p_1^{(j)}(U,c), p_2^{(j)}(U,c)\}$ recursively as $$p_1^{(j)}(\mathcal{U}, c) = \quad (44)$$
$$\begin{cases} p_2^{(j-1)}(\mathcal{U}^*_j, c^*_j)\chi(p_2^{(j-1)}(\mathcal{U}^*_j, c^*_j) > 0)\chi(p_2^{(j-1)}(\mathcal{U}, c) > 0), & \text{If } \mathcal{U} \cap \mathcal{U}^*_j \neq \phi \text{ or } c^*_j \cap c \neq \phi \\ 2p_2^{(j-1)}(\mathcal{U}^*_j, c^*_j)\chi(p_2^{(j-1)}(\mathcal{U}^*_j, c^*_j) > 0)\chi(p_2^{(j-1)}(\mathcal{U}, c) > 0) & \max_{1 \leq q \leq J} \beta^q(\mathcal{U}, c), \text{ Otherwise} \end{cases}$$

$$p_2^{(j)}(\mathcal{U}, c) = p_2^{(j-1)}(\mathcal{U}, c) - p_1^{(j)}(\mathcal{U}, c),$$

where X(.) denotes the indicator function and $$(\mathcal{U}^*_j, c^*_j) = \text{argmax}_{(\mathcal{U},c) \in \mathcal{M}^{narrow}} p_2^{(j-1)}(\mathcal{U}, c).$$
$$\text{Tail}(c)=j$$

Hence, we have that $p_2^{(j-1)}(U,c) = p_2^{(j)}(U,c) + p_1^{(j)}(U,c)$, $\forall (U,c) \in \mathcal{M}^{narrow}$, $j=1, \ldots, N$. (45)

It can be noted that $p_2^{(j)}(U,c) \leq 0$, $\forall (U,c) \in \mathcal{M}^{narrow}$:Tail$(c) \leq j$ $p_2^{(k)}(U,c) \leq p_2^{(j)}(U,c)$, $\forall (U,c) \in \mathcal{M}^{narrow}$ & $k \geq j$. (46)

Further, to track the stack S' which is built in the while loop of the algorithm, we define stacks $\{S^*_j\}_{j=0}^N$ where $S^*_N = \Phi$ and $S^*_j$ is the value of S' after the Algorithm has tried to add $\cup_{m=j+1}^N S_m$ to S' (starting from $S' = \Phi$) so that $S^*_0$ is the stack S' that is the output of the Algorithm. Note that $S^*_{j+1} \in S^*_j \subseteq S^*_{j+1} \cup S_{j+1}$. Next, for $j=0, \ldots, N$, we let $W^{(j)opt}$ denote the optimal solution to (41) but where $\mathcal{M}$ is replaced by $\mathcal{M}^{narrow}$ and the function p(,) is replaced by $p_2^{(j)}(,)$. Further, let $W^{(j)} = \Sigma_{(U,c) \in S^*_j} p_2^{(j)}(U,c)$ and note that $\hat{W}^{opt,narrow} = W^{(0)opt}$ and $\hat{W}^{narrow} = W^{(0)}$. We will show via induction that $W^{(j)opt} \leq (T+1+2J)W^{(j)}$, $\forall j=N, \ldots, 0$, (47)

which includes the claim in (43) at $j=0$. The base case $W^{(N)opt} \leq (T+1+2J)W^{(N)}$ is readily true since $S^*_N = \Phi$ and $p_2^{(N)}(U,c) \leq 0$, $\forall (U,c) \in \mathcal{M}^{narrow}$. Assume that (47) holds for some j. We focus only on the main case in which $S_j = (U^*_j, c^*_j) \neq \Phi$ (the remaining cases can be inferred from [11]). Note that since $(U^*_j, c^*_j)$ is added to the stack S in the algorithm, $p_2^{(j-1)}(U^*_j, c^*_j) > 0$. Then from the update formulas (44), we must have that $p_2^{(j)}(U^*_j, c^*_j) = 0$. Using the fact that $S^*_{j-1} \subseteq S^*_j \cup (U^*_j, c^*_j)$ together with the induction hypothesis, we can conclude that $$W^{(j)} = \sum_{(\mathcal{U},c) \in S^*_j} p_2^{(j)}(\mathcal{U}, c) = \sum_{(\mathcal{U},c) \in S^*_{j-1}} p_2^{(j)}(\mathcal{U}, c) \geq \frac{W^{(j)opt}}{T+1+2J}. \quad (48)$$

Next, we will show that $$\sum_{(\mathcal{U},c) \in S^*_{j-1}} p_1^{(j)}(\mathcal{U}, c) \geq p_2^{(j-1)}(\mathcal{U}^*_j, c^*_j). \quad (49)$$

Towards this end, suppose that $S^*_{j-1} = S^*_j \cup (U^*_j, c^*_j)$. Then, recalling (44) we can deduce that (49) is true since $p_1^{(j)}(U^*_j, c^*_j) = p_2^{(j-1)}(U^*_j, c^*_j)$. Suppose now that $S^*_{j-1} = S^*_j$. In this case we can have two possibilities. In the first one $(U^*_j, c^*_j)$ cannot not be added to $S^*_j$ due to the presence of a pair $(U',c') \in S^*_j$ for which either $U' \cap U^*_j \neq \Phi$ or $c' \cap c^*_j \neq \Phi$. Since any pair $(U',c') \in S^*_j$ was added to S in the algorithm after the $j^{th}$ step, from the second inequality in (46) we must have that $p_2^{(j-1)}(U',c') > 0$. Recalling (44) we can then deduce that $p_1^{(j)}(U',c') = p_2^{(j-1)}(U^*_j, c^*_j)$ which proves (49). In the second possibility, $(U^*_j, c^*_j)$ cannot not be added to $S^*_j$ due to a knapsack constraint being violated. In other words, for some $q \in \{1, \ldots, J\}$, we have that $$\sum_{(\mathcal{U},c) \in S^*_j} \beta^q(\mathcal{U}, c) > 1 - \beta^q(\mathcal{U}^*_j, c^*_j). \quad (50)$$

Since $(U^*_j, c^*_j) \in \mathcal{M}^{narrow}$, $\beta^q(U^*_j, c^*_j) \leq \frac{1}{2}$ so that $$2 \sum_{(\mathcal{U},c) \in S^*_j} \max_{1 \leq q \leq J} \beta^q(\mathcal{U}, c) \geq 2 \sum_{(\mathcal{U},c) \in S^*_j} \beta^q(\mathcal{U}, c) > 1. \quad (51)$$

which along with (44) also proves (49). Thus, we have established the claim in (49).

Finally, letting $V^{(j)opt}$ denote the optimal solution to (41) but where $\mathcal{M}$ is replaced by $\mathcal{M}^{narrow}$ and the function $p(,)$ is replaced by $p_1^{(j)}(,)$, we will show that $$p_2^{(j-1)}(\mathcal{U}^*_j, c^*_j) \geq \frac{V^{(j)opt}}{T+1+2J}. \quad (52)$$

Towards this end, from (44) we note that for any pair $(U,c) \in \mathcal{M}^{narrow}$, $p_1^{(j)}(U,c) \leq p_2^{(j-1)}(U^*_j, c^*_j)$. Let $V_1^{(j)opt}$ be an optimal allocation of pairs that results in $V^{(j)opt}$. For any two pairs $(U_1, c_1), (U_2, c_2) \in V_1^{(j)opt}$
we must have $U_1 \cap U_2 = c_1 \cap c_2 = \Phi$. In addition $|U_1|$ and $|U_2|$ are no greater than T. Thus we can have at-most T such pairs $\{(U_i, c_i)\}$ in $V_1^{(j)opt}$ for which $U_i \cap U^*_j = \Phi$. Further, using the first inequality in (46) we see that any pair $(U,c)$ for which $c \cap c^*_j \neq \Phi$ and $p_1^{(j)}(U,c) = p_2^{(j-1)}(U^*_j, c^*_j)$ must have Tail $(c) \geq j$ so that $j \in c$. Thus, $V_1^{(j)opt}$ can include at-most one pair $(U,c)$ for which $c \cap c^*_j \neq \Phi$. Now the remaining pairs in $V_1^{(j)opt}$ (whose users do not intersect $U^*_j$ and whose chunks do not intersect $c^*_j$) must satisfy the knapsack constraints. Let these pairs form the set $\tilde{V}_1^{(j)opt}$ so that $$\sum_{(\mathcal{U},c) \in \tilde{V}_1^{(j)opt}} p_1^{(j)}(\mathcal{U}, c) = \sum_{(\mathcal{U},c) \in \tilde{V}_1^{(j)opt}} 2 p_2^{(j-1)}(\mathcal{U}^*_j, c^*_j) \max_{1 \leq q \leq J} \beta^q(\mathcal{U}, c) \leq \quad (53)$$

$$2 p_2^{(j-1)}(\mathcal{U}^*_j, c^*_j) \sum_{q=1}^{J} \beta^q(\mathcal{U}, c)$$

$$\leq 2 J p_2^{(j-1)}(\mathcal{U}^*_j, c^*_j). \quad (54)$$

Combining these observations we have that $$V^{(j)opt} = \sum_{(\mathcal{U},c) \in V_1^{(j)opt}} p_1^{(j)}(\mathcal{U}, c) \leq (1+T+2J) p_2^{(j-1)}(\mathcal{U}^*_j, c^*_j), \quad (55)$$

which is the desired result in (52).

Thus, using (48), (49) and (52) we can conclude that $$(1+T+2J) \sum_{(\mathcal{U},c) \in S^*_{j-1}} \left( \frac{p_1^{(j)}(\mathcal{U}, c) + p_2^{(j)}(\mathcal{U}, c)}{p_2^{(j-1)}(\mathcal{U},c)} \right) \geq V^{(j)opt} + W^{(j)opt} \geq W^{(j-1)opt}. \quad (56)$$

which proves the induction step and proves the claim in (43).

Let us now consider the remaining part which arises when $\mathcal{M}^{wide} \neq \Phi$. Consider first Algorithm IIb which outputs a feasible allocation over $\mathcal{M}^{wide}$ yielding a weighted sum rate $\hat{W}^{wide}$. Let $\hat{W}^{opt,wide}$ denote the optimal weighted sum rate obtained by solving (41) albeit where all pairs (U,c) are restricted to lie in $\mathcal{M}^{wide}$. We will prove that $$\hat{W}^{wide} \geq \frac{\hat{W}^{opt,wide}}{J}. \quad (57)$$

Let $V^{opt,wide}$ be an optimal allocation of pairs from $\mathcal{M}^{wide}$ that results in a weighted sum rate $\hat{W}^{opt,wide}$. Clearly, in order to meet the knapsack constraints, $V^{opt,wide}$ can include at-most one pair from each $V^{(q)}$, $1 \leq q \leq J$ so that there can be at-most J pairs in $V^{opt,wide}$. Thus, by selecting the pair yielding the
maximum weighted sum-rate we can achieve at-least $\hat{W}^{opt,wide}/J$. The greedy algorithm first selects the pair yielding the maximum weighted sum rate among all pairs in $\mathcal{M}^{wide}$ and then attempts to add pairs to monotonically improve the objective. Thus, we can conclude that (57) must be true.

Notice that we select $\hat{W} = \max\{\hat{W}^{narrow}, \hat{W}^{wide}\}$ so that $$\hat{W} \geq \max\left\{\frac{\hat{W}^{opt,narrow}}{1+T+2J}, \frac{\hat{W}^{opt,wide}}{J}\right\}. \quad (58)$$

It is readily seen that $$\hat{W}^{opt} \leq \hat{W}^{opt,narrow} + \hat{W}^{opt,wide}. \quad (59)$$

(58) and (59) together prove the theorem.

An interesting observation that follows from the proof of Theorem 6 is that any optimal allocation over $\mathcal{M}^{wide}$ can include at-most one pair from each $V^{(q)}$, $1 \leq q \leq J$. Then since the number of pairs in each $V^{(q)}$, $1 \leq q \leq J$ is $O(K^T N^2)$, we can determine an optimal allocation yielding $\hat{W}^{opt,wide}$ via exhaustive enumeration with a high albeit polynomial complexity (recall that T and J are assumed to be fixed). Thus, by using exhaustive enumeration instead of Algorithm IIb, we can claim the following result.

Corollary 1 Let $\hat{W}^{opt}$ denote the optimal weighted sum rate obtained upon solving (41) and let $\hat{W}$ denote the weighted sum rate obtained upon using Algorithm II albeit with exhaustive enumeration over $\mathcal{M}^{wide}$. Then, we have that $$\hat{W} \geq \begin{cases} \dfrac{\hat{W}^{opt}}{1+T+2J}, & \text{If } \mathcal{M}^{wide} = \phi \\ \dfrac{\hat{W}^{opt}}{2+T+2J} & \text{Otherwise} \end{cases} \quad (60)$$

Simulation Results

In this section we present our simulation results. We consider both the LTE as well as the LTE-A uplink. In each case we simulate an uplink with 10 users, wherein the BS is equipped with four receive antennas. The system has 280 sub-carriers divided into 20 RBs (of size 14 sub-carriers each) available as data subcarriers that are used for serving the users. We assume 10 active users all of whom have identical maximum transmit powers. We use the SCM urban macro channel model (with co-polarized antennas having $10\lambda$, $1\lambda$ separation at the BS and the mobile (user), respectively, and 15° BS mean angular spread) to generate the channel between each user and the base-station. In all the results given below we assume an infinitely backlogged traffic model.

Figure 3:
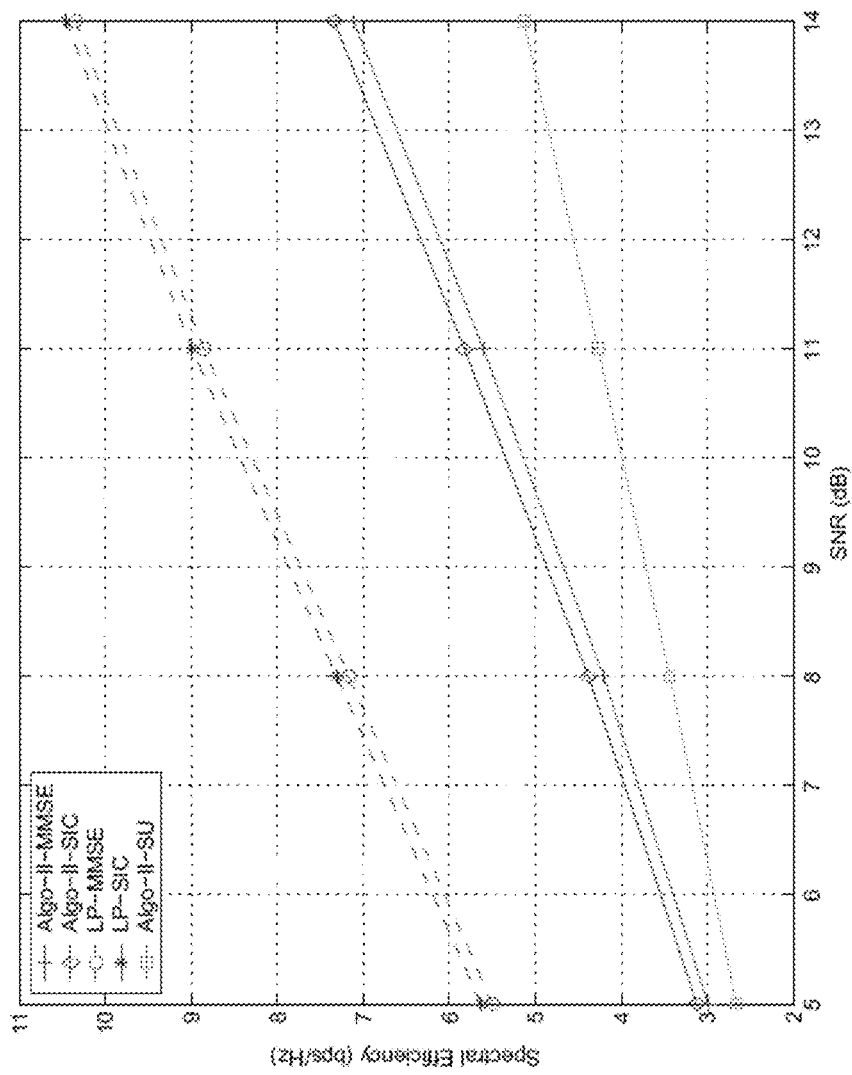
FIG. 3 is a plot showing average spectral efficiency versus SNR (db): LTE MU Scheduling according to an aspect of the present disclosure.

We first consider the multi-user scheduling over the LTE Uplink. In FIG. 3, we plot the average cell spectral efficiency (in bits-per-sec-per-Hz) versus the average transmit SNR (dB) when Algorithm II is employed by the BS scheduler. Here each user is assumed to have one transmit antenna and 64 QAM is the maximum alphabet size. In addition, we assume that at-most two users can be co-scheduled on an RB (i.e. T=2) which is expected to be the typical value. For simplicity, we assume no knapsack constraints. We plot the spectral efficiency curve yielded by Algorithm II when the BS employs the linear MMSE receiver along with the corresponding upper bound obtained by the linear programming (LP) relaxation of (41) (denoted in the plot as Algo-II-MMSE and LP-MMSE, respectively). Also plotted are the spectral efficiency curve yielded by Algorithm II along with the corresponding LP upper bound, for the case when the BS employs the successive interference cancelation (SIC) receiver. Finally, we also plot the spectral efficiency curve yielded by Algorithm II when only single user (SU) scheduling is allowed, which is obtained by setting all $p(U,c) \in \mathcal{M}$ in (41) to be zero whenever $|U| \geq 2$. Note that under SU scheduling the SIC receiver reduces to the MMSE receiver. From FIG. 3, we have the following observations:

For both SIC and MMSE receivers, the performance of Algorithm II is within 60-70% of the LP upper bound, which is much superior to the worst case guarantee ⅓ (obtained by specializing the result in (42) by setting $\mathcal{M}^{wide} = \Phi$, T=2 and J=0).

The SIC receiver results in a small gain over the MMSE receiver. This gain will increase as the maximum number of users that can be co-scheduled on an RB (T) is increased since the SIC allows for improved system rates via co-scheduling a larger number of users whereas the MMSE will become interference limited.

MU scheduling offers a substantial gain over SU scheduling (almost 50% at high SNR). This follows since the degrees of freedom available here for MU scheduling is twice that of SU-scheduling.

Figure 4:
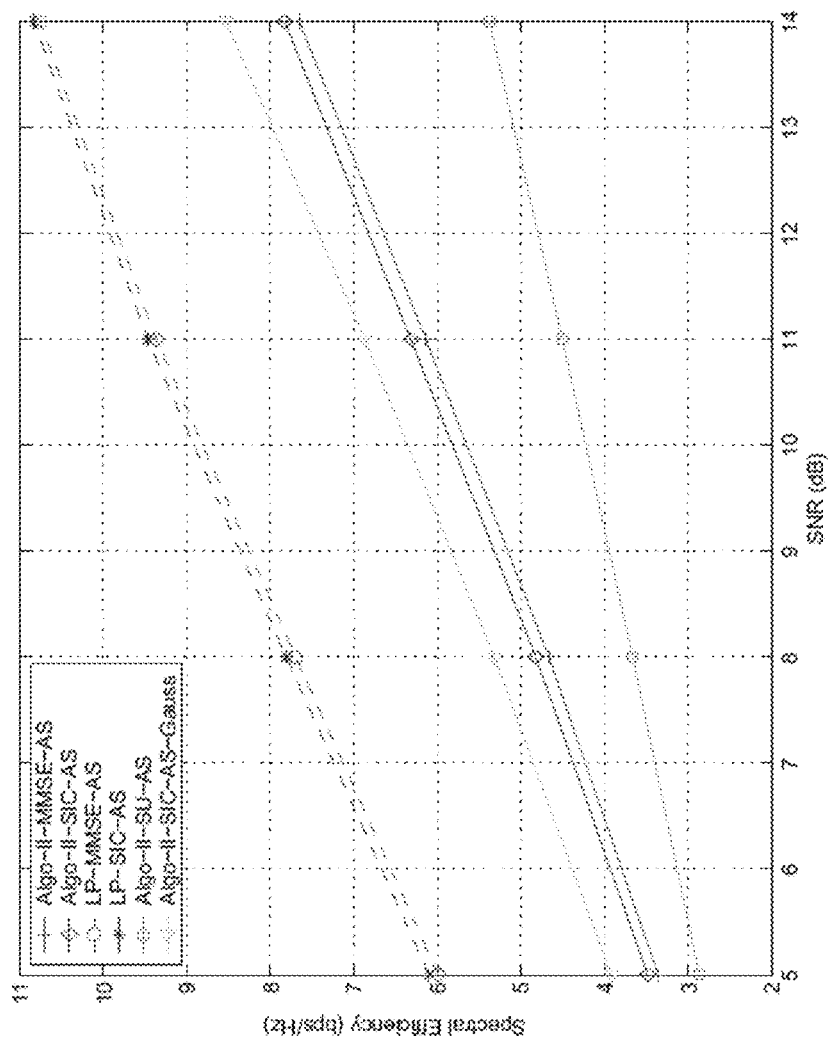
FIG. 4 is a plot showing average spectral efficiency versus SNR (db): LTE MU Scheduling with Antenna Selection according to an aspect of the present disclosure.

In FIG. 4 we consider the same scenario as in FIG. 3 except that we assume each user is equipped with two transmit antennas and can use an antenna selection codebook, i.e., $\mathcal{W} = \{[1;0], [0;1]\}$. We plot the spectral efficiency curves yielded by Algorithm II along with the corresponding LP upper bounds. The relative performance is similar as that observed in FIG. 3 and antenna selection is seen to provide good gains particularly for MU scheduling with a simple MMSE receiver. We also plot the spectral efficiency that can be achieved by Algorithm II with antenna selection, SIC receiver at the BS and when each user can employ an unconstrained (Gaussian) input alphabet (denoted by Algo-II-SIC-AS-Gauss in the legend). This curve represents the best spectral efficiency that can be achieved under a typical LTE UL configuration with MU-scheduling.

Figure 5:
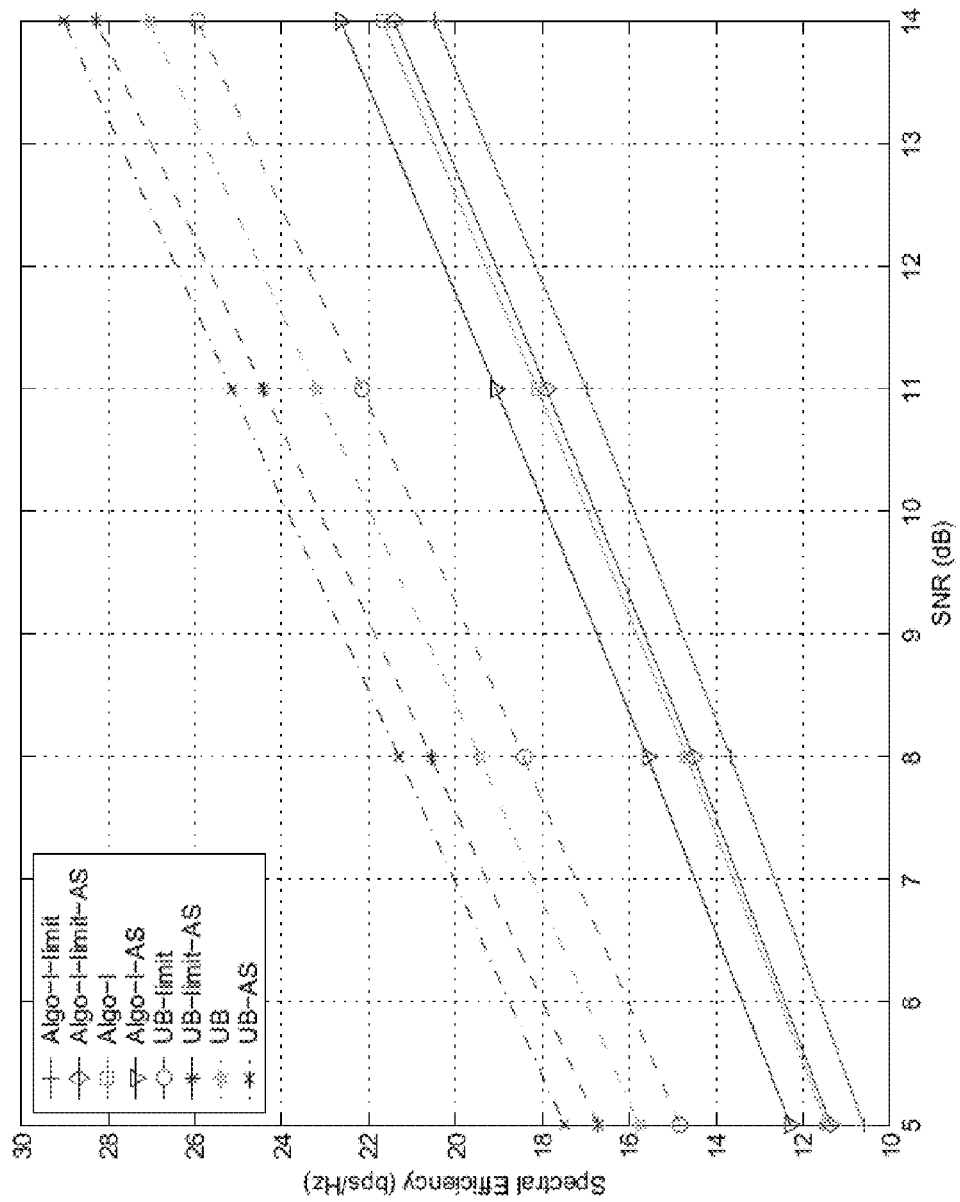
FIG. 5 is a plot showing average spectral efficiency versus SNR (db): LTE-A MU-MIMO Scheduling according to an aspect of the present disclosure.

In FIG. 5, we consider multi-user scheduling over the LTE-A Uplink. We assume that each user is equipped with two transmit antennas and can use an antenna selection codebook, i.e., $\mathcal{W} = \{[1;0], [0;1]\}$. The BS employs the SIC receiver and each user can employ an unconstrained (Gaussian) input alphabet. For simplicity, we assume no interference limit constraints and consider one control channel overhead constraint which imposes that no more than seven users can be scheduled. We plot the average cell spectral efficiency curves obtained when Algorithm I is employed by the BS scheduler with and without the control channel overhead constraint (denoted respectively by Algo-I-limit-AS and Algo-I-AS). Also plotted are the corresponding spectral efficiency curves obtained when each user has only one transmit antenna (denoted respectively by Algo-T-limit and Algo-I). For each curve, we plot a corresponding upper bound by specializing a data-dependent upper bound from [28] which is applicable to any sub-modular function maximization (see also [29]). From the figure we observe that with and without antenna selection, the performance of Algorithm I is within 68-75% of the data-dependent upper bound, which is superior to the worst case guarantee ½ (obtained by specializing the result in Theorem 4). Finally, comparing FIG. 4 and FIG. 5 we note that LTE-A MU scheduling promises significant gains over LTE MU-scheduling, mainly because in the former case the complete overlap constraint is removed and there are no limits one the number of users that can be co-scheduled on an RB.

The following enumerated references have been referenced throughout the detailed description pertaining to the fourth generation cellular uplink. We list the references here for completeness, although they have been cited on separate disclosure documents as appropriate.

[1] 3GPP, "TSG-RAN EUTRA, re1.10," *TR* 36.213, December 2010.

[2] W. Yu and W. Rhee, "Degrees of freedom in wireless multiuser spatial multiplex systems with multiple antennas," *IEEE Trans. Commun.*, vol. 54, pp. 1747-1753, October 2006.

[3] N. Bansal, N. Korula, V. Nagarajan, and A. Srinivasan, "On k-column sparse packing programs," *Proc. International Conference on Integer Programming and Combinatorial Optimization*, 2010.

[4] W. Yu and R. Liu, "Dual methods for nonconvex spectrum optimization of multicarrier systems," *IEEE Trans. Commun.*, vol. 54, pp. 1310-1322, July 2006.

[5] W. Noh, "A distributed resource control for fairness in ofdma systems: English-auction game with imperfect information," *Proc. IEEE Global Telecommun. Conf. (Globecom)*, 2008.

[6] S. Lee, S. Choudhury, A. Khohnevi, S. Xu, and S. Lu, "Downlink MIMO with frequency-domain packet scheduling for 3GPP LTE," *IEEE Infocom,* 2009.

[7] E. Calvo, D. Palomar, J. R. Fonollosa, and J. Vidal, "On the computation of the capacity region of the discrete MAC," *IEEE Trans. Commun.*, vol. 58, pp. 3512-3525, December 2010.

[8] W. Dai, B. C. Rider, and Y. Liu, "Joint beamforming for multiaccess MIMO systems finite rate feedback," *IEEE Trans. Wireless Commun.*, vol. 8, pp. 2618-2628, May 2009.

[9] S. N. Donthi and N. B. Mehta, "Joint performance analysis of channel quality indicator feedback schemes and frequency-domain scheduling for LTE," *IEEE Trans. Vehicular Tech.*, September 2011.

[10] M. Andrews and L. Zhang, "Multiserver scheduling with contiguity constraints," *Proc. IEEE Infocom,* 2009.

[11] H. Yang, F. Ren, C. Lin, and J. Zhang, "Frequency-domain packet scheduling for 3GPP LTE uplink," *IEEE Infocom,* 2010.

[12] N. Prasad, H. Zhang, M. Jiang, G. Yue, and S. Rangarajan, "Resource allocation in 4G MIMO cellular uplink," *IEEE Globecom,* 2011.

[13] N. Prasad, H. Zhang, H. Zhu, and S. Rangarajan, "Multi-user scheduling in the 3GPP LTE cellular uplink," *Tech. Report: uploaded in arXiv cs.NI,* January 2012. (to appear IEEE WiOpt 2012).

[14] Y. Liu and E. Knightly, "Opportunistic fair scheduling over multiple wireless channels," in *Proc. 2003 IEEE INFOCOM,* (San Francisco, Calif.), March 2003.

[15] J. Edmonds, "Submodular functions, matroid, and certain polyhedra," *Combinatorial Structures and Their Applications,* 1970.

[16] D. Tse and S. Hanly, "Multiaccess fading channels-part I: Polymatroid structure, optimal resource allocation, and throughput capacities," *IEEE Trans. Inform. Theory,* 1998.

[17] C. Ko, J. Lee, and M. Queyranne, "An exact algorithm for maximum entropy sampling," *Operations Research,* 1995.

[18] C. Chekuri, J. Vondrak, and R. Zenldusen, "Dependent randomized rounding via exchange properties of combinatorial structures," *FOCS,* 2010.

[19] J. O. Cerdeiral and P. Barcia, "When is a 0-1 knapsack a matroid?," *Portugaliae Mathematica,* 1995.

[20] G. L. Nemhauser, L. A. Wolsey, and M. L. Fisher, "An analysis of approximations for maximizing submodular set functions," *Math. Programming,* 1978.

[21] S. Sanayei and A. Nosratinia, "Capacity of MIMO channels with antenna selection," *IEEE Trans. on Information Theory,* 2007.

[22] M. K. Varanasi and T. Guess, "Optimum decision feedback multiuser equalization with successive decoding achieves the total capacity of the Gaussian multiple-access channel," *IEEE Asilomar,* November 1997. (invited).

[23] S. Iwata, L. Fleischer, and S. Fujishige, "A combinatorial strongly polynomial algorithm for minimizing submodular functions," *Journal of ACM,* 2001.

[24] M. Minoux, "Accelerated greedy algorithms for maximizing submodular set functions," *Optimization Techniques, LNCS,* 1978.

[25] A. Krause, J. Leskovec, C. Guestrin, J. VanBrieen, and C. Faloutsos, "Efficient sensor placement optimization for securing large water distribution networks," *Journal of Water Resources Planning and Management,* 2008.

[26] K. D. Nguyen, A. G. Fabregas, and L. K. Rasmussen, "A tight lower bound to the outage probability of discrete-input block-fading channels," *IEEE Trans. on Information Theory,* 2007.

TABLE 2

ALGORITHM II: ALGORITHM FOR LTE UL MU-MIMO
Table 2: Algorithm II: Algorithm for LTE UL MU-MIMO 1: Input p($\mathcal{U}$, c), $\forall$ ($\mathcal{U}$, c) $\in \mathcal{M}$ and $\mathcal{M}^{narrow}, \mathcal{M}^{wide}$
2: Determine a feasible allocation over $\mathcal{M}^{narrow}$ using Algorithm IIa and let $\hat{W}^{narrow}$ denote the corresponding weighted sum rate.
3: Determine a feasible allocation over $\mathcal{M}^{wide}$ using Algorithm IIb and let $\hat{W}^{wide}$ denote the corresponding weighted sum rate.
4: Select and output the allocation resulting in $\hat{W} = \max\{\hat{W}^{narrow}, \hat{W}^{wide}\}$.

TABLE 3

ALGORITHM IIa: LRT BASED MODULE
Table 3: Algorithm IIa: LRT based module $\mathcal{M}^{narrow}$ 1: Initialize $p'(\mathcal{U}, c) \leftarrow p(\mathcal{U}, c), \forall (\mathcal{U}, c) \in \mathcal{M}^{narrow}$, stack $S = \phi$
2: For $j = 1, \ldots, N$
3: Determine $(\mathcal{U}^*, c^*) = \text{argmax}_{\text{Tell}(e)=j}^{(\mathcal{U},e) \in \mathcal{M}^{narrow}} p'(\mathcal{U}, c)$
4: If $p'(\mathcal{U}^*, c^*) > 0$ Then
5: Set $\hat{p} = p'(\mathcal{U}^*, c^*)$ and Push $(\mathcal{U}^*, c^*)$ into S.
6: For each $(\mathcal{U}, c) \in \mathcal{M}^{narrow}$ such that $p'(\mathcal{U}, c) > 0$
7: If $\mathcal{U}^* \cap \mathcal{U} \ne \phi$ or $c^* \cap c \ne \phi$ Then
8: Update $p'(\mathcal{U}, c) \leftarrow p'(\mathcal{U}, c) - \hat{p}$
9: Else
10: Update $p'(\mathcal{U}, c) \leftarrow p'(\mathcal{U}, c) - 2\hat{p} \max_{i \le q \le J} \beta^q(\mathcal{U}, c)$.
11: End If
12: End For
13: End If
14: End For
15: Set stack $S' = \phi$
16: While $S \ne \phi$
17: Obtain $(\mathcal{U}, c) = $ Pop S
18: If $(\mathcal{U}, c) \cup S'$ is valid Then %% $(\mathcal{U}, c) \cup S'$ is deemed valid if no user in $\mathcal{U}$ is present in S' and no chunk in S' has an overlap with c and all knapsack constraints are satisfied by $(\mathcal{U}, c) \cup S'$.
19: Update $S' \leftarrow (\mathcal{U}, c) \cup S'$
20: End While
21: Output S' and $\hat{W}^{narrow} = \Sigma_{(U, c) \in S'} p(\mathcal{U}, c)$.

TABLE 4

ALGORITHM IIb: GREEDY MODULE OVER M
Table 4: Algorithm IIb: Greedy module over $\mathcal{M}^{wide}$ 1: Input $p(\mathcal{U}, c), \forall (\mathcal{U}, c) \in \mathcal{M}^{wide}$ and $\{V^{(q)}\}_{q=1}^J$.
2: Set $S = \phi$ and $\mathcal{M}' = \mathcal{M}^{wide}$.
3: Repeat
4: Determine $(\mathcal{U}^*, c^*) = \text{argmax}_{S \cup (\mathcal{U},e) \text{ is valid}}^{(\mathcal{U},e) \in \mathcal{M}'} p(\mathcal{U}, c)$.
5: Update $S \leftarrow S \cup (\mathcal{U}^*, c^*)$ and $\mathcal{M}' = \mathcal{M}' \setminus \{V^{(q)}: (\mathcal{U}^*, c^*) \in V^{(q)}\}$
6: Until $(\mathcal{U}^*, c^*) = \phi$ or $\mathcal{M}' = \phi$.
7: Output S and $\hat{W}^{wide} = \Sigma_{(U, c) \in S} p(\mathcal{U}, c)$.

Multi-User Scheduling in the 3GPP LTE Cellular Uplink

We now discuss the aspects of the present disclosure directed to 3GPP LTE Cellular Uplink. We note that in this section the reference numerals are specific to this section.

The next generation cellular systems, a.k.a. 4G cellular systems, will operate over wideband multi-path fading channels and have chosen the orthogonal frequency-division multiplexing based multiple-access (OFDMA) as their air-interface [1,2]. The motivating factors behind the choice of OFDMA are that it is an effective means to handle multi-path fading and that it allows for enhancing multi-user diversity gains via channel-dependent frequency-domain scheduling. The deployment of 4G cellular systems has begun and will accelerate in the coming years. Predominantly the 4G cellular systems will be based on the 3GPP LTE standard [1] since an overwhelming majority of cellular operators have committed to LTE. Our focus in this paper is on the uplink (UL) in these LTE cellular systems and in particular on multi-user (MU) scheduling for the the LTE UL. The UL in LTE systems employs a modified form of OFDMA, referred to as the DFT-Spread-OFDMA [1]. The available system bandwidth is partitioned into multiple resource blocks (RBs), where each RB represents the minimum allocation unit and is a pre-defined set of consecutive subcarriers. The scheduler is a frequency domain packet scheduler, which in each scheduling interval assigns these RBs to the individual users. Unlike single-user (SU) scheduling, a key feature of MU scheduling is that an RB can be simultaneously assigned to more that one user in the same scheduling interval. MU scheduling is well supported by fundamental capacity and degrees of freedom based analysis [3,4] and indeed, its promised gains need to be harvested in order to cater to the ever increasing traffic demands. Anticipating such growing data traffic, LTE UL has enabled MU scheduling in the uplink along with transmit antenna selection. However, several constraints have been placed on such MU scheduling (and the resulting MU transmissions) which seek to balance the need to provide scheduling freedom with the need to ensure a low signaling overhead and respect device limitations.

In FIG. 1 we highlight the key constraints in LTE MU scheduling by depicting a feasible allocation. Notice first that all RBs assigned to a user must form a chunk of contiguous RBs and each user can be assigned at-most one such chunk. This restriction allows us to exploit frequency domain channel variations via localized assignments (there is complete freedom in choosing the location and size of each such chunk) while respecting strict limits on the per-user transmit peak-to-average-power-ratio (PAPR). Note also that there should be a complete overlap among any two users that share an RB. In other words, if any two users are co-scheduled on an RB then those two users must be co-scheduled on all their assigned RBs. This constraint is a consequence of Zadoff-Chu (ZC) sequences (and their cyclic shifts) being used as pilot sequences for channel estimation in the LTE UL [1]. In particular, two users who share an RB must have a complete overlap of their assigned pilot sequences in order to ensure inter-user pilot orthogonality at the UL receiver, which in turn is necessary for reliable channel estimation. In addition, to minimize the signaling overhead, each scheduled user can transmit with only one power level (or power spectral density (PSD)) on all its assigned RBs. This PSD is implicitly determined by the number of RBs assigned to that user, i.e., the user divides its total power equally among all its assigned RBs subject possibly to a spectral mask constraint. While this constraint significantly decreases the signaling overhead involved in conveying the scheduling decisions to the users, it does not result in any significant performance degradation. This is due to the fact that the multi-user diversity effect ensures that each user is scheduled on the set of RBs on which it has relatively good channels. A constant power allocation over such good channels results in a negligible loss [5]. The LTE UL further assumes that each user can have multiple transmit antennas but is equipped with only one power amplifier due to cost constraints. Accordingly, it allows a basic preceding in the form of transmit antenna selection where each scheduled user can be informed about the transmit antenna it should employ in a scheduling interval.

Finally scheduling in LTE UL must respect control channel overhead constraints and interference limit constraints. The former constraints arise because the scheduling decisions are conveyed to the users on the downlink control channel, whose limited capacity in turn places a limit on the set of users that can be scheduled. The latter constraints are employed to mitigate intercell interference. In the sequel it is shown that both these types of constraints can be posed as column-sparse and generic knapsack (linear packing) constraints, respectively.

The goal of this work is to design practical MU resource allocation algorithms for the LTE cellular uplink, where the term resource refers to RBs, modulation and coding schemes (MCS), power levels as well as choice of transmit antennas. In particular, we consider the design of resource allocation algorithms via weighted sum rate utility maximization, which accounts for finite user queues (buffers) and practical MCS. In addition, the designed algorithms comply with all the aforementioned practical constraints. Our main contributions are as follows:

1. We show that while the complete overlap constraint along with the at-most one chunk per scheduled user constraint make the resource allocation problem APX-hard, they greatly facilitate the use of local ratio test (LRT) based methods [6,7]. We then design an LRT based polynomial time deterministic constant-factor approximation algorithm. A remarkable feature of this LRT based algorithm is that it is an end-to-end solution which can accommodate all constraints. Simulation results show that the proposed algorithm has good average performance, much superior to its worst-case guarantee and achieves more than 80% of a corresponding linear programming (LP) based upper bound.

2. We then propose an enhancement that can significantly reduce the complexity of the LRT based MU scheduling algorithm while offering identical performance, as well as an enhancement that can yield good performance improvements with a very small additional complexity. Indeed, in simulation examples that consider transmit antenna selection as well as different receiver choices, the proposed complexity reduction enhancement is shown to result in over 80% reduction in terms of metric computation complexity. On the other hand, the other enhancement improves the performance (in terms of the cell average spectral efficiency) by about 10% while incurring a very modest complexity increase of 2 to 3%. The performance of our algorithm with this latter enhancement is more than 90% of a corresponding LP upper bound.

3. We propose a sequential LRT based MU scheduling algorithm that offers another useful choice in the complexity versus performance tradeoff. This algorithm also offers constant-factor approximation (albeit with a poorer constant) and a significantly reduced complexity.

4. In a practical system, it is useful to first pre-select a smaller pool of good users and then employ a sophisticated scheduling algorithm on the selected pool. Pre-selection can substantially reduce complexity and is also a simple way to enforce a constraint on the number of users that can be scheduled in a scheduling interval. We note that another way to enforce the latter constraint is via a knapsack constraint in the LRT based MU scheduling. We suggest several such user pre-selection algorithms, some of which are shown to offer constant-factor approximations to the pre-selection problem.
5. The performance of the proposed LRT based MU scheduling algorithm, the sequential LRT based MU scheduling algorithm and the proposed user pre-selection algorithms are evaluated for different BS receiver options via elaborate system level simulations that fully conform to the 3GPP evaluation methodology. It is seen that the proposed LRT based MU scheduling algorithm along with an advanced BS receiver can yield over 27% improvement in cell average throughout along with over 10% cell edge throughput improvement compared to SU scheduling. Its sequential counterpart is also attractive in that it yields about 20% improvement in cell average throughput while retaining the cell edge performance of SU scheduling. Further, it is seen that user pre-selection is indeed an effective approach and the suggested pre-selection approaches can offer significant gains.

Resource allocation for the OFDMA networks has been the subject of intense research [8-12] with most of the focus being on the downlink. A majority of OFDMA resource allocation problems hitherto considered are single-user (SU) scheduling problems, which attempt to maximize a system utility by assigning non-overlapping subcarriers to users along with transmit power levels for the assigned subcarriers. These problems have been formulated as continuous optimization problems, which are in general non-linear and non-convex. As a result several approaches based on the game theory [13], dual decomposition [8] or the analysis of optimality conditions [14] have been developed. Recent works have focused on emerging cellular standards and have modeled the resource allocation problems as constrained integer programs. Prominent examples are [11], [15] which consider the design of downlink SU-MEMO schedulers for LTE and LTE-Advanced (LTE-A) systems, respectively, and derive constant factor approximation algorithms.

Resource allocation for the DFT-Spread-OFDMA uplink has been relatively much less studied with [7,16,17] being the recent examples. In particular, [7,16] show that the SU LTE UL scheduling problem is APX-hard and provide constant-factor approximation algorithms, whereas [17] extends the algorithms of [7,16] to the SU-MIMO LTE-A scheduling. The algorithm proposed in [7] is based on an innovative application of the LRT technique, which was developed earlier in [6]. However, we emphasize that the algorithms in [7,16,17] cannot incorporate MU scheduling and also cannot incorporate knapsack constraints. To the best of our knowledge the design of approximation algorithms for MU scheduling in the LTE uplink has not been considered before.

Consider a single-cell with K users and one BS which is assumed to have $N_r \geq 1$ receive antennas. Suppose that user k has $N_t \geq 1$ transmit antennas and its power budget is $P_k$. We let N denote the total number of RBs.

We consider the problem of scheduling users in the frequency domain in a given scheduling interval. Let $\alpha_k$, $1 \leq k \leq K$ denote the weight of the $k^{th}$ user which is an input to the scheduling algorithm and is updated using the output of the scheduling algorithm in every scheduling interval, say according to the proportional fairness rule [18]. Letting $r_k$ denote the rate assigned to the $k^{th}$ user (in bits per N RBs), we consider the following weighted sum rate utility maximization problem, $$\max \sum_{1 \leq k \leq K} \alpha_k r_k, \qquad (1)$$

where the maximization is over the assignment of resources to the users subject to:

Decodability constraint: The rates assigned to the scheduled users should be decodable by the base-station receiver. Notice that unlike SU scheduling, MU scheduling allows for multiple users to be assigned the same RB. As a result the rate that can be achieved for user k need not be only a function of the resources assigned to the $k^{th}$ user but can also depend on the those assigned to the other users as well.

One transmit antenna and one power level per user: Each user can transmit using only one power amplifier due to cost constraints. Thus, only a basic precoding in the form of transmit antenna selection is possible. In addition, each scheduled user is allowed to transmit with only one power level (or power spectral density (PSD)) on all its assigned RBs.

At most one chunk per-user and at-most T users per RB: The set of RBs assigned to each scheduled user should form one chunk, where each chunk is a set of contiguous RBs. This constraint seeks to allow frequency selective scheduling gains via localized scheduling while keeping the per-user peak-to-average-power ratio (PAPR) under check. Further at-most T users can be co-scheduled on a given RB. T is expected to be small number typically two and no greater than four.

Complete overlap constraint: If any two users are assigned a common RB then those two users must be assigned the same set of RBs. Feasible RB allocation and co-scheduling of users in LTE MU UL is depicted in FIG. 1.

Finite buffers and finite MCS: Users in a practical UL will have bursty traffic which necessitates considering finite buffers. In addition, only a finite set of MCS (29 possibilities in the LTE network) can be employed.

Control channel overhead constraints: Every user that is given an UL grant (i.e., is scheduled on at least one RB) must be informed about its assigned MCS and the set of RBs on which it must transmit along with possibly the transmit antenna it should employ. This information is sent on the DL control channel of limited capacity which imposes a limit on the set of users that can be scheduled. In particular, the scheduling information of a user is encoded and formatted into one packet (henceforth referred to as a control packet), where the size of the control packet must be selected from a predetermined set of sizes. A longer (shorter) control packet is used for a cell edge (cell interior) user. In the LTE/LTE-A systems each user is assigned one search region when it enters the cell. In each scheduling interval it then searches for the control packet (containing the scheduling decisions made for it) only in that region of the downlink control channel, as well as a region common to all users. By placing restrictions on the location where a particular user's control packet can be sent and the size of that packet, the system can reduce the number of blind decoding attempts that have to be made by that user in order to receive its control packet. We note that a user is unaware of whether there is a control packet intended for it and consequently must check all possible locations where its control packet could be present assuming each possible packet size. Each control packet carries a CRC bit sequence scrambled using the unique user identifier which helps the user deduce whether the examined packet is meant for it [2].

Per sub-band interference limit constraints: Inter-cell interference mitigation is performed by imposing interference limit constraints. In particular, on one or more subbands, the cell of interest must ensure that the total interference imposed by its scheduled users on a neighboring base-station is below a specified limit.

We define the set C as the set containing N length vectors such that any $c \in C$ is binary-valued with ($\{0,1\}$) elements and contains a contiguous sequence of ones with the remaining elements being zero. Here we say an RB i belongs to c ($i \in c$) if c contains a one in its $i^{th}$ position, i.e., $c(i)=1$ so that each $c \in C$ denotes a valid assignment of RBs chosen from the set C. Also $c_1$ and $c_2$ are said to intersect if there is some RB that belongs to both $c_1$ and $c_2$. For any $c \in C$, we will use Tail(c) (Head(c)) to return the largest (smallest) index that contains a one in c. Thus, each $c \in C$ has ones in all positions Head(c), . . . , Tail(c) and zeros elsewhere. Further, we define $\{G_1, \ldots, G_L\}$ to be a partition of $\{1, \ldots, K\}$ with the understanding that all users that belong to a common set (or group) $G_s$, for any $1 \le s \le L$, are mutually incompatible. In other words at-most one user from each group $G_s$ can be scheduled in a scheduling interval. Notice that by choosing L=K and $G_s=\{s\}$, $1 \le s \le K$ we obtain the case where all users are mutually compatible. Let us define a family of subsets, U, as $$U = \{U \subseteq \{1, \ldots, K\} : |U| \le T \& |U \cap G_s| \le 1 \forall 1 \le a \le L\} \quad (2)$$

and let $\mathcal{M} = U \times C$.

We can now pose the resource allocation problem as $$\max \sum_{(\mathcal{U},c) \in \mathcal{M}} p(\mathcal{U}, c) \chi(\mathcal{U}, c), \text{ s.t.} \quad (3)$$

For each group $\mathcal{G}_s$, $\sum_{\substack{(\mathcal{U},c) \in \mathcal{M} \\ \mathcal{U}: \mathcal{U} \cap \mathcal{G}_s \ne \phi}} \chi(\mathcal{U}, c) \le 1;$ For each RB i, $\sum_{\substack{(\mathcal{U},c) \in \mathcal{M} \\ c: s \in c}} \chi(\mathcal{U}, c) \le 1;$ $\sum_{(\mathcal{U},c) \in \mathcal{M}} \beta^q(\mathcal{U}, c) \chi(\mathcal{U}, c) \le 1, 1 \le q \le J;$ $\sum_{(\mathcal{U},c) \in \mathcal{M}} \alpha^q(\mathcal{U}, c) \chi(\mathcal{U}, c) \le 1, q \in I,$ where $\Phi$ denotes the empty set and X(U,c) is an indicator function that returns one if users in U are co-scheduled on the chunk indicated by c. Note that the first constraint ensures that at-most one user is scheduled from each group and that each scheduled user is assigned at-most one chunk. In addition this constraint also enforces the complete overlap constraint. The second constraint enforces non-overlap among the assigned chunks. Note that p(U,c) denotes the weighted sum-rate obtained upon co-scheduling the users in U on the chunk indicated by c. We emphasize that there is complete freedom with respect to the computation of p(U,c). Indeed, it can accommodate finite buffer and practical MCS constraints, account for any particular receiver employed by the base station and can also incorporate any rule to assign a transmit antenna and a power level to each user in U over the chunk c.

The first set of J knapsack constraints in (3), where J is arbitrary but fixed, are generic knapsack constraints. Without loss of generality, we assume that the weight of the pair (U,c) in the $q^{th}$ knapsack, $\beta^q(U,c)$, lies in the interval [0,1]. Notice that we can simply drop each vacuous constraint, i.e., each constraint q for which $\Sigma_{(U,c) \in \mathcal{M}} \beta^q(U,c) \le 1$. The second set of knapsack constraints are column-sparse binary knapsack constraints. In particular, for each $(U,c) \in \mathcal{M}$ and $q \in I$ we have that $\alpha^q(U,c) \in \{0,1\}$. Further, we have that for each $(U,c) \in \mathcal{M}$, $\Sigma_{q \in I} \alpha^q(U,c) \le \Delta$, where $\Delta$ is arbitrary but fixed and denotes the column-sparsity level. Note that here the cardinality of I can scale polynomially in KN keeping $\Delta$ fixed. Together these two sets of knapsack constraints can enforce a variety of practical constraints, including the control channel and the interference limit constraints. For instance, defining a generic knapsack constraint as $$\beta^1(\mathcal{U}, c) = \frac{|\mathcal{U}|}{K}, \forall (\mathcal{U}, c) \in \mathcal{M},$$

for any given input $\tilde{K}$ can enforce that no more that $\tilde{K}$ can be scheduled in a given interval, which represents a coarse control channel constraint. In a similar vein, consider any given choice of a victim adjacent base-station and a sub-band with the constraint that the total interference caused to the victim BS by users scheduled in the cell of interest, over all the RBs in the subband, should be no greater than a specified upper bound. This constraint can readily modeled using a generic knapsack constraint where the weight of each $(U,c) \in \mathcal{M}$ is simply the ratio of the total interference caused by users in U to the victim BS over RBs that are in c as well as the specified subband, and the specified upper bound. The interference is computed using the transmission parameters (such as the power levels, transmit antennas etc) that yield the metric p(U,c). A finer modeling of the LTE control channel constraints is more involved (and somewhat tedious) and is given in Appendix B for the interested reader.

Note that for a given K,N, an instance of the problem in (3) consists of a finite set I of indices, a partition $\{G_1, \ldots, G_L\}$, metrics $\{p(U,c)\} \forall (U,c) \in \mathcal{M}$ and weights $\{\beta^q(U,c)\}$, $\forall (U,c) \in \mathcal{M}, 1 \le q \le J$ and $\{\alpha^q(U,c)\}, \forall (U,c) \in \mathcal{M}, q \in I$. Then, in order to solve (3) for a given instance, we first partition the set $\mathcal{M}$ into two parts as $\mathcal{M} = \mathcal{M}^{narrow} \cup \mathcal{M}^{wide}$, where we define $\mathcal{M}^{narrow} = \{(U,c) \in \mathcal{M}: \beta^q(U,c) \le \frac{1}{2}, \forall 1 \le q \le J\}$ so that $\mathcal{M}^{wide} = \mathcal{M} \setminus \mathcal{M}^{narrow}$. We then define J sets, $V^{(1)}, \ldots, V^{(J)}$ that cover $\mathcal{M}^{wide}$ (note that any two of these sets can mutually overlap) as $(U,c) \in V^{(q)}$ iff $\beta^q(U,c) > \frac{1}{2}$ for $q=1, \ldots, J$. Recall that T, J are fixed and note that the cardinality of $\mathcal{M}$, $|\mathcal{M}|$, is $O(K^T N^2)$ and that $\mathcal{M}^{narrow}$ and $\{V^{(q)}\}$ can be determined in polynomial time. Next, we propose Algorithm I which possesses the optimality given below. The complexity of Algorithm I, which is essentially determined by that of its module Algorithm IIa, scales polynomially in KN (recall that T is a constant) A detailed discussion on the complexity along with steps to reduce it are deferred to the next section. We offer the following theorem which is proved in Appendix A.

Theorem 1. The problem in (3) is APX-hard, i.e., there is an $\epsilon > 0$ such that it is NP hard to obtain a $1-\epsilon$ approximation algorithm for (3). Let $\hat{W}^{opt}$ denote the optimal weighted sum rate obtained upon solving (3) and let $\hat{W}$ denote the weighted sum rate obtained upon using Algorithm I. Then, we have that $$\hat{W} \ge \begin{cases} \frac{\hat{W}^{opt}}{1+T+\Delta+2J}, & \text{If } \mathcal{M}^{wide} = \phi \\ \frac{\hat{W}^{opt}}{1+T+\Delta+3J}, & \text{Otherwise} \end{cases} \quad (4)$$

An interesting observation that follows from the proof of Theorem 1 is that any optimal allocation over $\mathcal{M}^{wide}$ can include at-most one pair from each $V^{(q)}$, $1 \leq q \leq J$. Then since the number of pairs in each $V^{(q)}$, $1 \leq q \leq J$ is $O(K^T N^2)$, we can determine an optimal allocation yielding $\hat{W}^{opt,wide}$ via exhaustive enumeration with a high albeit polynomial complexity (recall that T and J are assumed to be fixed). Thus, by using exhaustive enumeration instead of Algorithm IIb, we can claim the following result.

Corollary 1. Let $\hat{W}^{opt}$ denote the optimal weighted sum rate obtained upon solving (3) and let $\hat{W}$ denote the weighted sum rate obtained upon using Algorithm II albeit with exhaustive enumeration over $\mathcal{M}^{wide}$. Then, we have that $$\hat{W} \geq \begin{cases} \dfrac{\hat{W}^{opt}}{1+T+\Delta+2J}, & \text{If } \mathcal{M}^{wide} = \phi \\ \dfrac{\hat{W}^{opt}}{2+T+\Delta+2J}, & \text{Otherwise} \end{cases} \quad (5)$$

For notational simplicity, henceforth unless otherwise mentioned, we assume that all users are mutually compatible, i.e., $L=K$ with $G_s=\{s\}$, $1 \leq s \leq K$.

In this section we present key techniques to significantly reduce the complexity of our proposed local ratio test based multi-user scheduling algorithm. As noted before the complexity of Algorithm I is dominated by that of its component Algorithm IIa. Accordingly, we focus our attention on Algorithm IIa and without loss of generality we assume that $\mathcal{M} = \mathcal{M}^{narrow}$. Notice that hitherto we have assumed that all the metrics $\{p(U,c):(U,c) \in \mathcal{M}\}$ are available. In practise, computing these $O(K^T N^2)$ metrics, which are often complicated non-linear functions, is the main bottleneck and indeed must be accounted for in the complexity analysis. Before proceeding, we make the following assumption that is satisfied by all physically meaningful metrics.

Assumption 1. Sub-additivity: We assume that for any $(U,c) \in \mathcal{M}$ $$p(U,c) \leq p(U_1,c) + p(U_2,c), \forall U_1, U_2: U = U_1 \cup U_2. \quad (6)$$

The following features can then be exploited for a significant reduction in complexity.

On demand metric computation: Notice in Algorithm IIa that the metric for any $(U,c) \in \mathcal{M}$, where Tail(c)=j for some j=1, . . . , N, needs to be computed only at the $j^{th}$ iteration at which point we need to determine $$p'(U,c)=p(U,c)-\Gamma^{(j)}(U,c), \quad (7)$$

where the offset factor $\Gamma^{(j)}(U,c)$ is given by $$\Gamma^{(j)}(\mathcal{U},c) = \sum_{(\mathcal{U}_m^*, c_m^*) \in S} \Bigl( \tilde{p}(\mathcal{U}_m^*, c_m^*) \varepsilon((\mathcal{U},c),(\mathcal{U}_m^*, c_m^*)) + 2p(\mathcal{U}_m^*, c_m^*) \max_{1 \leq q \leq J} \{\beta^q(\mathcal{U}_m^*, c_m^*)\} \varepsilon^c((\mathcal{U},c),(\mathcal{U}_m^*, c_m^*)) \Bigr)$$

and where $\tilde{p}(U^*_m, c^*_m)$ is equal to the $p'(U^*_m, c^*_m)$ computed for the pair selected at the $m^{th}$ iteration with $m \leq j-1$ and $\varepsilon((U,c),(U^*_m, c^*_m))$ denotes an indicator (with $\varepsilon^c((U,c),(U^*_m, c^*_m))=1-\varepsilon((U,c),(U^*_m, c^*_m))$) which is true when $U^*_m \cap U \neq \Phi$ or $c \cap c^*_m \neq \Phi$ or $\exists q \in I: \alpha^q(U^*_m, c^*_m) = \alpha^q(U,c)=1$. Further note that $p'(U,c)$ in (7) is required only if it is strictly positive. Then, an important observation is that if at the $j^{th}$ iteration, we have already computed $p(U_1,c)$ and $p(U_2,c)$ for some $U_1, U_2$: $U=U_1 \cup U_2$, then invoking the sub-additivity property we have that $$p'(U,c) \leq p(U_1,c) + p(U_2,c) - \Gamma^{(j)}(U,c), \quad (8)$$

so that if the RHS in (8) is not strictly positive or if it is less than the greatest value of $p'(U',c')$ computed in the current iteration for some other pair $(U',c'):\text{Tail}(c')=j$, then we do not need to compute $p'(U,c)$ and hence the metric $p(U,c)$.

Selective update Note that in the $j^{th}$ iteration, once the best pair $(U^*_j, c^*_j)$ is selected and it is determined that $p'(U^*_j, c^*_j) > 0$, we need to update the metrics for pairs $(U',c')$: $\text{Tail}(c') \geq j+1$, since only such pairs will be considered in future iterations. Thus, the offset factors $\{\Gamma^{(j)}(U',c')\}$ need to be updated only for such pairs, via $$\Gamma^{(j+1)}(\mathcal{U}', c') = \Gamma^{(j)}(\mathcal{U}', c') + p'(\mathcal{U}_j^*, c_j^*)\varepsilon((\mathcal{U}', c'),(\mathcal{U}_j^*, c_j^*)) + 2p'(\mathcal{U}_j^*, c_j^*) \max_{1 \leq q \leq J}\{\beta^q(\mathcal{U}', c')\}\varepsilon^c((\mathcal{U}', c'), p'(\mathcal{U}_j^*, c_j^*)).$$

Further, if by exploiting sub-additivity we can deduce that $p'(U',c') \leq 0$ for any such pair, then we can drop such a pair along with its offset factor from future consideration.

A potential drawback of the LRT based algorithm is that some RBs may remain un-utilized, i.e., they may not be assigned to any user. Notice that when the final stack S' is built in the while-loop of Algorithm IIa, an allocation or pair from the top of stack S is added to stack S' only if it does not conflict with those already in stack S'. Often multiple pairs from S are dropped due to such conflicts resulting in spectral holes formed by unassigned RBs. To mitigate this problem, we perform a second phase. The second phase consists of running Algorithm IIa again albeit with modified metrics $\{\breve{p}(U,c):(U,c) \in \mathcal{M}^{narrow}\}$ which are obtained via the following steps.

1. Initialize $\breve{p}(U,c)=p(U,c)$, $\forall (U,c) \in \mathcal{M}^{narrow}$. Let S' be obtained as the output of Algorithm IIa when it is implemented first.
2. For each $(U,c) \in S'$, we ensure that any user in U is not scheduled by phase two in any other user set save U, by setting $$\breve{p}(U',c')=0 \text{ if } U' \neq U \ \& \ U' \cap U \neq \Phi, \ \forall (U',c') \in \mathcal{M}^{narrow}. \quad (9)$$

3. For each $(U,c) \in S'$, we ensure that no other user set save U is assigned any RB in c, by setting $$\breve{p}(U',c')=0 \text{ if } U' \neq U \ \& \ c' \cap c \neq \Phi, \ \forall (U',c') \in \mathcal{M}^{narrow}. \quad (10)$$

4. For each $(U,c) \in S'$, we ensure that the allocation $(U,c)$ is either unchanged by phase two or is expanded, by setting $$\breve{p}(\mathcal{U}, c') = \begin{cases} p(\mathcal{U}, c'), & \text{If Tail}(c') \geq \text{Tail}(c) \ \& \ \text{Head}(c') \leq \text{Head}(c) \\ 0, & \text{Otherwise} \end{cases}$$

A consequence of using the modified metrics is that the second phase has a significantly less complexity since a large fraction of the allocations are disallowed. While the second phase does not offer any improvement in the approximation factor, simulation results presented in the sequel reveal that it offers a good performance improvement with very low complexity addition.

In this section we evaluate key features of our proposed algorithm over an idealized single-cell setup. In particular, we simulate an uplink wherein the BS is equipped with four receive antennas. The system has 280 sub-carriers divided into 20 RBs (of size 14 sub-carriers each) available as data subcarriers that are used for serving the users. We assume 10 active users all of whom have identical maximum transmit powers. We model the fading channel between each user and the BS as a six-path equal gain i.i.d. Rayleigh fading channel. In all the results given below we assume an infinitely backlogged traffic model. For simplicity, we assume that there are no knapsack constraints and that at-most two users can be co-scheduled on an RB (i.e., J=0, $\Delta$=0 and T=2). Further, each user can employ ideal Gaussian codes and upon being scheduled, divides its maximum transmit power equally among its assigned RBs. Notice that since $\mathcal{M} = \mathcal{M}^{narrow}$ we can directly use Algorithm IIa.

Figure 6:
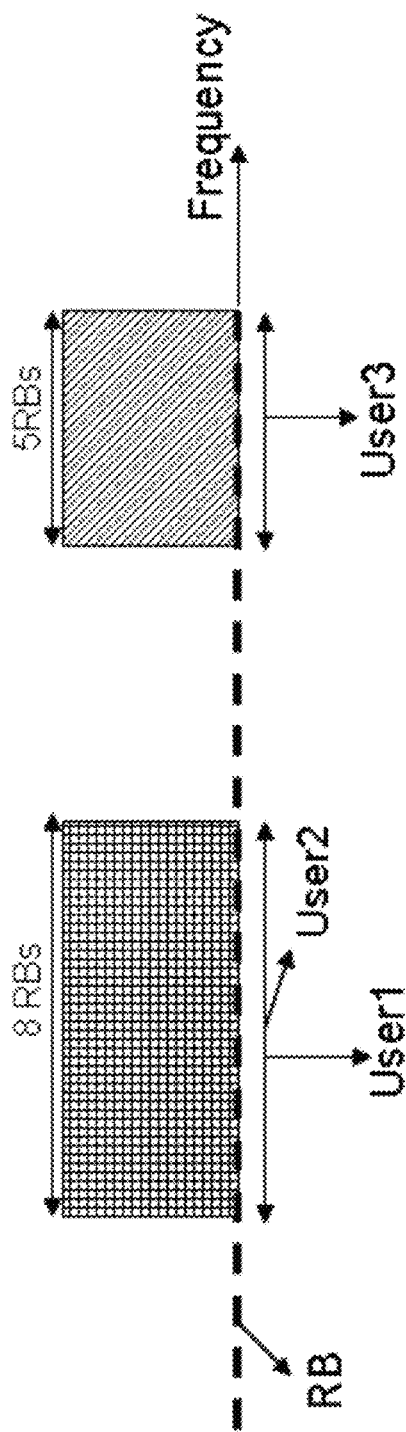
FIG. 6 is a schematic diagram depicting a feasible RB allocation in the LTE UL according to an aspect of the present disclosure.

In FIG. 2, we plot the average cell spectral efficiency (in bits-per-sec-per-Hz) versus the average transmit SNR (dB) for an uplink where each user has one transmit antenna and the BS employs the linear MMSE receiver. We plot the spectral efficiencies achieved when Algorithm IIa is employed with and without the second phase (described in Section 4), respectively (denoted in the legend by MU-MMSE-LRT-2Step and MU-MMSE-LRT-1Step). Also plotted is the upper bound obtained by the linear programming (LP) relaxation of (3) along with the spectral efficiency obtained upon rounding the LP solution to ensure feasibility (denoted in the legend by MU-MMSE-LP-UB and MU-MMSE-LP-Rounding, respectively). In FIG. 3, we plot the average cell spectral efficiency versus the average transmit SNR for an uplink where each user has one transmit antenna and the BS employs the successive interference cancelation (SIC) receiver. We plot the spectral efficiencies achieved when Algorithm IIa is employed with and without the second phase, respectively (denoted in the legend by MU-SIC-LRT-2Step and MU-SIC-LRT-1Step). Also plotted are the corresponding LP upper bound along with the spectral efficiency obtained upon rounding the LP solution. FIG. 4 and FIG. 5 are the counterparts of FIG. 2 and FIG. 3, respectively, but where each user has two transmit antennas and the BS can thus exploit transmit antenna selection. Finally, in FIG. 6 we plot the normalized spectral efficiencies obtained by dividing each spectral efficiency by the one yielded by Algorithm IIa when only single user (SU) scheduling is allowed, which in turn can be emulated by setting all metrics p(U,c):(U,c)∈$\mathcal{M}$ in (3) to be zero whenever |U|≥2.[1] In all considered schemes we assume that Algorithm IIa with the second phase is employed. From FIGS. 2 to 6, we have the following observations:

For both SIC and MMSE receivers, the performance of Algorithm IIa is more than 80% of the respective LP upper bounds, which is much superior to the worst case guarantee ⅓ (obtained by specializing the result in (4) by setting $\mathcal{M}^{wide}=\Phi$, T=2 and $\Delta$=J=0). Further, for both the receivers the performance of Algorithm IIa with the second phase is more than 90% the respective LP upper bounds. The same conclusions can be drawn when antenna selection is also exploited by the BS. In all cases, the performance of LP plus rounding scheme is exceptional and within 2% of the respective upper bound. However the complexity of this LP seems unaffordable as yet for practical implementation.[2]

The SIC receiver results in a small gain (1.5% to 2.5%) over the MMSE receiver. This gain will increase if we consider more correlated fading over which the limitation of linear receivers is exposed and as the maximum number of users that can be co-scheduled on an RB (T) is increased since the SIC allows for improved system rates via co-scheduling a larger number of users on an RB, whereas the MMSE will become interference limited. Note that antenna selection seems to provide a much larger gain (6% to 8%) that the one offered by the advanced SIC receiver. This observation must be tempered by the facts that the simulated scenario of independent (uncorrelated) fading is favorable for antenna selection and that the antenna switching loss (about 0.5 dB in practical devices) as well as the additional pilot overhead have been neglected.

MU scheduling offers substantial gains over SU scheduling (ranging from 50% to 75% for the considered SNRs). This follows since the degrees of freedom available here for MU scheduling is twice that of SU-scheduling.

Figure 7:
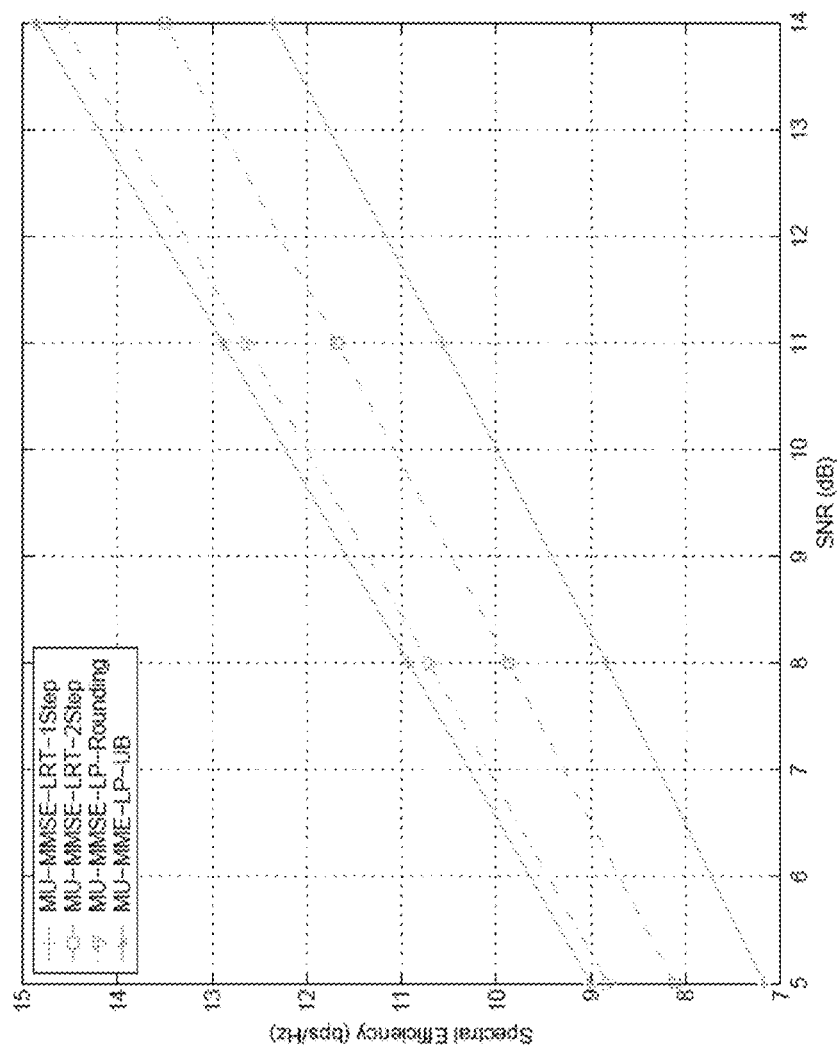
FIG. 7 is a plot showing average spectral efficiency versus SNR (db): MU Scheduling according to an aspect of the present disclosure.
Figure 8:
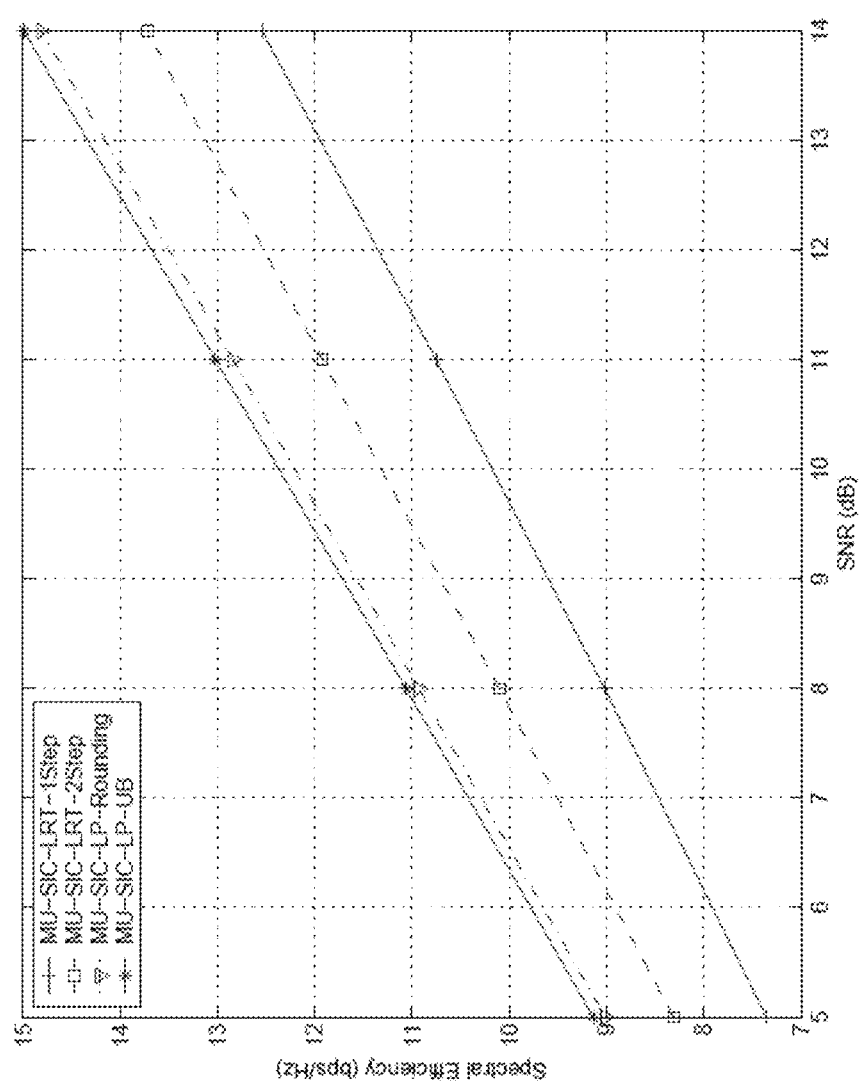
FIG. 8 is a plot showing average spectral efficiency versus SNR (db): MU Scheduling with SIC receiver according to an aspect of the present disclosure.
Figure 9:
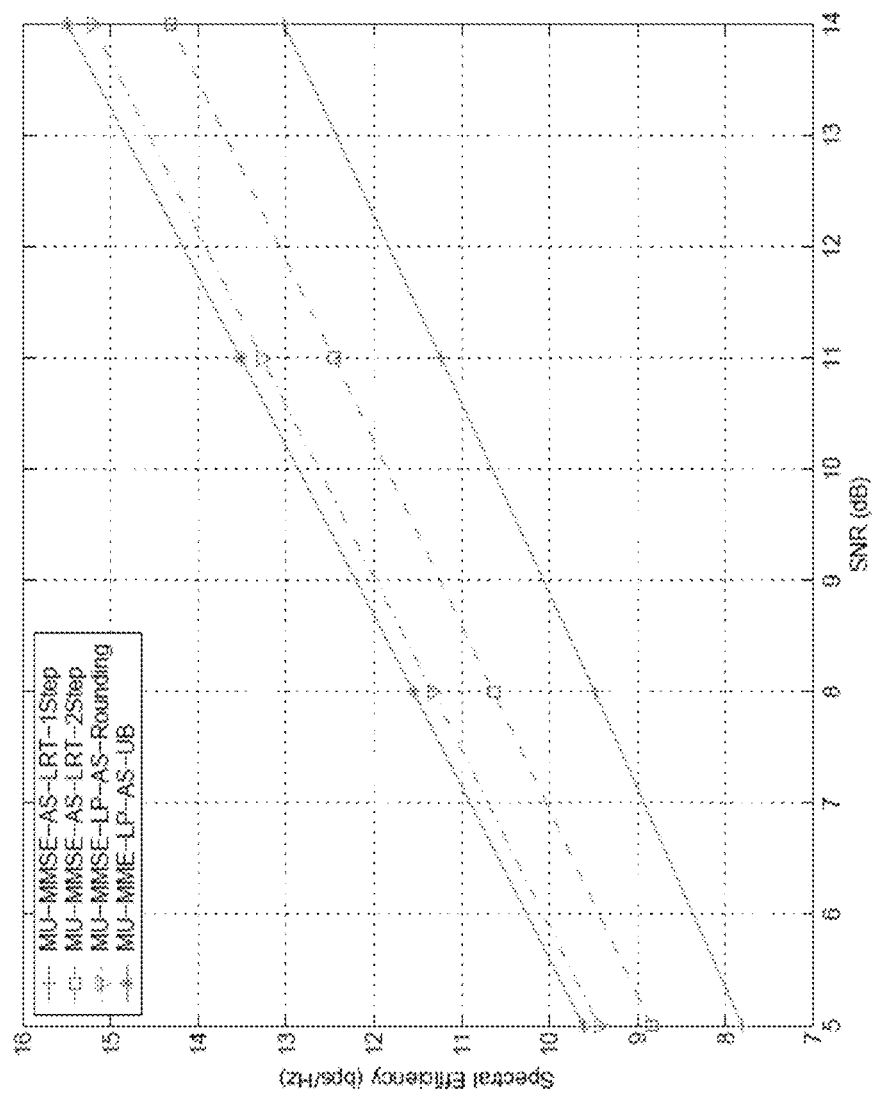
FIG. 9 is a plot showing average spectral efficiency versus SNR (db): MU Scheduling with MMSE and Antenna Selection according to an aspect of the present disclosure.
Figure 10:
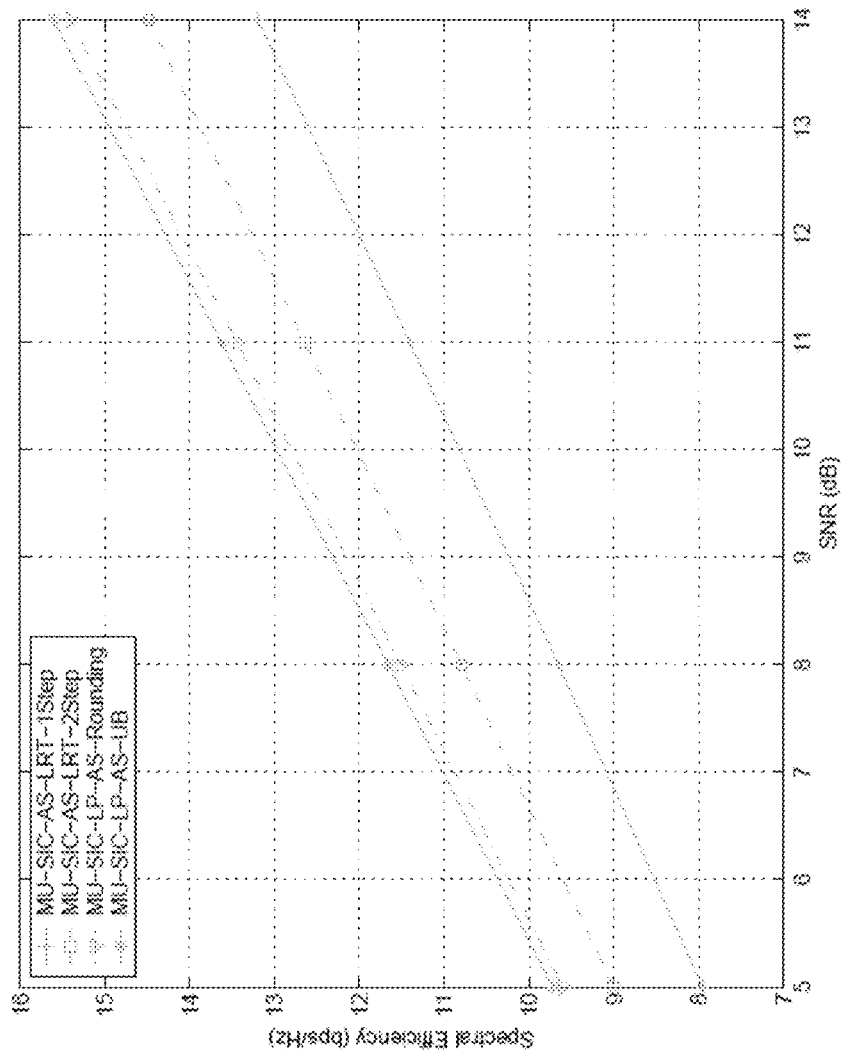
FIG. 10 is a plot showing average spectral efficiency versus SNR (db): MU Scheduling with MMSE and Antenna Selection according to an aspect of the present disclosure.
Figure 11:
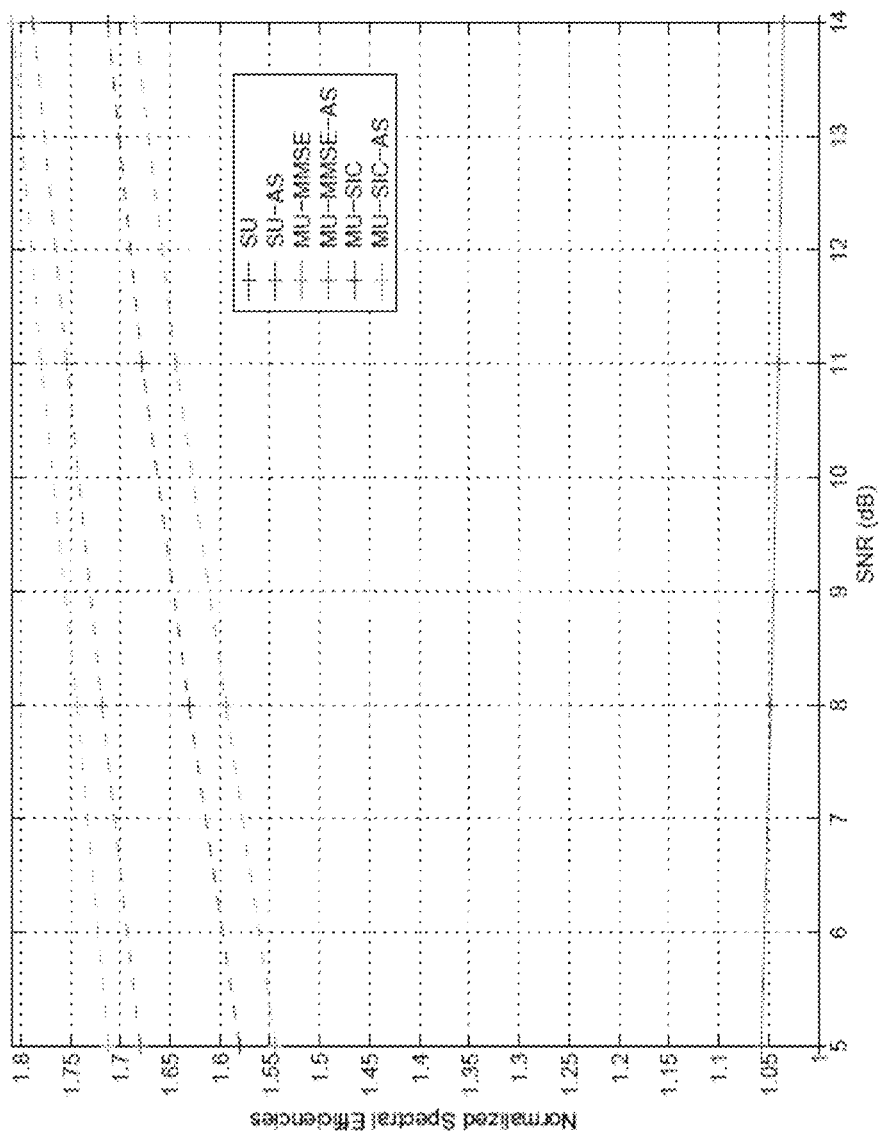
FIG. 11 is a plot showing normalized spectral efficiency versus SNR according to an aspect of the present disclosure.
Figure 12:
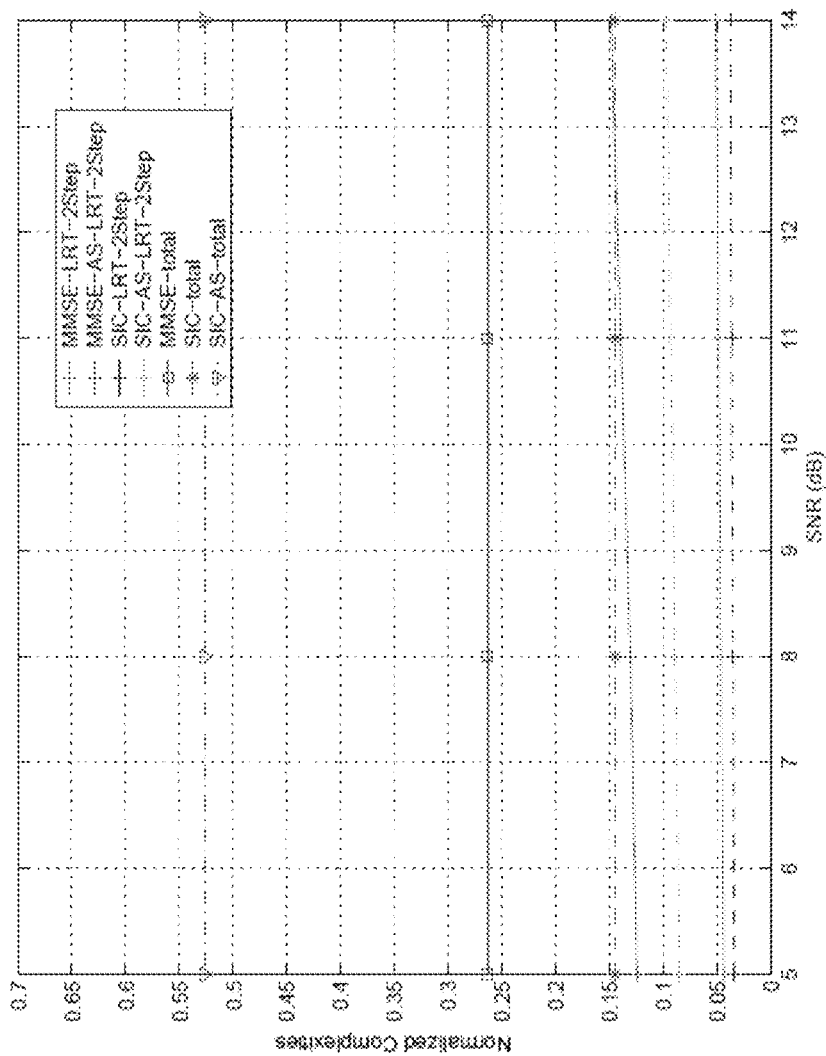
FIG. 12 is a plot showing normalized complexity versus SNR according to an aspect of the present disclosure.
Figure 13:
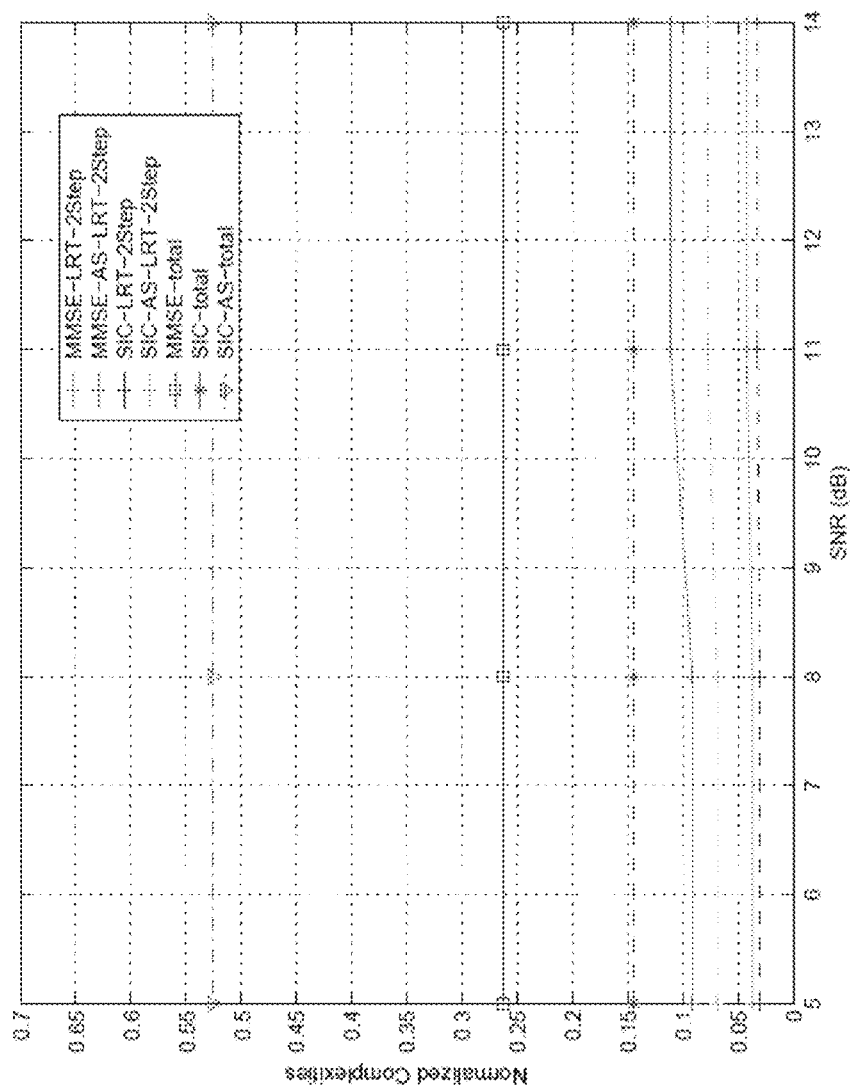
FIG. 13 is a plot showing normalized complexity versus SNR (dB)—chunk sizes are included in complexity computations according to an aspect of the present disclosure.
Figure 18:
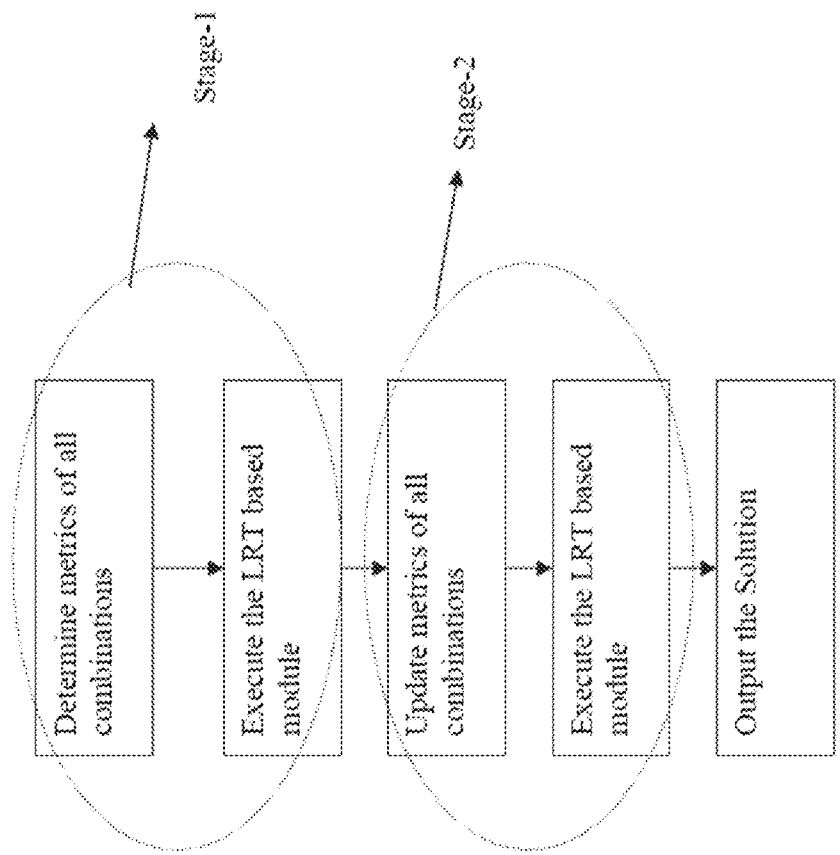
FIG. 18 is a flow chart showing example MU scheduling for LTE Release 8 UL and beyond according to an aspect of the present disclosure.
Figure 19:
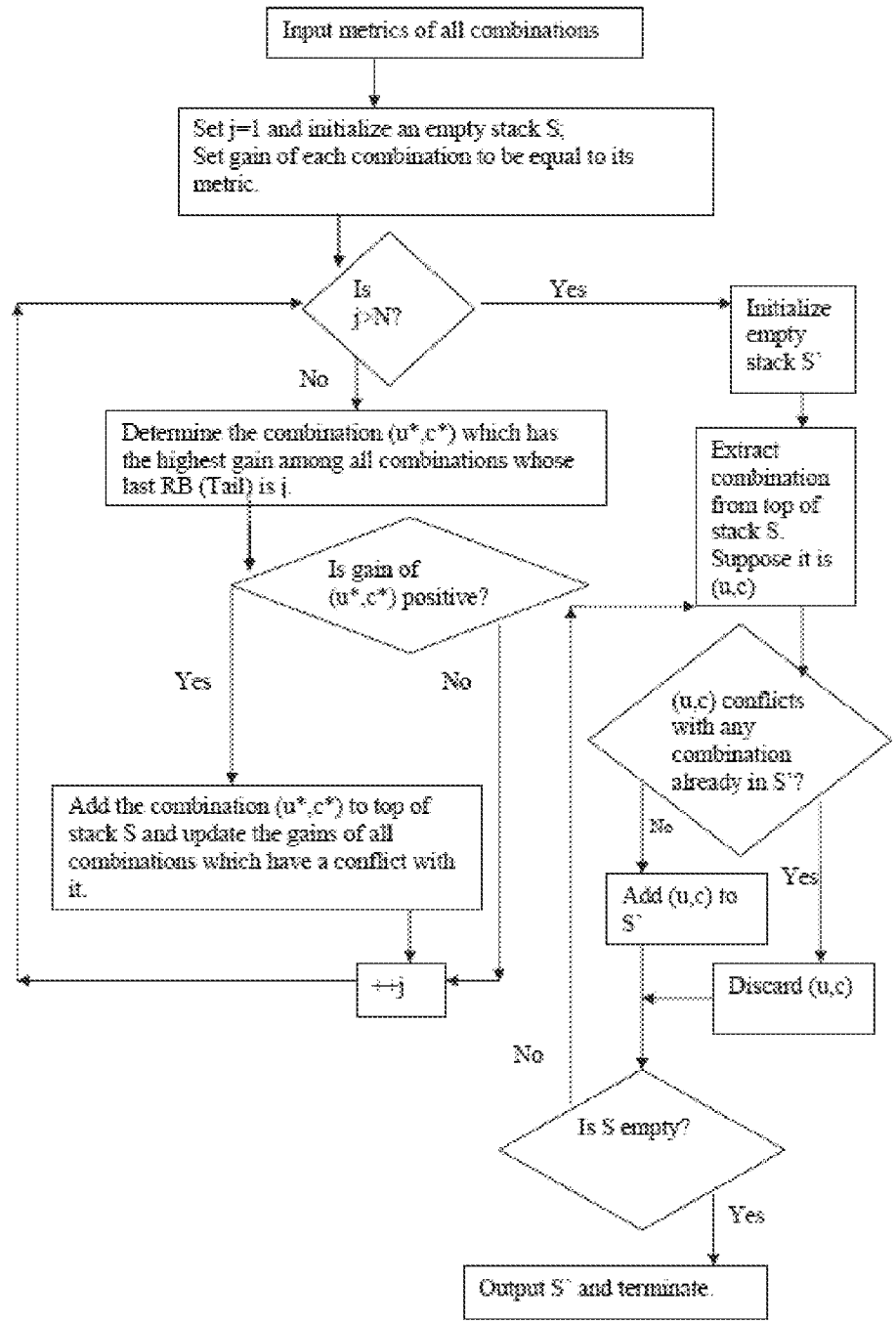
FIG. 19 is a detail flow chart showing example MU scheduling for LTE Release 8 UL and beyond according to an aspect of the present disclosure.
Figure 20:
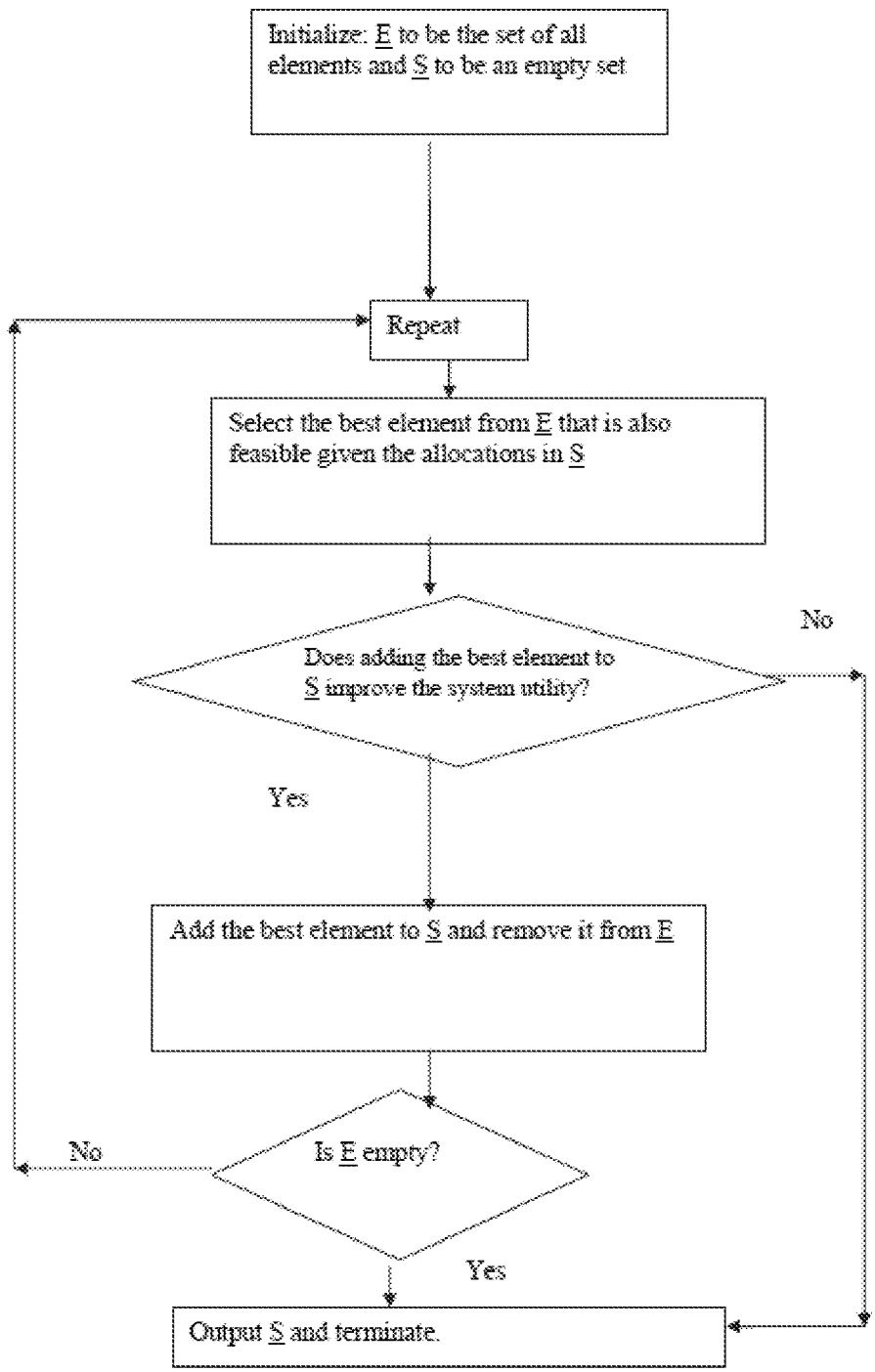
FIG. 20 is a detail flow chart showing example MU scheduling for LTE Release 10 and beyond UL according to an aspect of the present disclosure.
Figure 21:
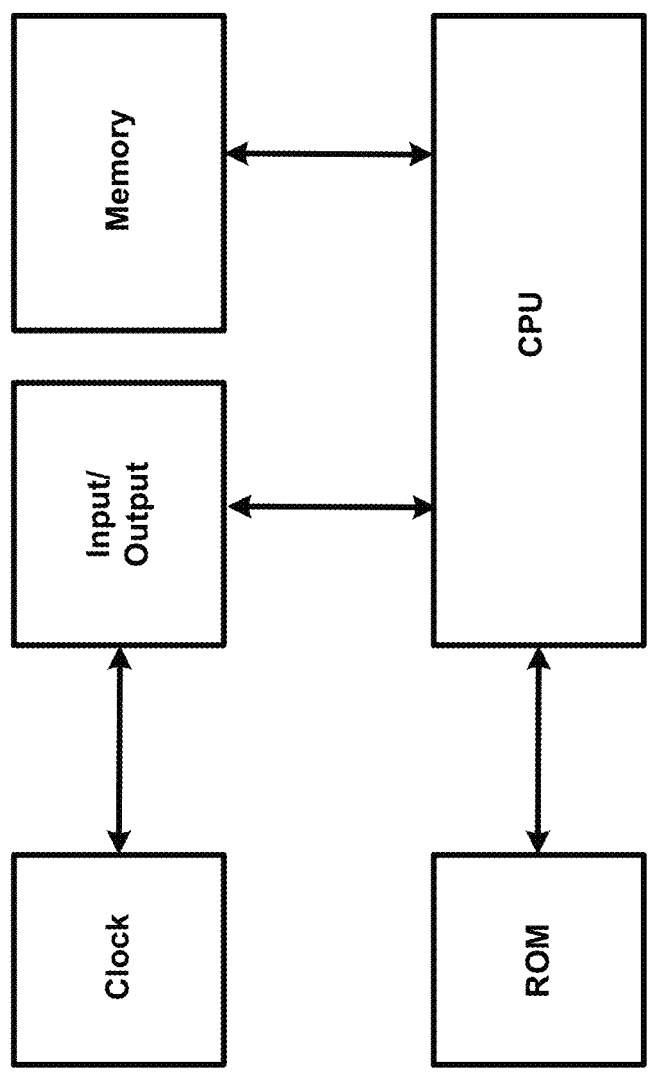
FIG. 21 is a schematic diagram of an exemplary computer/processing system which may execute methods and programs according to an aspect of the present disclosure.

Next, in FIG. 7 we plot the normalized complexities for the scheduling schemes considered in FIGS. 2 to 5. Here the complexity of a scheduling scheme is determined by the complexity of the metric computations made by it. In all cases the second phase is performed for Algorithm IIa and more importantly the sub-additivity property together with the on-demand metric computation feature are exploited, as described in Section 3, to avoid redundant metric computations. All schemes compute the metrics {p(U,c):(U,c)∈$\mathcal{M}$ & |U|=1} and each such metric is deemed to have unit complexity when each user has one transmit antenna and a complexity of two units when each user two transmit antennas. On the other hand, for each evaluated p(U,c):|U|=2, the complexity is taken to be two units when each user has one transmit antenna and the BS employs the MMSE receiver and one unit when each user has one transmit antenna and the BS employs the SIC receiver. The latter stems from the fact that with the SIC receiver, one of the users sees an interference free channel. Thus, its contribution to the metric is equal to the already computed single-user metric determined for the allocation when that user is scheduled alone on the corresponding chunk. Similarly, for each evaluated p(U,c):|U|=2, the complexity is taken to be eight units when each user has two transmit antennas and the BS employs transmit antenna selection together with the MMSE receiver and four units for the case when the BS employs transmit antenna selection together with the SIC receiver. Note that MMSE-Total, SIC-Total denote the complexities obtained by counting the corresponding complexities for all pairs (U,c)∈$\mathcal{M}$, respectively, whereas MMSE-AS-Total, SIC-AS-Total denote the total complexities obtained when antenna selection is employed by the BS together with the MMSE receiver and the SIC receiver, respectively. Note that all complexities in FIG. 7 are normalized by MMSE-AS-Total. The key takeaway from FIG. 7 is that exploiting sub-additivity together with the on-demand metric computation can result in very significant complexity reduction. In particular, as per our definition of complexity, more than 80% reduction can be obtained for the MMSE receiver and more than 75% reduction can be obtained for the SIC receiver, with the respective gains being larger when antenna selection is also exploited. Further, we note that considering Algorithm IIa, the second phase itself adds a very small complexity overhead but results in a large performance improvement. To illustrate this, for the MMSE receiver the complexity overhead ranges from 2 to 4%, whereas the performance improvement ranges from 9 to 13%, respectively. Finally, in FIG. 8 we conduct a complexity comparison identical to that in FIG. 7 except that the complexity computed for each p(U,c) is now also multiplied by the size of the chunk indicated by c. Notice that the complexity reductions achieved by exploiting sub-additivity property together with the on-demand metric computation feature are now even larger.

We next propose a sequential LRT based MU scheduling approach that yields a scheduling decision over $\mathcal{M}^{narrow}$. As before, our focus is on avoiding as many metric computations as possible. The idea is to implement the LRT based MU scheduling algorithm in T iterations, where we recall T denotes the maximum number of users that can be co-scheduled on an RB. In particular, in the $s^{th}$ iteration where $1 \leq s \leq T-1$, we first perform the following steps to obtain metrics $\breve{p}(U,c), \forall (U,c) \in \mathcal{M}^{narrow}$, where only a few of these metrics are positive, and then use these metrics in Algorithm IIa to obtain a tentative scheduling decision.

Initialize $\breve{p}(U,c)=0, \forall (U,c) \in \mathcal{M}^{narrow}$. Let S' denote the output obtained from the previous iteration.

For each $(U,c) \in S'$ we ensure that any user in set U can be scheduled in the $s^{th}$ iteration only as part of a set that contains all users in U along with at-most one additional user, by setting $$\breve{p}(U',c')=0 \text{ if } (U \subseteq U' \text{ \& } U' \cap U \neq \Phi) \text{ or } (|U'| > |U|+1 \text{ \& } U' \cap U \neq \Phi), \forall (U',c') \in \mathcal{M}^{narrow}. \quad (11)$$

For each $(U,c) \in S'$, we also ensure that any user in set U must be assigned all RBs in c, by considering each $(U',c') \in \mathcal{M}^{narrow} : U \subseteq U' \text{ \& } |U'| \leq |U|+1$, and setting $$\breve{p}(\mathcal{U}',c') = \quad (12)$$
$$\begin{cases} p(\mathcal{U}',c'), & \text{If Tail}(c') \geq \text{Tail}(c) \text{ \& Head}(c') \leq \text{Head}(c) \\ 0, & \text{Otherwise} \end{cases} \quad (13)$$

In the last iteration, i.e. when $s=T$, we initialize $\breve{p}(U,c)=p(U,c), \forall (U,c) \in \mathcal{M}^{narrow}$. Then, using the set S' obtained as the output of the $(T-1)^{th}$ iteration, we perform the two aforementioned steps. Additionally, to ensure non-overlapping chunk allocation, for each $(U,c) \in S'$ we set $$\breve{p}(U',c')=0 \text{ if } c' \cap c \neq \Phi \text{ \& } U' \cap U = \Phi, \forall (U',c') \in \mathcal{M}^{narrow}. \quad (14)$$

Notice that in each iteration only a small subset out of the set of all metrics is selected, which in particular is that whose corresponding pairs are compatible (as defined in the aforementioned conditions) with the output tentative scheduling decision of the previous iteration. These compatibility conditions ensure that the set of non-zero metrics (i.e., the chosen metrics) is small and each iteration builds upon the decision of the previous iteration. Indeed, in each iteration any (user set, chunk) allocation made by the previous iteration can only be altered by adding one additional user and/or by expanding the chunk. Next, we offer an approximation result for the sequential LRT based MU scheduling that holds under mild assumptions.

Assumption 2. Suppose F is any allocation $\{(U,c)\}$ that is feasible for (3). Then F is downward closed in the following sense. Any allocation F' constructed as $F'=\{(U',c):U' \subseteq U \text{ \& } (U,c) \in F\}$ is also feasible.

Proposition 1. Suppose that Assumptions 1 and 2 are satisfied. Let the weighted sum rate yielded by the sequential LRT based MU scheduling over $\mathcal{M}^{narrow}$ be denoted by $\hat{W}^{seq-narrow}$. Then, $$\hat{W}^{seq-narrow} \geq \frac{\hat{W}^{opt,narrow}}{T(2 + \Delta + 2J)}. \quad (15)$$

In a practical cellular system the number of active users can be large. Indeed the control channel constraints may limit the BS to serve a much smaller subset of users. It thus makes sense from a complexity stand-point to pre-select a pool of good users and then use the MU scheduling algorithm on the selected pool of users. Here we propose a few user pre-selection algorithms. For convenience, wherever needed, we assume that at-most two users can be co-scheduled on an RB (i.e., T=2) which happens to be the most typical value.

Before proceeding we need to define some terms that will be required later. Suppose that each user has one transmit antenna and let $h_{u,j}$ denote the effective channel vector seen at the BS from user u on RB j, where $1 \leq u \leq K$ and $1 \leq j \leq N$. Note that the effective channel vector includes the fading as well as the path loss factor and a transmit power value. Then, letting $w_u$ denote the PF weight of user u, we define the following metrics:

Consider first the weighted rate that the system can obtain when it schedules user u alone on RB j, $$p^{su}(u,j) = w_u \log(1 + h_{u,j}^\dagger h_{u,j}), \forall 1 \leq u \leq K \text{ \& } 1 \leq j \leq N. \quad (16)$$

Let $U=\{u,v\}: u \neq v$ be any pair of users and suppose that the BS employs the MMSE receiver. Then, the weighted sum rate obtained by scheduling the user pair U on RB j is given by $$p^{mmse}(U,j) = w_u \log(1 + h_{u,j}^\dagger (I + h_{v,j} h_{v,j}^\dagger)^{-1} h_{u,j}) + w_v \log(1 + h_{v,j}^\dagger (I + h_{u,j} h_{u,j}^\dagger)^{-1} h_{v,j}). \quad (17)$$

Finally, assume that the BS employs the SIC receiver and let $\hat{u} = \arg\max_{s \in U}\{w_s\}$ and let $\hat{v} = U \setminus \hat{u}$. Then, the weighted sum rate obtained by scheduling the user pair U on RB j is given by $$p^{sic}(U,j) = p^{su}(\hat{u},j) + w_{\hat{v}} \log(1 + h_{\hat{v},j}^\dagger (I + h_{\hat{u},j} h_{\hat{u},j}^\dagger)^{-1} h_{\hat{v},j}). \quad (18)$$

We are now ready to offer our user pre-selection rules where a pool of $\tilde{K}$ users must be selected from the K active users. Notice that to reduce complexity, all rules neglect the contiguity and the complete overlap constraints.

1. The first rule simply selects the $\tilde{K}$ users that offer the $\tilde{K}$ largest single-user rates among $\{\sum_{j=1}^{N} p^{su}(u,j)\}_{u=1}^{K}$.
2. The second rule assumes that each RB can be assigned to at-most one user. Then, if a subset $A \subseteq \{1, \ldots, K\}$ is selected, the system weighted sum-rate is given by $$f(\mathcal{A}) \triangleq \sum_{j=1}^{N} \max_{u \in \mathcal{A}}\{p^{su}(u,j)\}. \quad (19)$$

It can be shown that $f:2^{\{1, \ldots, K\}} \to IR_+$ is a monotonic sub-modular set function [15]. As a result, the user pre-selection problem $$\arg\max_{\mathcal{A} \subseteq \{1, \ldots, K\}: |\mathcal{A}| \leq \tilde{K}} \{f(\mathcal{A})\} \quad (20)$$

can be sub-optimally solved by adapting a simple greedy algorithm [19], which offers a half approximation [15].

3. The third rule assumes that each RB can be assigned to at-most two users and that the BS employs the MMSE receiver. Then, if a subset $A \subseteq \{1, \ldots, K\}$ is selected, the system weighted sum-rate is given by $$g(\mathcal{A}) \triangleq \sum_{j=1}^{N} \max\left\{\max_{u\in\mathcal{A}}\{p^{su}(u,j)\}, \max_{\substack{\mathcal{U}=(u,v):u<v \\ u,v\in\mathcal{A}}}\{p^{mmse}(\mathcal{U},j)\}\right\}. \quad (21)$$

It can be shown that $g:2^{\{1,\ldots,K\}} \to \mathrm{IR}_+$ is a monotonic set function but unfortunately it need not be sub-modular. Nevertheless, we assume it to be sub-modular and proceed to employ the greedy algorithm to sub-optimally solve $$\arg\max_{\mathcal{A}\subseteq\{1,\ldots,K\}:|\mathcal{A}|\leq \tilde{K}}\{g(\mathcal{A})\} \quad (22)$$

4. The fourth rule also assumes that each RB can be assigned to at-most two users but that the BS employs the SIC receiver. However, even upon replacing $p^{mmse}(U,j)$ in (21) with $p^{sic}(U,j)$, the resulting set function need not be sub-modular. As a result we use a different metric. In particular, for a subset $A \subseteq \{1, \ldots, K\}$ we employ a metric that is given by $$h(\mathcal{A}) \triangleq \sum_{j=1}^{N} \sum_{\substack{\mathcal{U}=(u,v):u\leq v \\ u,v\in\{1,\ldots,K\}}} (p^{su}(\mathcal{U}\cap\mathcal{A},j)\chi(|\mathcal{U}\cap\mathcal{A}|=1) + p^{sic}(\mathcal{U},j)\chi(|\mathcal{U}\cap\mathcal{A}|=2)) =$$

$$\sum_{j=1}^{N}\left((K-|\mathcal{A}|+1)\sum_{u\in\mathcal{A}}p^{su}(u,j) + \sum_{\substack{\mathcal{U}=(u,v):u<v \\ u,v\in\mathcal{A}}}p^{sic}(\mathcal{U},j)\right). \quad (23)$$

Notice that for any A, h(A) represents the system weighted sum-rate when time-sharing is employed by the system wherein in each slot only a particular user or two distinct users from a particular pair in $\{1, \ldots, K\}$ are allowed to be scheduled. Then, a key result is the following.
Proposition 2. The set function h(.) defined in (23) is a monotonic sub-modular set function. Thus the problem $$\arg\max_{\mathcal{A}\subseteq\{1,\ldots,K\}:|\mathcal{A}|\leq \tilde{K}}\{h(\mathcal{A})\} \quad (24)$$

can be solved sub-optimally (with a ½ approximation) by a simple greedy algorithm.

As a benchmark to compare the performance of the proposed user pre-selection algorithms we can consider the case where LRT MU scheduling is employed without user pre-selection but where an additional knapsack constraint is used to enforce the limit on the number of users that can be scheduled in an interval. It can be verified that this can be achieved by defining a knapsack constraint in (3) as $$\beta^1(\mathcal{U},c) = \frac{|\mathcal{U}|}{K}, \forall (\mathcal{U},c) \in \mathcal{M}.$$

We now present the performance of our MU scheduling algorithms via detailed system level simulations. The simulation parameters conform to those used in 3GPP LTE evaluations and are given in Table 4. In all cases inter-cell interference suppression (IRC) is employed by each base-station (BS).

We first consider the case when each cell (or sector) has an average of 10 users and where there are no knapsack constraints. In Table 5 we report the cell average and cell edge spectral efficiencies. The percentage gains shown for the MU scheduling schemes are over the baseline LRT based single-user scheduling scheme. Note that for the first three scheduling schemes we employed the second phase described in Section 4. As seen from Table 5, MU scheduling in conjunction with an advanced SIC receiver at the BS can result in very significant gains in terms of cell average throughout (about 27%) along with good cell edge gains. For the simpler MMSE receiver, we see significant cell average throughout gains (about 18%) but a degraded cell edge performance. We note that it is possible to tradeoff a small fraction of the cell edge gains for a large cell edge performance improvement by altering the PF rule. Finally, the last two reported schemes are based on the sequential-LRT method described in Section 6. We notice that sequential-LRT based scheduling provides significant cell average gains while retaining the cell edge performance of SU scheduling. Thus, the sequential LRT based scheduling method is an attractive way to tradeoff some cell average throughput gains for a reduction in complexity.

Next, in Tables 6 and 7 we consider LRT based MU scheduling, with the second phase described in Section 4, for the case when the BS employs the MMSE receiver and the case when it employs the SIC receiver, respectively. In each case we assume that an average of 15 users are present in each cell and at-most 7 first-transmission users can be scheduled in each interval. Thus, a limit on the number of scheduled users might have to be enforced in each scheduling interval. As a benchmark, we enforce this constraint (if it is required) using one knapsack constraint as described in Section 7. Note that upon specializing the result in Theorem 1 (with $\mathcal{M}^{wide}=\Phi$, T=2 and $\Delta=0$, J=1)) we see that the LRT based MU scheduling algorithm guarantees an approximation factor of ⅕. Then, we examine the scenario where a pool of $\tilde{K}=7$ users is pre-selected whenever the number of first-transmission users is larger than 7. The LRT based MU scheduling algorithm is then employed on this pool without any constraints. In Table 6 we have used the first second and third pre-selection rules from Section 7 whereas in Table 7 we have used the first second and fourth pre-selection rules. It is seen that the simple rule one provides a superior performance compared to the benchmark. Indeed, it is attractive since it involves computation of only single user metrics. The other rule (rule 2) which possess this feature, however provides much less improvement mainly because it is much more aligned to single user scheduling. Rules 3 and 4 involve computation of metrics that involve user-pairing and hence incur higher complexity. For the MMSE receiver, the gain of rule 3 over rule 1 is marginal mainly because the metric in rule 3 is not sub-modular and hence cannot be well optimized by the simple greedy rule. On the other hand, considering the MMSE receiver, the gain of rule 4 over rule 1 is larger because the metric used in rule 4 is indeed sub-modular and hence can be well optimized by the simple greedy rule.

We considered resource allocation in the 3GPP LTE cellular uplink which allows for transmit antenna selection for each scheduled user as well as multi-user scheduling, wherein multiple users can be assigned the same time-frequency resource. We showed that the resulting resource allocation problem, which must comply with several practical constraints, is NP-hard. We then proposed constant-factor polynomial-time approximation algorithms and demonstrated their performance via simulations.

The following enumerated references have been referenced throughout the detailed description pertaining to the 3GPP cellular uplink. We list the references here for completeness, although they have been cited on separate disclosure documents as appropriate.

[1] 3GPP, "TSG-RAN EUTRA, rel.8," *TR* 36.101, June 2011.

[2] 3GPP, "TSG-RAN EUTRA, rel.10," *TR* 36.213, December 2010.

[3] W. Yu and W. Rhee, "Degrees of freedom in wireless multiuser spatial multiplex systems with multiple antennas," *IEEE Trans. Commun.*, vol. 54, pp. 1747-1753, October 2006.

[4] D. Tse and S. Hanly, "Multiaccess fading channels-part I: Polymatroid structure, optimal resource allocation, and throughput capacities," *IEEE Trans. Inform. Theory*, 1998.

[5] W. Yu and J. Cioffi, "Constant power water-filling: Performance bound and low-complexity implementation," *IEEE Trans. Commun.*, vol. 54, pp. 23-28, January 2006.

[6] A. Barnoy, R. Bar-Yehuda, A. Freund, J. Naor, and B. Schieber, "A unified approach to approximating resource allocation and scheduling," *ACM Symposium on Theory of Computing*, 2000.

[7] H. Yang, F. Ren, C. Lin, and J. Zhang, "Frequency-domain packet scheduling for 3GPP LTE uplink," *IEEE Infocom*, 2010.

[8] W. Yu and R. Liu, "Dual methods for nonconvex spectrum optimization of multicarrier systems," *IEEE Trans. Commun.*, vol. 54, pp. 1310-1322, July 2006.

[9] W. Yu, R. Liu, and R. Cendrillon, "Dual optimization methods for multiuser orthogonal frequency division multiplex systems," *Proc. IEEE Global Telecommun. Conf. (Globecom)*, 2004.

[10] C. Wong, R. Cheng, K. Letaief, and R. Murch, "Multiuser OFDM with adaptive subcarrier, bit, and power allocation," *IEEE J. Select. Areas Commun.*, vol. 17, pp. 1747-1758, October 1999.

[11] S. Lee, S. Choudhury, A. Khohnevi, S. Xu, and S. Lu, "Downlink MIMO with frequency-domain packet scheduling for 3GPP LTE," *IEEE Infocom*, 2009.

[12] A. Abrardo, P. Detti, and M. Moretti, "Message passing resource allocation for the uplink of multi-carrier systems," *Proc. IEEE Int. Conf. on Commun. (ICC)*, 2009.

[13] W. Noh, "A distributed resource control for fairness in ofdma systems: English-auction game with imperfect information," *Proc. IEEE Global Telecommun. Conf. (Globecom)*, 2008.

[14] K. Kim and Y. Han, "Joint subcarrier and power allocation in uplink OFDMA systems," *IEEE Commun. Let.*, vol. 9, pp. 526-528, January 2006.

[15] H. Zhang, N. Prasad, and S. Rangarajan, "MIMO downlink scheduling in LTE and LTE-advanced sustems," in *Proc. 2012 IEEE INFOCOM*, (Orlando, Fla.), March 2012.

[16] M. Andrews and L. Zhang, "Multiserver scheduling with contiguity constraints," *Proc. IEEE Infocom*, 2009.

[17] N. Prasad, H. Zhang, M. Jiang, G. Yue, and S. Rangarajan, "Resource allocation in 4G MIMO cellular uplink," *To appear: IEEE Globecom*, 2011.

[18] Y. Liu and E. Knightly, "Opportunistic fair scheduling over multiple wireless channels," in *Proc. 2003 IEEE INFOCOM*, (San Francisco, Calif.), March 2003.

[19] G. L. Nemhauser and L. A. Wolsey, "Best algorithms for approximating the maximum of a submodular set function," *Math. Operations Research*, 1978.

TABLE 1

ALGORITHM II: ALGORITHM FOR LTE UL MU-MIMO

1: Input p($\mathcal{U}$, c), $\forall$ ($\mathcal{U}$, c) $\in \mathcal{M}$ and $\mathcal{M}^{narrow}, \mathcal{M}^{wide}$
2: Determine a feasible allocation over $\mathcal{M}^{narrow}$ using Algorithm IIa and let $\hat{W}^{narrow}$ denote the corresponding weighted sum rate.
3: Determine a feasible allocation over $\mathcal{M}^{wide}$ using Algorithm IIb and let $\hat{W}^{wide}$ denote the corresponding weighted sum rate.
4: Select and output the allocation resulting in $\hat{W} = \max\{\hat{W}^{narrow}, \hat{W}^{wide}\}$.

TABLE 2

ALGORITHM IIa: LRT BASED MODULE
Table 2: Algorithm IIa: LRT based module $\mathcal{M}^{narrow}$ 1: Initialize p'($\mathcal{U}$, c) ← p($\mathcal{U}$, c), $\forall$ ($\mathcal{U}$, c) $\in \mathcal{M}^{narrow}$, stack S = $\phi$
2: For j = 1, ..., N
3: Determine ($\mathcal{U}^*$, c*) = $\mathrm{argmax}^{(\mathcal{U},c) \in \mathcal{M}^{narrow}}_{\mathrm{Tail}(c)=j}$ p'($\mathcal{U}$, c)
4: If p'($\mathcal{U}^*$, c*) > 0 Then
5: Set $\hat{p}$ = p'($\mathcal{U}^*$, c*) and Push ($\mathcal{U}^*$, c*) into S.
6: For each ($\mathcal{U}$, c) $\in \mathcal{M}^{narrow}$ such that p'($\mathcal{U}$, c) > 0
7: If $\exists$ $G_s \mathcal{U} \cap G_s \neq \phi$ & $\mathcal{U}_j^* \cap G_s \neq \phi$ or c* $\cap$ c $\neq \phi$ Then
8: Update p'($\mathcal{U}$, c) ← p'($\mathcal{U}$, c) − $\hat{p}$
9: Else If $\exists$ q $\in$ I:$\alpha^q$ ($\mathcal{U}$, c) = $\alpha^q$($\mathcal{U}_j^*$, $c_j^*$) = 1 Then
10: Update p'($\mathcal{U}$, c) ← p'($\mathcal{U}$, c) − $\hat{p}$
11: Else
12: Update p'($\mathcal{U}$, c) ← p'($\mathcal{U}$, c) − 2$\hat{p}$ $\max_{1 \leq q \leq J} \beta^q$($\mathcal{U}$, c).
13: End If
14: End For
15: End If
16: End For
17: Set stack S' = $\phi$
18: While S $\neq \phi$
19: Obtain ($\mathcal{U}$, c) = Pop S
20: If ($\mathcal{U}$, c) $\cup$ S' is valid Then %% ($\mathcal{U}$, c) $\cup$ S' is deemed valid if no user in $\mathcal{U}$ is incompatible with any user present in S' and no chunk in S' has an overlap with c and all knapsack constraints are satisfied by ($\mathcal{U}$, c) $\cup$ S'.
21: Update S' ← ($\mathcal{U}$, c) $\cup$ S'
22: End While
23: Output S' and $\hat{W}^{narrow}$ = $\Sigma_{(\mathcal{U}, c) \in S'}$ p($\mathcal{U}$, c).

TABLE 3

ALGORITHM IIB: GREEDY MODULE
Table 3: Algorithm IIb: Greedy module over $\mathcal{M}^{wide}$ 1: Input p($\mathcal{U}$, c), $\forall$ ($\mathcal{U}$, c) $\in \mathcal{M}^{wide}$ and $\{V^{(q)}\}_{q=1}^J$.
2: Set S = $\phi$ and $\mathcal{M}' = \mathcal{M}^{wide}$.
3: Repeat
4: Determine ($\mathcal{U}^*$, c*) = $\mathrm{argmax}_{S \cup (\mathcal{U}, c) \text{ is valid}}^{(\mathcal{U}, c) \in \mathcal{M}'}$ p($\mathcal{U}$, c).
5: Update S ← S $\cup$ ($\mathcal{U}^*$, c*) and $\mathcal{M}' = \mathcal{M}' \setminus \{V^{(q)}:(\mathcal{U}^*, c^*) \in V^{(q)}\}$
6: Until ($\mathcal{U}^*$, c*) = $\phi$ or $\mathcal{M}' = \phi$.
7: Output S and $\hat{W}^{wide} = \Sigma_{(\mathcal{U}, c) \in S}$ p($\mathcal{U}$, c).

A Appendix: Proof of Theorem 1

Let us specialize (3) to instances where all the knapsack constraints are vacuous, where L=K and $G_s=\{s\}$, $1 \leq s \leq K$ and where p(U,c)=0 whenever $|U| \geq 2$ for all (U,c)$\in \mathcal{M}$. Then (3) reduces to the SU scheduling problem considered in [7,16] which was shown there to be APX-hard. Consequently, we can assert that (3) is APX-hard.

Next, consider first Algorithm IIa which outputs a feasible allocation over $\mathcal{M}^{narrow}$ yielding a weighted sum rate $\hat{W}^{narrow}$. Let $\hat{W}^{opt,narrow}$ denote the optimal weighted sum rate obtained by solving (3) albeit where all pairs (U,c) are restricted to lie in $\mathcal{M}^{narrow}$. We will prove that $$\hat{W}^{narrow} \geq \frac{\hat{W}^{opt,narrow}}{1+T+\Delta+2J}. \quad (25)$$

We present a proof that invokes results from [7] as much as possible and highlights mainly the key differences which allow us to co-schedule multiple users on a chunk and satisfy multiple knapsack constraints. Note that Algorithm IIa builds up the stack S in N steps. In particular let $S_j$, $j=1, \ldots, N$ be the element that is added in the $j^{th}$ step and note that either $S_j=\Phi$ or it is equal to some pair $(U^*_j, c^*_j)$. As in [7], we use two functions $p_1^{(j)}: \mathcal{M}^{narrow} \to IR_+$ and $p_2^{(j)}: \mathcal{M}^{narrow} \to IR_+$ for $j=0, \ldots, N$ to track the function $p'(,)$ as the stack S is being built up over N steps and in particular we set $p_1^{(0)}(U,c)=0$, $\forall (U,c) \in \mathcal{M}^{narrow}$ and $p_2^{(0)}(U,c)=p(U,c)$, $\forall (U,c) \in \mathcal{M}^{narrow}$. For our problem at hand, we define $\{p_1^{(j)}(U,c), p_2^{(j)}(U,c)\}$ recursively as $$p_1^{(j)}(\mathcal{U}, c) = \begin{cases} (p_2^{(j-1)}(\mathcal{U}_j^*, c_j^*))^+ + \chi(p_2^{(j-1)}(\mathcal{U}, c) > 0), & \text{If } c_j^* \cap c \neq \phi \\ (p_2^{(j-1)}(\mathcal{U}_j^*, c_j^*))^+ + \chi(p_2^{(j-1)}(\mathcal{U}, c) > 0), & \text{ElseIf } \exists \mathcal{G}_s : \mathcal{U} \cap \mathcal{G}_s \neq \phi \,\&\, \mathcal{U}_j^* \cap \mathcal{G}_s \neq \phi \\ (p_2^{(j-1)}(\mathcal{U}_j^*, c_j^*))^+ + \chi(p_2^{(j-1)}(\mathcal{U}, c) > 0), & \text{ElseIf } \exists q \in I : \alpha^q(\mathcal{U}, c) = \alpha^q(\mathcal{U}_j^*, c_j^*) = 1 \\ 2(p_2^{(j-1)}(\mathcal{U}_j^*, c_j^*))^+ + \chi(p_2^{(j-1)}(\mathcal{U}, c) > 0) \max_{1 \leq q \leq J} \beta^q(\mathcal{U}, c), & \text{Otherwise} \end{cases} \quad (26)$$

$$p_2^{(j)}(\mathcal{U}, c) = p_2^{(j-1)}(\mathcal{U}, c) - p_1^{(j)}(\mathcal{U}, c),$$

where $(x)^+ = \max\{x, 0\}$, $x \in IR$, $X(.)$ denotes the indicator function and $$(\mathcal{U}_j^*, c_j^*) = \text{argmax}_{\substack{(\mathcal{U}, c) \in \mathcal{M}^{narrow} \\ \text{Tail}(c)=j}} p_2^{(j-1)}(\mathcal{U}, c).$$

Hence, we have that $$p_2^{(j-1)}(U,c) = p_2^{(j)}(U,c) + p_1^{(j)}(U,c), \forall (U,c) \in \mathcal{M}^{narrow}, \quad j=1, \ldots, N. \quad (27)$$

It can be noted that $$p_2^{(j)}(U,c) \leq 0, \forall (U,c) \in \mathcal{M}^{narrow} : \text{Tail}(c) \leq j$$

$$p_2^{(k)}(U,c) \leq p_2^{(j)}(U,c), \forall (U,c) \in \mathcal{M}^{narrow} \,\&\, k \geq j. \quad (28)$$

Further, to track the stack S' which is built in the while loop of the algorithm, we define stacks $\{S^*_j\}_{j=0}^N$ where $S^*_N = \Phi$ and $S^*_j$ is the value of S' after the Algorithm has tried to add $\cup_{m=j+1}^N S_m$ to S' (starting from $S' = \Phi$) so that $S^*_0$ is the stack S' that is the output of the Algorithm. Note that $S^*_{j+1} \subseteq S^*_j \subseteq S^*_{j+1} \cup S_{j+1}$. Next, for $j=0, \ldots, N$, we let $W^{(j)opt}$ denote the optimal solution to (3) but where $\mathcal{M}$ is replaced by $\mathcal{M}^{narrow}$ and the function $p(,)$ is replaced by $p_2^{(j)}(,)$. Further, let $W^{(j)} = \Sigma_{(U,c) \in S^*_j} p_2^{(j)}(U,c)$ and note that $\hat{W}^{opt,narrow} = W^{(0)opt}$ and $\hat{W}^{narrow} = W^{(0)}$. We will show via induction that $$W^{(j)opt} \leq (T+1+\Delta+2J) W^{(j)}, \forall j=N, \ldots, 0, \quad (29)$$

which includes the claim in (25) at $j=0$. The base case $W^{(N)opt} \leq (T+1+\Delta+2J) W^{(N)}$ is readily true since $S^*_N = \Phi$ and $p_2^{(N)}(U,c) \leq 0$, $\forall (U,c) \in \mathcal{M}^{narrow}$. Assume that (29) holds for some j. We focus only on the main case in which $S_j = (U^*_j, c^*_j) \neq \Phi$ (the remaining case holds trivially true). Note that since $(U^*_j, c^*_j)$ is added to the stack S in the algorithm, $p_2^{(j-1)}(U^*_j, c^*_j) > 0$. Then from the update formulas (26), we must have that $p_2^{(j)}(U^*_j, c^*_j) = 0$. Using the fact that $S^*_{j-1} \subseteq S^*_j \cup (U^*_j, c^*_j)$ together with the induction hypothesis, we can conclude that $$W^{(j)} = \sum_{(\mathcal{U},c) \in S_j^*} p_2^{(j)}(\mathcal{U}, c) = \sum_{(\mathcal{U},c) \in S_{j-1}^*} p_2^{(j)}(\mathcal{U}, c) \geq \frac{W^{(j)opt}}{T+1+\Delta+2J}. \quad (30)$$

Next, we will show that $$\sum_{(\mathcal{U},c) \in S_{j-1}^*} p_1^{(j)}(\mathcal{U}, c) \geq p_2^{(j-1)}(\mathcal{U}_j^*, c_j^*). \quad (31)$$

Towards this end, suppose that $S^*_{j-1} = S^*_j \cup (U^*_j, c^*_j)$. Then, recalling (26) we can deduce that (31) is true since $p_1^{(j)}(U^*_j, c^*_j) = p_2^{(j-1)}(U^*_j, c^*_j)$. Suppose now that $S^*_{j-1} = S^*_j$. In this case we can have two possibilities. In the first one $(U^*_j, c^*_j)$ cannot not be added to $S^*_j$ due to the presence of a pair $(U', c') \in S^*_j$ for which at-least one of these three conditions are satisfied: $\exists \mathcal{G}_s : U' \cap \mathcal{G}_s \neq \Phi \,\&\, U^*_j \cap \mathcal{G}_s \neq \Phi$; $c' \cap c^*_j \neq \Phi$ and $\exists q \in I : \alpha^q(U', c') = \alpha^q(U^*_j, c^*_j) = 1$. Since any pair $(U', c') \in S^*_j$ was added to S in the algorithm after the $j^{th}$ step, from the second inequality in (28) we must have that $p_2^{(j-1)}(U', c') > 0$. Recalling (26) we can then deduce that $p_1^{(j)}(U', c') = p_2^{(j-1)}(U^*_j, c^*_j)$ which proves (31). In the second possibility, $(U^*_j, c^*_j)$ cannot not be added to $S^*_j$ due to a generic knapsack constraint being violated. In other words, for some $q \in \{1, \ldots, J\}$, we have that $$\sum_{(\mathcal{U},c) \in S_j^*} \beta^q(\mathcal{U}, c) > 1 - \beta^q(\mathcal{U}_j^*, c_j^*). \quad (32)$$

Since $(U^*_j, c^*_j) \in \mathcal{M}^{narrow}$, $\beta^q(U^*_j, c^*_j) \leq \frac{1}{2}$ so that $$2 \sum_{(\mathcal{U},c) \in S_j^*} \max_{1 \leq q \leq J} \beta^q(\mathcal{U}, c) \geq 2 \sum_{(\mathcal{U},c) \in S_j^*} \beta^q(\mathcal{U}, c) > 1. \quad (33)$$

which along with (26) also proves (31). Thus, we have established the claim in (31).

Finally, letting $V^{(j)opt}$ denote the optimal solution to (3) but where $\mathcal{M}$ is replaced by $\mathcal{M}^{narrow}$ and the function $p(,)$ is replaced by $p_1^{(j)}(,)$, we will show that $$p_2^{(j-1)}(\mathcal{U}_j^*, c_j^*) \geq \frac{V^{(j)opt}}{T+1+\Delta+2J}. \quad (34)$$

Towards this end, from (26) we note that for any pair $(U,c) \in \mathcal{M}^{narrow}$, $p_1^{(j)}(U,c) \leq p_2^{(j-1)}(U^*_j, c^*_j)$. Let $V_1^{(j)opt}$ be an optimal allocation of pairs that results in $V^{(j)opt}$. For any two pairs $(U_1, c_1), (U_2, c_2) \in V_1^{(j)opt}$ we must have that for each $G_s$, $1 \leq s \leq L$, at-least one of $U_1 \cap G_s$ and $U_2 \cap G_s$ is $\Phi$, as well as $c_1 \cap c_2 = \Phi$. In addition, $|U_1|$ and $|U_2|$ are no greater than T. Thus we can have at-most T such pairs $\{(U_i, c_i)\}$ in $V_1^{(j)opt}$ for which $\exists G_s: U \cap G_s \neq \Phi$ & $U^*_j \cap G_s \neq \Phi$. Further, using the first inequality in (28) we see that any pair $(U,c)$ for which $c \cap c^*_j \neq \Phi$ and $p_1^{(j)}(U,c) = p_2^{(j-1)}(U^*_j, c^*_j)$ must have Tail$(c) \geq j$ so that $j \in c$. Thus, $V_1^{(j)opt}$ can include at-most one pair $(U,c)$ for which $c \cap c^*_j \neq \Phi$. Next, there can be at-most $\Delta$ constraints in I for which $\alpha^q(U^*_j, c^*_j) = 1$, $q \in I$ is satisfied. For each such constraint $q \in I$ we can pick at-most one pair $(U,c)$ for which $\alpha^q(U,c) = 1$ and $p_1^{(j)}(U,c) = p_2^{(j-1)}(U^*_j, c^*_j)$. Thus, $V_1^{(j)opt}$ can include at-most $\Delta$ such pairs, one for each constraint. Now the remaining pairs in $V_1^{(j)opt}$ (whose users do not intersect $U^*_j$ and whose chunks do not intersect $c^*_j$ which do not violate any binary knapsack constraint in the presence of $(U^*_j, c^*_j)$) must satisfy the generic knapsack constraints. Let these pairs form the set $\tilde{V}_1^{(j)opt}$ so that $$\sum_{(\mathcal{U},c) \in \tilde{V}_1^{(j)opt}} p_1^{(j)}(\mathcal{U}, c) = \sum_{(\mathcal{U},c) \in \tilde{V}_1^{(j)opt}} 2p_2^{(j-1)}(\mathcal{U}_j^*, c_j^*) \max_{1 \leq q \leq J} \beta^q(\mathcal{U}, c) \leq$$

$$2p_2^{(j-1)}(\mathcal{U}_j^*, c_j^*) \sum_{q=1}^{J} \sum_{(\mathcal{U},c) \in \tilde{V}_1^{(j)opt}} \beta^q(\mathcal{U}, c) \leq 2J_{p_2^{(j-1)}}(\mathcal{U}_j^*, c_j^*).$$

Combining these observations we have that $$V^{(j)opt} = \sum_{(\mathcal{U},c) \in V_1^{(j)opt}} p_1^{(j)}(\mathcal{U}, c) \leq (1+T+\Delta 2J) p_2^{(j-1)}(\mathcal{U}_j^*, c_j^*). \quad (35)$$

which is the desired result in (34).

Thus, using (30), (31) and (34) we can conclude that $$(1+T+\Delta+2J) \sum_{(\mathcal{U},c) \in S^*_{J-1}} \frac{(p_1^{(j)}(\mathcal{U}, c) + p_2^{(j)}(\mathcal{U}, c)}{p_2^{(j-1)}(\mathcal{U},c)} \geq \quad (36)$$

$$V^{(j)opt} + W^{(j)opt} \geq W^{(j-1)opt}.$$

which proves the induction step and proves the claim in (25).

Let us now consider the remaining part which arises when $\mathcal{M}^{wide} \neq \Phi$. Consider first Algorithm IIb which outputs a feasible allocation over $\mathcal{M}^{wide}$ yielding a weighted sum rate $\hat{W}^{wide}$. Let $\hat{W}^{opt,wide}$ denote the optimal weighted sum rate obtained by solving (3) albeit where all pairs $(U,c)$ are restricted to lie in $\mathcal{M}^{wide}$. We will prove that $$\hat{W}^{wide} \geq \frac{\hat{W}^{opt,wide}}{J}. \quad (37)$$

Let $V^{opt,wide}$ be an optimal allocation of pairs from $\mathcal{M}^{wide}$ that results in a weighted sum rate $\hat{W}^{opt,wide}$. Clearly, in order to meet the knapsack constraints, $V^{opt,wide}$ can include at-most one pair from each $V^{(q)}$, $1 \leq q \leq J$ so that there can be at-most J pairs in $V^{opt,widw}$. Thus, by selecting the pair yielding the maximum weighted sum-rate we can achieve at-least $\hat{W}^{opt,wide}/J$. The greedy algorithm first selects the pair yielding the maximum weighted sum rate among all pairs in $\mathcal{M}^{wide}$ and then attempts to add pairs to monotonically improve the objective. Thus, we can conclude that (37) must be true.

Notice that we select $\hat{W} = \max\{\hat{W}^{narrow}, \hat{W}^{wide}\}$ so that $$\hat{W} \geq \max\left\{\frac{\hat{W}^{opt,narrow}}{1+T+\Delta+2J}, \frac{\hat{W}^{opt,wide}}{J}\right\}. \quad (38)$$

It is readily seen that $$\hat{W}^{opt} \leq \hat{W}^{opt,narrow} + \hat{W}^{opt,wide}. \quad (39)$$

(38) and (39) together prove the theorem.

B Appendix: Modeling 3GPP LTE Control Channel Constraints

In the 3GPP LTE system, the minimum allocation unit in the downlink control channel is referred to as the control channel element (CCE). Let $\{1, \ldots, R\}$ be a set of CCEs available for conveying UL grants. A contiguous chunk of CCEs from $\{1, \ldots, R\}$ that can be be assigned to a user is referred to as a PDCCH. The size of each PDCCH is referred to as an aggregation level and must belong to the set $\{1, 2, 4, 8\}$. Let D denote the set of all possible such PDCCHs. For each user the BS first decides an aggregation level, based on its average (long-term) SINR. Then, using that users' unique identifier (ID) together with its aggregation level, the BS obtains a small subset of non-overlapping PDCCHs from D (of cardinality no greater than 6) that are eligible to be assigned to that user. Let $D_u$ denote this subset of eligible PDCCHs for a user u. Then, if user u is scheduled only one PDCCH from $D_u$ must be assigned to it, i.e., must be used to convey its UL grant. Note that while the PDCCHs that belong to the eligible set of any one user are non-overlapping, those that belong to eligible sets of any two different users can overlap. As a result, the BS scheduler must also enforce the constraint that two PDCCHs that are assigned to two different scheduled users, respectively, must not overlap.

Next, the constraint that each scheduled user can be assigned only one PDCCH from its set of eligible PDCCHs can be enforced as follows. First, define a set $V_u$ containing $|D_u|$ virtual users for each user u, $1 \leq u \leq K$, where each virtual user in $V_u$ is associated with a unique PDCCH in $D_u$ and all the parameters (such as uplink channels, queue size etc.) corresponding to each virtual user in $V_u$ are identical to those of user u. Let $\tilde{U}$ be the set of all possible subsets of such virtual users, such that each subset has a cardinality no greater than T and contains no more than one virtual user corresponding to the same user. Defining $\tilde{\mathcal{M}} = \tilde{u} \times C$, we can then pose (3) over $\tilde{\mathcal{M}}$ after setting L=K with $G_s = V_s$, $1 \leq s \leq K$. Consequently, by defining the virtual users corresponding to each user as being mutually incompatible, we have enforced the constraint that at-most one virtual user for each user can be selected, which in turn is equivalent to enforcing that each scheduled user can be assigned only one PDCCH from its set of eligible PDCCHs.

Finally, consider the set of all eligible PDCCHs, $\{D_u\}_{u=1}^{K}$. Note that this set is decided by the set of active users and their long-term SINRs. Recall that each PDCCH in $\{D_u\}_{u=1}^{K}$ maps to a unique virtual user. To ensure that PDCCHs that are assigned to two virtual users corresponding to two different users do not overlap, we can define multiple binary knapsack constraints. Clearly R such knapsack constraints suffice (indeed can be much more than needed), where each constraint corresponds to one CCE and has a weight of one for every pair $(\tilde{U},c) \in \bar{\mathcal{M}}$ wherein $\tilde{U}$ contains a virtual user corresponding to a PDCCH which includes that CCE. Then, a useful consequence of the fact that in LTE the set $D_u$ for each user u is extracted from D via a well designed hash function (which accepts each user's unique ID as input), is that these resulting knapsack constraints are column-sparse.

We claim:

1. A system, for cellular uplink scheduling, comprising:
a processor;
a wireless transceiver coupled to the processor;
and computer readable code executed by the processor to:
for a given K and N, wherein K is the number of U users and N is the number of resource Blocks (RBs),
determine metrics of all combinations $\{p(U,C):(U,c)\in M\}$ including:

$\{p(U,c)\}\ \forall (U,c) \in \mathcal{M}$ and $\{\beta^q(U,c)\}$, $\forall (U,c) \in \mathcal{M}, 1 \leq q \leq J$, execute a local ration ratio test (LRT) module including:

$$\max \sum_{(\mathcal{U},c) \in M} p(\mathcal{U},c)\chi(\mathcal{U},c), \text{ s.t.}$$

$$\text{For each user } u. \sum_{\substack{(\mathcal{U},c) \in M \\ \mathcal{U}: u \in \mathcal{U}}} \chi(\mathcal{U},c) \leq 1.$$

$$\text{For each RB } i. \sum_{\substack{(\mathcal{U},c) \in M \\ c:i \in c}} \chi(\mathcal{U},c) \leq 1,$$

$$\sum_{(\mathcal{U},c) \in M} \beta^q(\mathcal{U},c)\chi(\mathcal{U},c) \leq 1, 1 \leq q \leq J$$

where p(U,c) denotes a weighted sum-rate obtained upon co-scheduling users in U on a chunk indicated by c, X(u,c) is an indicator function that returns one if users in U are co-scheduled on a chunk indicated by c and weight of a pair (U,c) in a q-th knapsack $\beta^q(U,c)$ lies in an interval [0,1], and $G_s$ is a common set (or group);

update metrics of all combinations;

execute the LRT module; and scheduling a cellular uplink.

* * * * *